United States Patent [19]
Eguchi et al.

[11] Patent Number: 6,115,012
[45] Date of Patent: *Sep. 5, 2000

[54] OPTICAL DEFLECTION APPARATUS IN WHICH DEFLECTION ANGLE IS CONTINUOUSLY CONTROLLABLE

[75] Inventors: Shin Eguchi; Yoshihiro Mizuno; Shigeo Kayashima; Manabu Ishimoto; Masato Nakashima, all of Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/569,422

[22] Filed: Dec. 6, 1995

[30] Foreign Application Priority Data

May 23, 1995 [JP] Japan ..................... 7-124071

[51] Int. Cl.⁷ ............................................. G09G 3/34
[52] U.S. Cl. ..................... 345/84; 349/33; 349/142
[58] Field of Search ........................ 345/87, 94, 95, 345/98, 99, 204, 208, 210, 84; 349/33, 142, 186; 348/791, 792

[56] References Cited

U.S. PATENT DOCUMENTS

| | | |
|---|---|---|
| 3,813,145 | 5/1974 | Hedman et al. ............... 350/160 |
| 3,838,908 | 10/1974 | Channin . |
| 3,909,114 | 9/1975 | Haas et al. . |
| 4,639,091 | 1/1987 | Huignard et al. . |
| 5,122,888 | 6/1992 | Iizuka et al. . |

*Primary Examiner*—Regina Liang
*Attorney, Agent, or Firm*—Armstrong, Westerman, Hattori, McLeland & Naughton

[57] ABSTRACT

An optical deflection apparatus includes a pair of transparent electrodes, a liquid crystal layer, put between the transparent electrodes, in which stripes are formed at intervals based on a waveform of a driving signal supplied to the pair of transparent electrodes, the stripes functioning as a grating by which incident light is deflected in a deflecting direction, and a driving unit for supplying to the pair of transparent electrodes the driving signal having a waveform by which the deflecting direction changes with time.

32 Claims, 37 Drawing Sheets

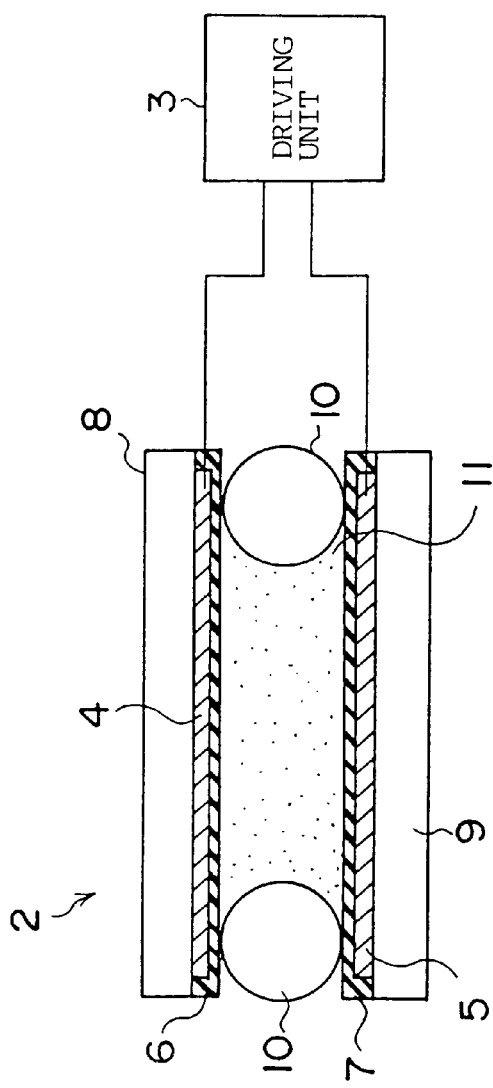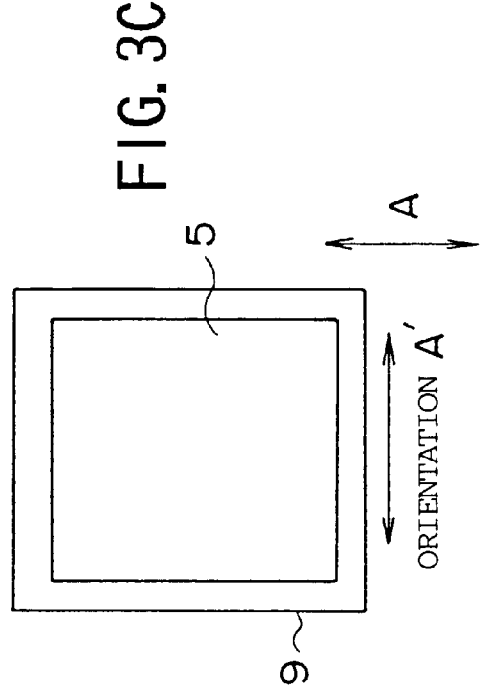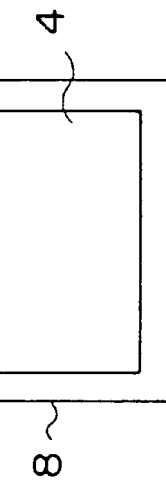

HIGH-FREQUENCY DRIVING

LOW-FREQUENCY DRIVING

SCANNING ANGLE θ

LOW-FREQUENCY DRIVING
AT CONSTANT ANGULAR VELOCITY

LOW-FREQUENCY DRIVING
AT CONSTANT VELOCITY

INITIAL ORIENTATION

LOW-FREQUENCY DRIVING

HIGH-FREQUENCY DRIVING

FIG. 15A
FIG. 15B
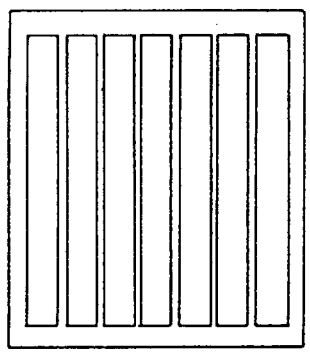
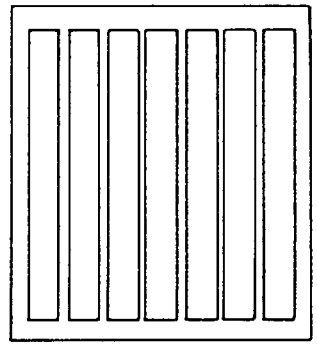
INITIAL ORIENTATION
FIG. 16A
FIG. 16B
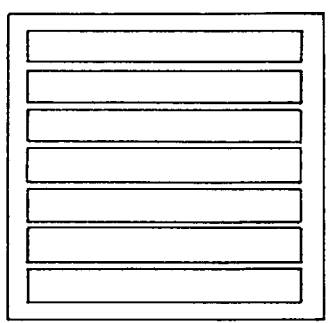
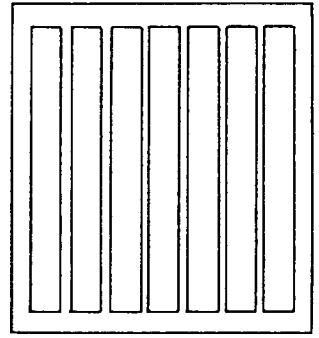

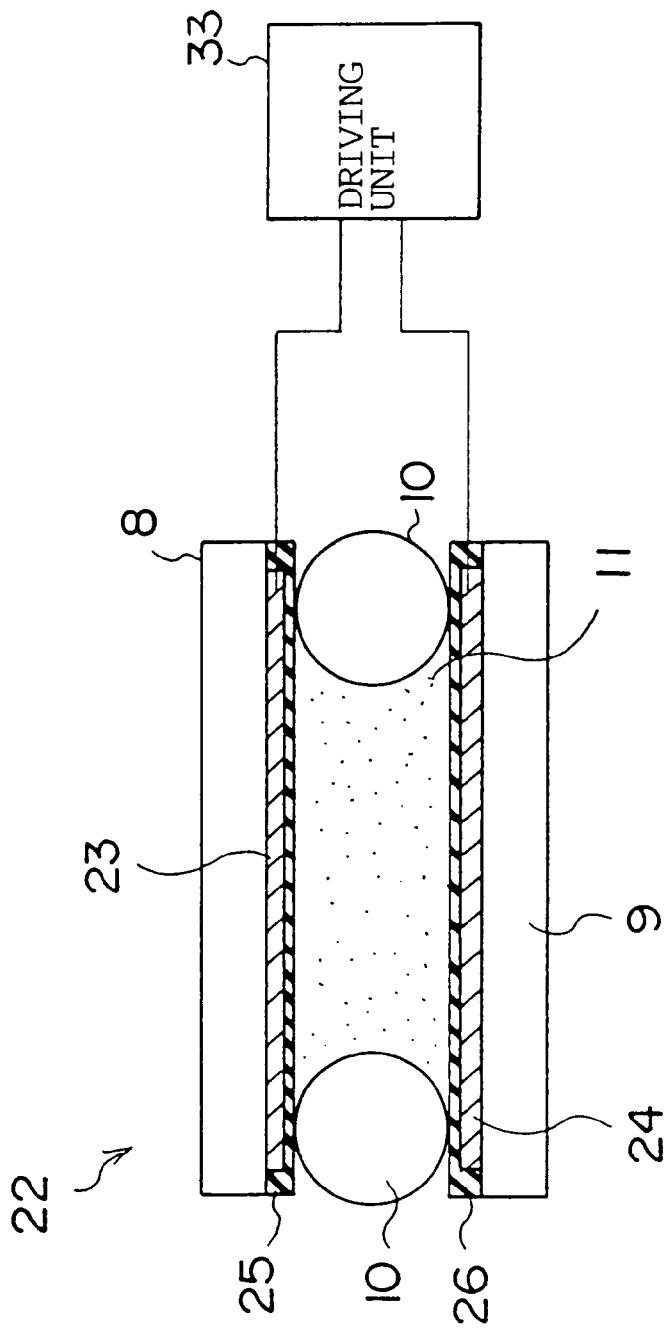

SCANNING AT CONSTANT
VELOCITY IN X DIRECTION

SCANNING AT CONSTANT
VELOCITY IN X DIRECTION

SCANNING AT RANDOM
IN X DIRECTION

SCANNING AT CONSTANT
VELOCITY IN Z DIRECTION

SCANNING AT RANDOM
IN Z DIRECTION

SCANNING AT RANDOM
POSITIONS

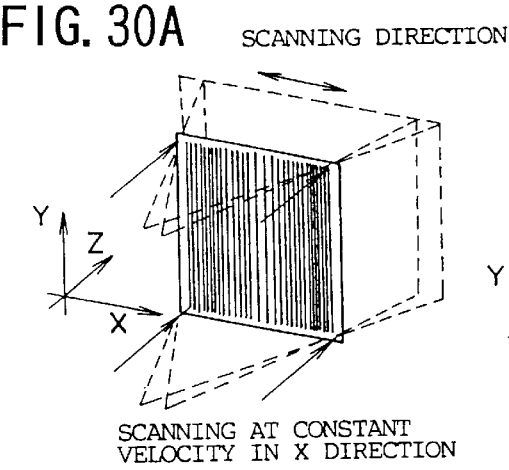

FIG. 30A SCANNING DIRECTION
SCANNING AT CONSTANT VELOCITY IN X DIRECTION

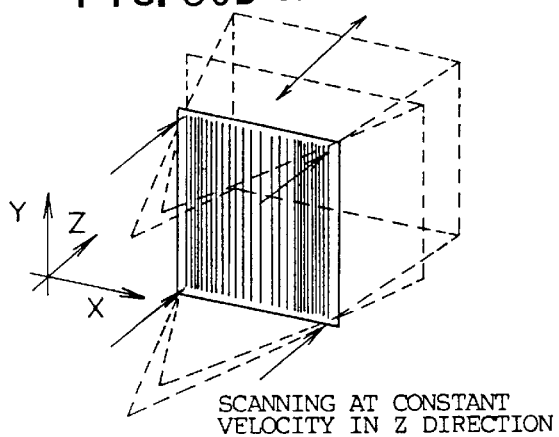

FIG. 30D SCANNING DIRECTION
SCANNING AT CONSTANT VELOCITY IN Z DIRECTION

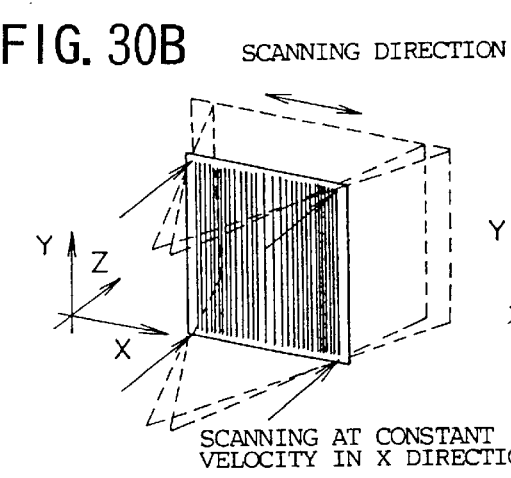

FIG. 30B SCANNING DIRECTION
SCANNING AT CONSTANT VELOCITY IN X DIRECTION

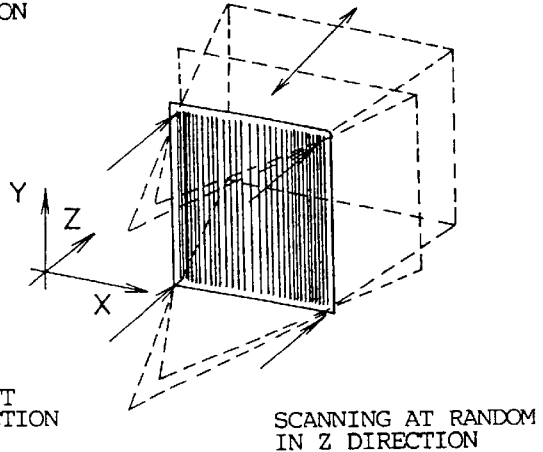

FIG. 30E SCANNING DIRECTION
SCANNING AT RANDOM IN Z DIRECTION

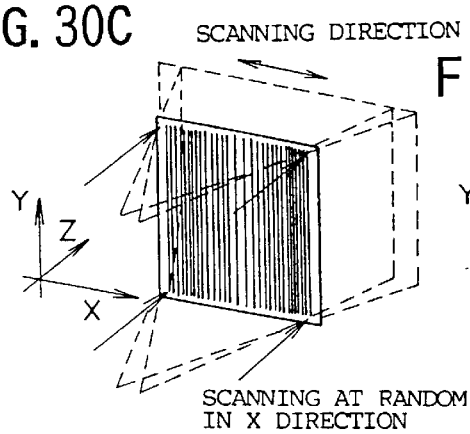

FIG. 30C SCANNING DIRECTION
SCANNING AT RANDOM IN X DIRECTION

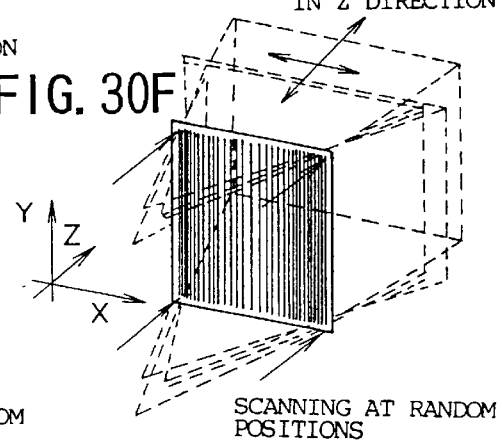

FIG. 30F
SCANNING AT RANDOM POSITIONS

SCANNING AT CONSTANT VELOCITY IN X DIRECTION

SCANNING DIRECTION

SCANNING AT CONSTANT VELOCITY IN X DIRECTION

SCANNING AT RANDOM IN X DIRECTION

SCANNING AT CONSTANT VELOCITY IN Z DIRECTION

SCANNING AT RANDOM IN Z DIRECTION

SCANNING AT RANDOM POSITIONS

SCANNING AT CONSTANT VELOCITY IN X DIRECTION

SCANNING AT CONSTANT VELOCITY IN X DIRECTION

SCANNING AT RANDOM IN X DIRECTION

SCANNING AT CONSTANT VELOCITY IN Z DIRECTION

SCANNING AT RANDOM IN Z DIRECTION

SCANNING AT RANDOM POSITIONS

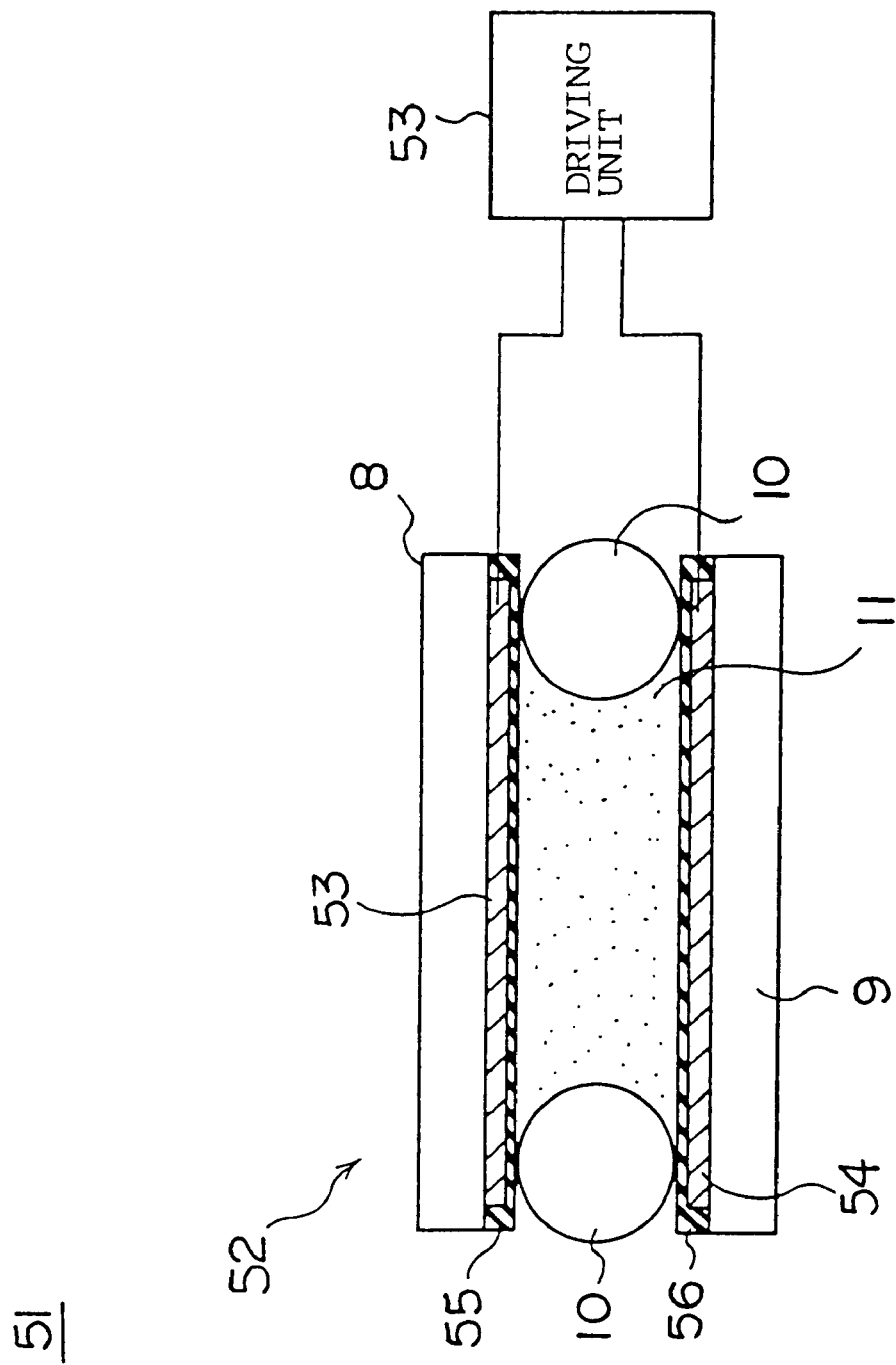

AT CONSTANT VELOCITY

AT RANDOM

AT CONSTANT VELOCITY

AT RANDOM

OPTICAL DEFLECTION APPARATUS IN WHICH DEFLECTION ANGLE IS CONTINUOUSLY CONTROLLABLE

BACKGROUND OF THE INVENTION (1) Field of the Invention

The present invention generally relates to an optical deflection apparatus, and more particularly to an optical deflection apparatus in which a deflection angle is continuously controllable.

(2) Description of the Related Art

In recent years, optical switches have been developed, so that miniaturized optical deflection apparatus through which light can be accurately deflected is required for the optical switches.

In general, to deflect the light, a mechanical movable part, such as a galvanomirror, is used. However, because of vibration generated by the mechanical movable part, it is not preferable that a deflection apparatus having the mechanical movable part is used in a precision optical system. Thus, an optical deflection apparatus in which a liquid crystal panel having no mechanical movable part is used is being developed.

An example of a conventional optical deflection apparatus having the liquid crystal is shown in FIG. 1A.

Referring to FIG. 1A, an optical deflection apparatus 41 has a deflection unit 42 and a driving unit 43 for applying a driving voltage to the deflection unit 42. The deflection unit 42 has a pair of glass plates 48 and 49. A transparent electrode 44 which is covered by an orientation film 46 is stacked on the glass plate 48 (see FIG. 1B). Band-shaped transparent electrodes 45 which are covered by an orientation film 47 are stacked on the glass plate 49 (see FIG. 1C). The glass plates 48 and 49 are maintained at predetermined distance by spacers 50, and the orientation films 46 and 47 face each other. A space between the orientation films 45 and 47 is filled with liquid crystal 51. Directions A and A' of the orientation films 46 and 47 are perpendicular to each other (see FIGS. 1B and 1C).

When no voltage is applied across the transparent electrode 44 and the band-shaped transparent electrodes 45, liquid crystal molecules are twisted by the orientation films 46 and 47. In this state, the light does not travel through the liquid crystal 51. When the voltage is applied across the transparent electrode 45 and the band-shaped transparent electrodes 45, the liquid crystal molecules are arranged so that major axes of the molecules are parallel to each other. In this state, the light can travel through the liquid crystal 51.

The driving unit 43 controls voltages applied to electrodes (the band-shaped transparent electrodes 45). When alternate electrodes are provided with voltages as shown in FIG. 2A, stripes arranged at intervals each corresponding to two electrodes are formed. Light incident on the deflection unit 42 is diffracted and deflected by the stripes. The deflection angle is controlled by the intervals of the stripes. When alternate pairs of adjacent electrodes are provided with voltages as shown in FIG. 2B, stripes arranged at intervals each corresponding to two pairs of adjacent electrodes are formed. That is, in this case, the intervals of the stripes are changed, so that the deflection angle is changed.

In addition, it has been proposed that signals having a predetermined frequency and different phases are supplied to the respective electrodes so that a diffraction grating in which the transmittance corresponding to each electrode is gradually varied.

In the above conventional optical deflection apparatus, the voltages applied to the electrodes are controlled so that transmittances of parts, corresponding to the electrodes, of the liquid crystal are controlled. As a result, the pattern of stripes are controlled. Thus, the pattern of tripes arranged at intervals less than the width of each electrode can not be formed, so that it is difficult to obtain a resolution (intervals) corresponding to grade of wavelength of light which resolution is needed to obtain a sufficient deflection angle.

In addition, as shown in FIG. 2B, a space frequency which can be represented by the stripes always corresponds values given by integral multiple of the interval of the stripes. Thus, the space frequency can not be continuously changed, so that the deflection angle can be continuously changed.

Even if the frequencies of the signals supplied to the respective electrodes are changed, the space frequency of stripes corresponding to the electrodes can not be continuously changed.

SUMMARY OF THE INVENTION

Accordingly, a general object of the present invention is to provide a novel and useful optical deflection apparatus in which the disadvantages of the aforementioned prior art are eliminated.

A more specific object of the present invention is to provide an optical deflection apparatus in which the deflection angle can be continuously controlled.

The above objects of the present invention are achieved by an optical deflection apparatus comprising: a pair of transparent electrodes; a liquid crystal layer, put between said transparent electrodes, in which stripes are formed at intervals based on a waveform of a driving signal supplied to said pair of transparent electrodes, the stripes functioning as a grating by which incident light is deflected in a deflecting direction; and driving means for supplying to said pair of transparent electrodes the driving signal having a waveform by which the deflecting direction changes with time.

According to the present invention, the deflecting direction of light deflected by the grating formed in the liquid crystal can be continuously changed by changing (at a low frequency or a high frequency) the waveform of the driving signal supplied to the pair of transparent electrodes.

Further, the above objects of the present invention are achieved by an optical deflection apparatus comprising: a pair of transparent electrodes, at least one of said transparent electrodes is segmented into electrode-segments; a liquid crystal layer, put between said transparent electrodes, in which stripes are formed at intervals based on waveforms of driving voltages supplied to said pair of transparent electrodes, the stripes functioning as gratings by which incident light is deflected in deflecting directions; orientation setting means for setting an initial orientation of said liquid crystal layer; and driving means for supplying the driving voltages to the electrode-segments of said pair of transparent electrodes so that deflected light is focused.

According to the present invention, the light which passes through the gratings formed in the liquid crystal can be focused. In addition, the focus can be moved by changing the driving voltages supplied to the electrode-segments.

BRIEF DESCRIPTION OF THE DRAWINGS

FIGS. 3A, 3B and 3C are diagrams illustrating a structure of an optical deflection apparatus according to a first embodiment of the present invention;

FIGS. 15A and 15B are diagrams illustrating a fourth variation of the transparent electrodes used in the deflection unit;

FIGS. 16A and 16B are diagrams illustrating a fifth variation of the transparent electrodes used in the deflection unit;

FIG. 19 is a diagram illustrating the optical deflection apparatus according to a second embodiment of the present invention;

FIGS. 30A, 30B, 30C, 30D, 30E and 30F are diagrams illustrating examples of focus movement in which the deflection unit is driven so that a concave cylindrical lens is formed;

FIG. 35 is a diagram illustrating the optical deflection apparatus according to a third embodiment of the present invention;

DESCRIPTION OF THE PREFERRED EMBODIMENTS

Figure 1A:
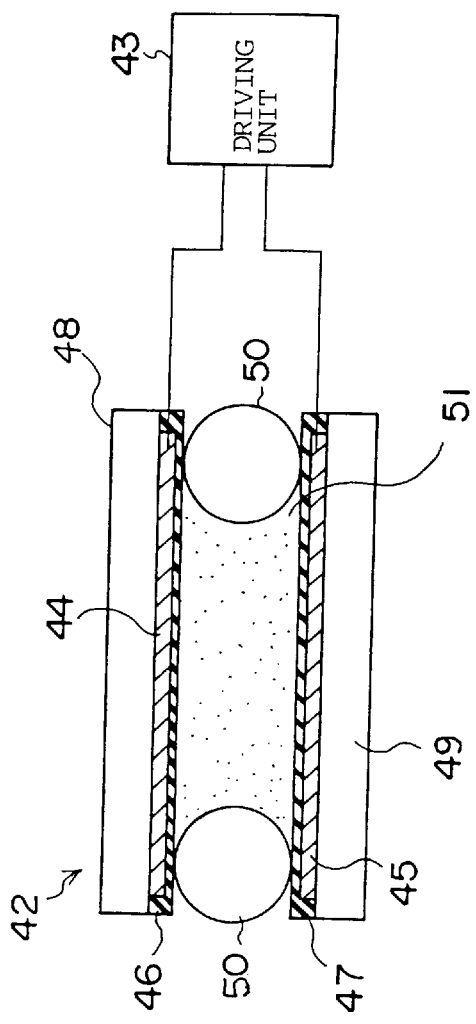
FIGS. 1A, 1B and 1C are diagrams illustrating a structure of a conventional optical deflection apparatus.
Figure 1B:
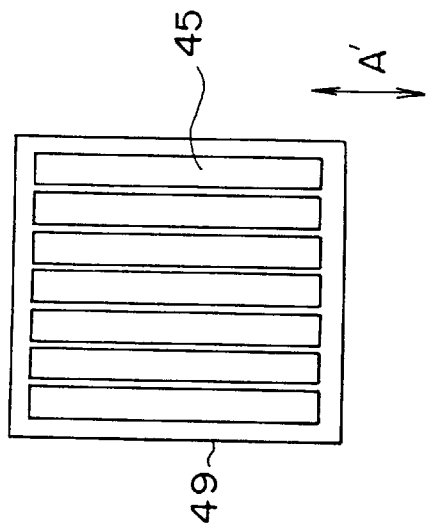
Figure 1C:
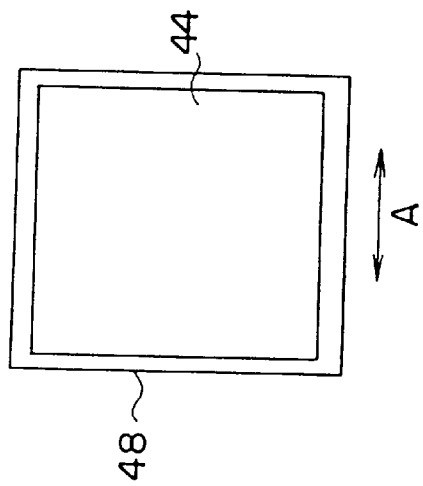
Figure 2A:
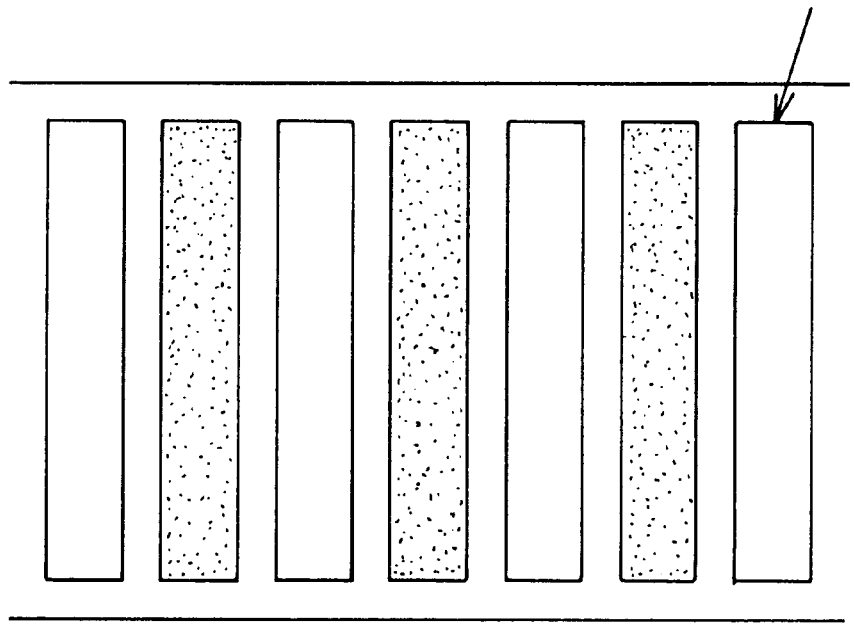
FIGS. 2A and 2B are diagrams illustrating patterns of stripes formed on the conventional optical deflection apparatus.
Figure 2B:
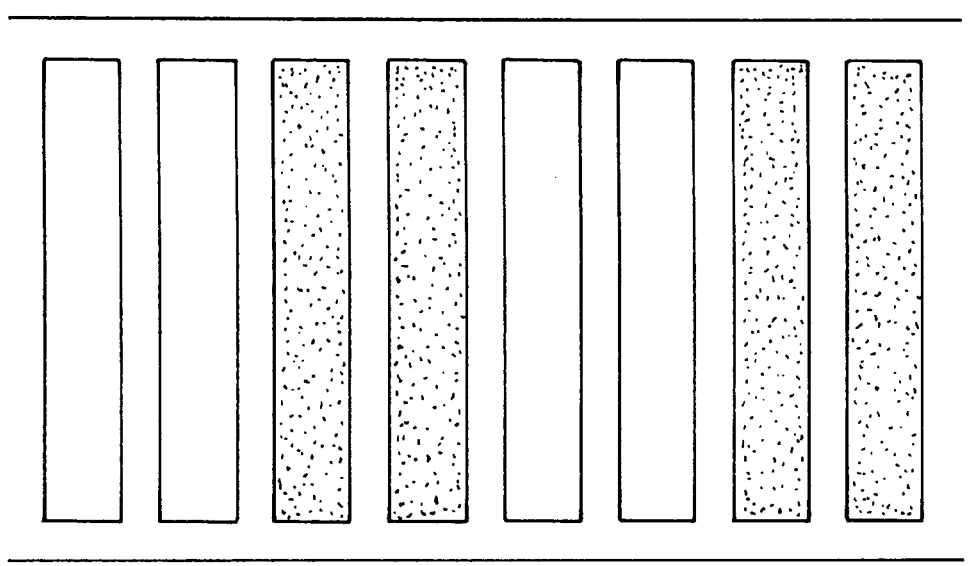

A description will now be given of a first embodiment of the present invention. In an optical deflection apparatus according to the first embodiment of the present invention, an deflection angle at which incident light is deflected is varied so that deflected light scans in a predetermined direction.

The optical deflection apparatus according to the first embodiment is formed as shown in FIGS. 3A, 3B and 3C. Referring to FIG. 3A, the optical deflection apparatus 1 has a deflection unit 2 and a driving unit 3. The driving unit 3 controls a voltage applied to the deflection unit 2 so that incident light is deflected by the deflection unit 2 at an deflection angle based on the voltage.

The deflection unit 2 has a pair of glasses 8 and 9. Transparent electrodes 4 and 5 which are respectively covered by orientation films 6 and 7 are respectively formed on the glasses 8 and 9. The glasses 8 and 9 are arranged so that the orientation films 6 and 7 face each other. The glasses 8 and 9 are maintained a predetermined distance by spacers 10, and a space between the orientation films 6 and 7 is filled with crystal liquid 11. The transparent electrodes 4 and 5 continuously extend on the glasses 8 and 9 respectively, as shown in FIGS. 3B and 3C. An initial orientation direction of the crystal liquid 11 provided between the orientation films 6 and 7 depends on the orientation film 6.

The liquid crystal 11 is a type of nematic liquid crystal having a dielectric constant $\epsilon_1$ in the major axis direction of liquid crystal molecules and a dielectric constant $\epsilon_2$ in the minor axis direction thereof. The difference between the dielectric constants $\epsilon_1$ and $\epsilon_2$ ($\Delta\epsilon=\epsilon_1-\epsilon_2$) is negative. When a DC (direct current) voltage greater than a threshold level is applied to this type of the liquid crystal, stripes are formed in the liquid crystal in a direction parallel to the initial orientation direction of the liquid crystal. When an AC (alternate current) voltage greater than a threshold level is applied to the liquid crystal, stripes are formed in the liquid crystal in a direction perpendicular to the initial orientation direction of the liquid crystal. This phenomenon was reported by W. Greubel et al. (App. Phys. Lett. 19 and 17, 1971). The stripes formed in the liquid crystal are caused by the distribution of secondary orientation in the liquid crystal. Intervals at which the stripes are arranged are varied by variation of the voltage applied to the liquid crystal. This operation of the liquid crystal is referred to as an operation in a VGM (Variable Grating Mode).

Figure 4:
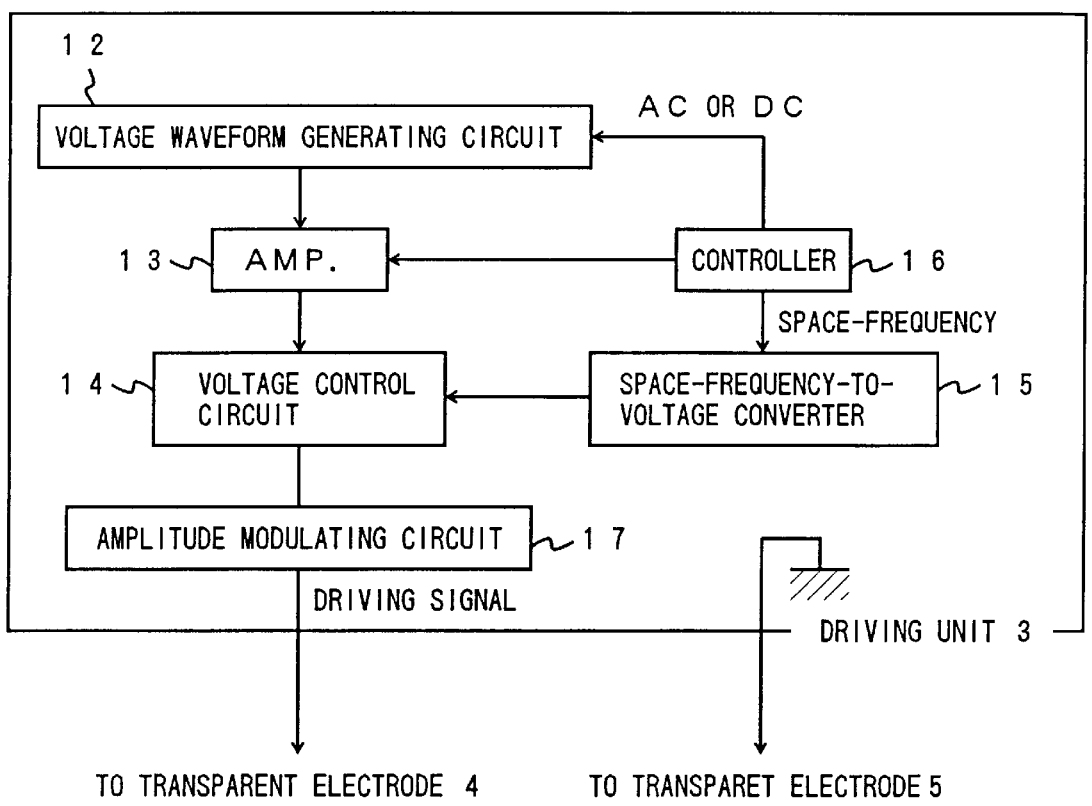
FIG. 4 is a block diagram illustrating a driving unit of the optical deflection apparatus shown in FIG. 3A.

The driving unit 3 which applies a voltage across the transparent electrodes 4 and 5 is formed as shown in FIG. 4.

Referring to FIG. 4, the driving unit 3 has a voltage waveform generating circuit 12, an amplifier 13, a+ voltage control circuit 14, a space-frequency-to-voltage converter circuit 15, a controller 16 and an amplitude modulating circuit 17. The voltage waveform generating circuit 12 outputs a signal (used as a carrier) having a waveform based on an instruction from the controller 16. The amplifier 13 amplifies the signal output from the voltage waveform generating circuit 12. The voltage control circuit 14 controls a waveform of a signal supplied from the amplifier 3. The space-frequency-to-voltage converter circuit 15 outputs a control signal used to control the level of the signal output from the voltage control circuit 14. The controller 16 instructs the voltage waveform generating circuit 12 to generate a DC waveform signal or an AC waveform signal, and informs the space-frequency-to-voltage circuit 14 of a space-frequency of stripes to be formed in the crystal liquid 11. which should be formed in the crystal liquid 11.

In a DC (Direct Current) driving manner (in a low-frequency driving manner), a DC carrier wave is used. In an AC (Alternating Current) driving manner (in a high-frequency driving manner), an amplitude-modulated carrier is used. In this case, the cycle of the carrier must be less than the cycle of a modulating wave.

The carrier output from the voltage waveform generating circuit 12 is amplified by the amplifier 13. The gain of the amplifier 13 depends on the maximum value of the deflection angle. The gain is set in the amplifier 13 in accordance with an instruction from the controller 16. The voltage control circuit 14 applies a DC bias to the carrier output from the amplifier 13. The biased carrier output from the voltage control circuit 12 is amplitude-modulated by the amplitude modulating circuit 17. The amplitude of the carrier depends on a deflection angle (a deflection position). The controller 16 has a deflection-angle-voltage conversion table, and the deflection angle is converted into a control signal using the conversion table. The control signal is used to control a degree of the amplitude modulation of the carrier. The amplitude-modulated carrier output from the amplitude modulating circuit 17 is supplied to the transparent electrode 4 of the deflection unit 2, so that a grating having a space-frequency corresponding to the voltage of the carrier is formed in the liquid crystal 11.

Figure 5:
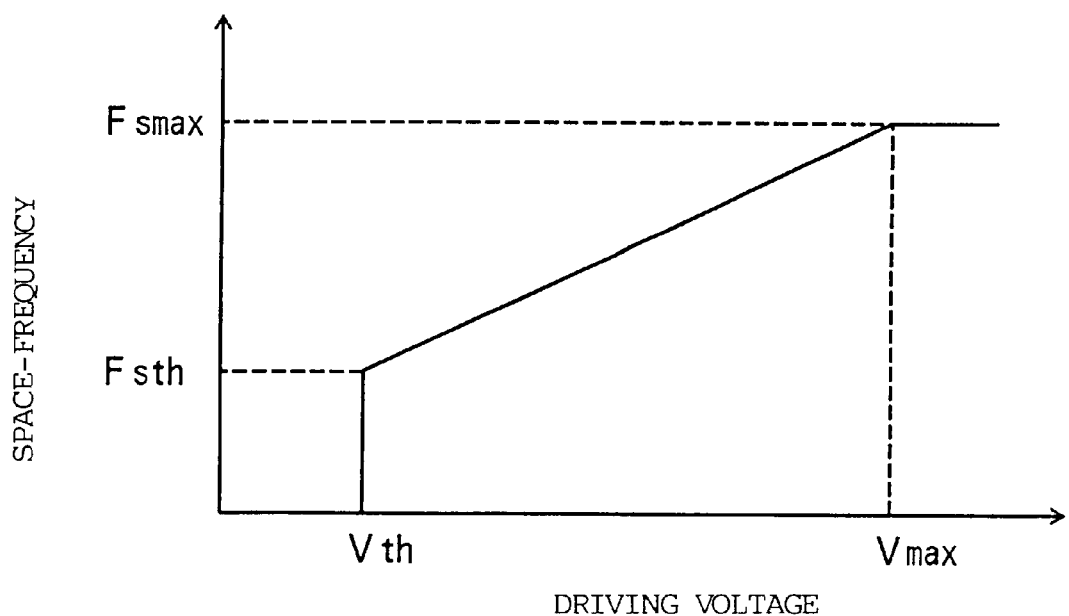
FIG. 5 is a characteristic diagram illustrating a relationship between a voltage applied to a liquid crystal and the space frequency of stripes.

The liquid crystal has a characteristic indicated by a relationship, as shown in FIG. 5, between the voltage supplied to the liquid crystal 11 and the space-frequency of stripes formed in the liquid crystal 11.

Referring to FIG. 5, when a threshold voltage $V_{th}$ is supplied to the liquid crystal 11, a stripe pattern having a space-frequency $F_{sth}$ is formed. When the voltage supplied to the liquid crystal 11 reaches a maximum value $V_{max}$, the space-frequency reaches a maximum value $F_{smax}$. The space frequency is linearly increased from the value $F_{sth}$ to the maximum value $V_{smax}$ in accordance with the increasing of the voltage supplied to the liquid crystal 11 from the threshold voltage $V_{th}$ to the maximum value $V_{max}$. In a range of the voltage greater than the maximum value $V_{max}$, the space-frequency is maintained at the maximum value $F_{smax}$. The larger the space-frequency, the smaller the intervals at which the stripes are arranged, and the larger the deflection angle.

A description will now be given, with reference to FIGS. 6A and 6B, of operations of the optical deflection apparatus according to the first embodiment.

Figure 6B:
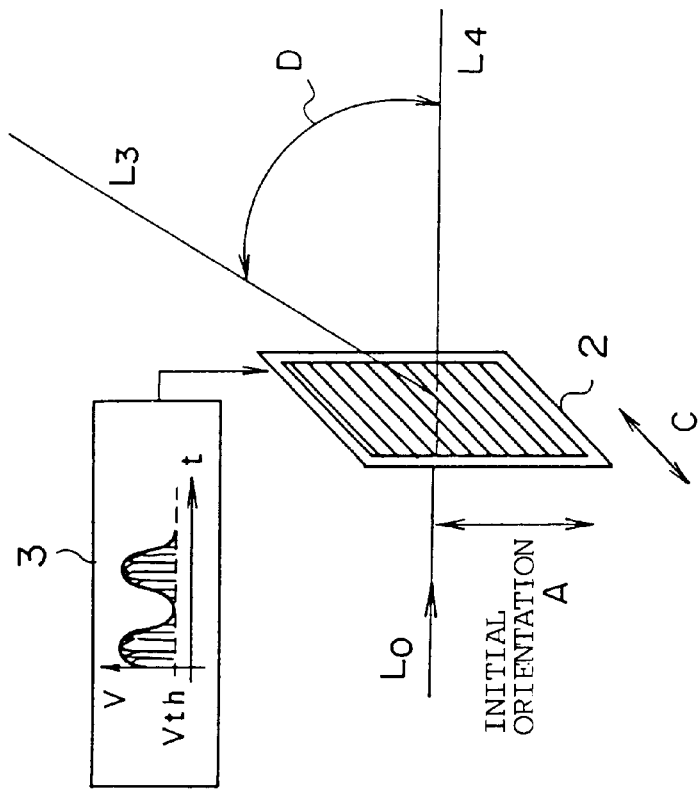
FIGS. 6A and 6B are diagrams illustrating operations of the optical deflection apparatus according to the first embodiment.
Figure 6A:
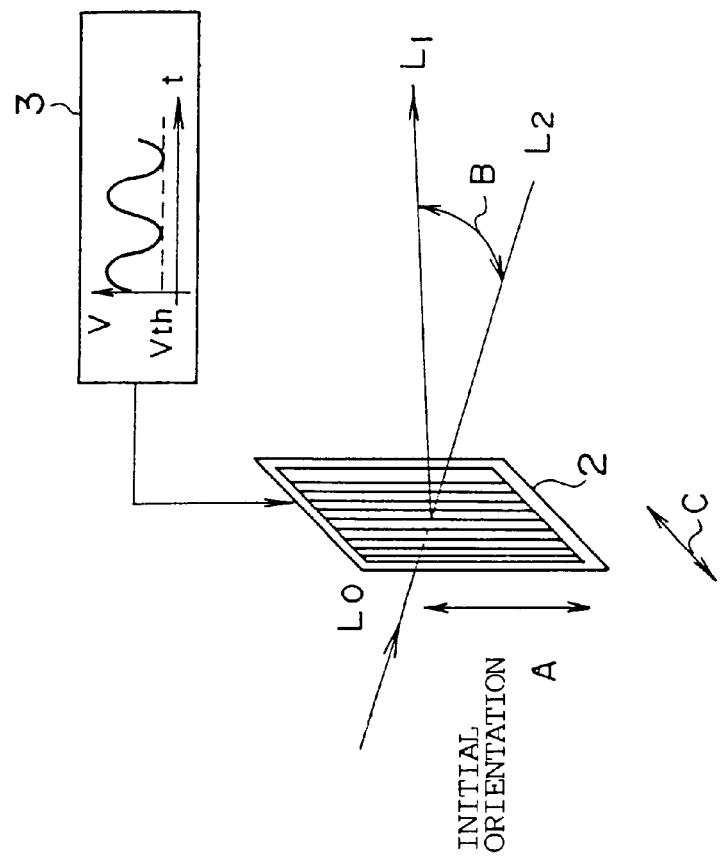

The driving unit 3 applies across the transparent electrodes 4 and 5 of the deflection unit 2 a DC voltage which is varied at a low frequency less than a predetermined value within a range of 200 Hz and 300 Hz, as shown in FIG. 6A. In this case, a stripe pattern having stripes which extend in a direction parallel to the initial orientation direction A of the liquid crystal 11 is formed. Light Lo incident on the deflection unit 2 (the liquid crystal 11) is diffracted by the stripe pattern and is deflected at an angle corresponding to the space-frequency of the stripe pattern in a direction C perpendicular to the direction A in which the stripes extend.

Due to the variation of the voltage supplied from the driving unit 3 to the deflection unit 2, the space-frequency formed in the liquid crystal 21 is varied, so that the deflecting angle of the light Lo is varied. As a result, as shown in FIG. 6A, a space between lines L1 and L2 in a direction B perpendicular to the initial orientation direction is scanned by the deflected light.

The driving unit 3 applies across the transparent electrodes 4 and 5 of the deflection unit 2 an AC voltage which is varied at a high frequency greater than the predetermined value within the range of 200 Hz and 300 Hz, as shown in FIG. 6B. In this case, a stripe pattern having stripes which extend in the direction C perpendicular to the initial orientation direction A of the liquid crystal 11 is formed.

The light Lo incident on the deflection unit 2 (the liquid crystal 11) is diffracted by the stripe pattern and is deflected at an angle corresponding to the space-frequency of the stripe pattern in the direction A perpendicular to the direction C in which the stripes extend.

Due to the variation of the envelope of the AC voltage amplitude-modulated, the space-frequency of the stripe pattern formed in the liquid crystal 11 is varied, so that the deflection angle of the light Lo is varied. As a result, as shown in FIG. 6B, a space between lines L3 and L4 in the direction D parallel to the initial orientation direction A is scanned by the deflected light.

The space between the lines L1 and L2 and the space between the lines L3 and L4 both of which are to be scanned by the light depend on the envelopes of the DC voltage and the AC voltage supplied from the driving unit 3 to the deflection unit 2.

Figure 7:
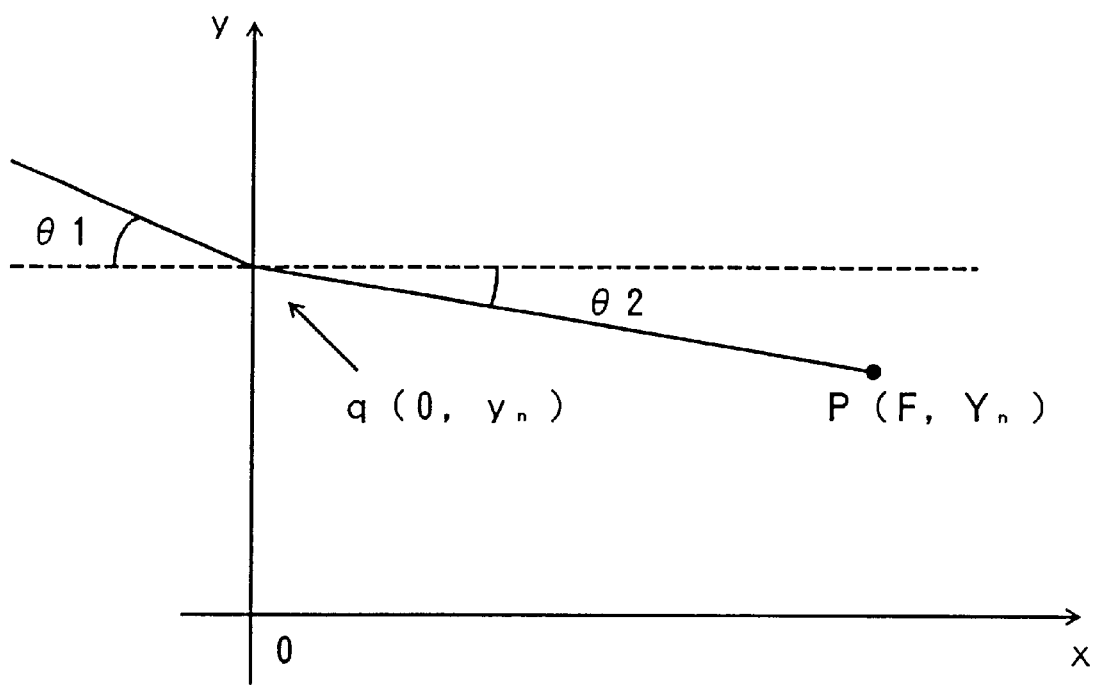
FIG. 7 is a diagram illustrating light deflected by the optical deflection apparatus according to the first embodiment.

As shown in FIG. 7, when the light Lo is incident on the deflection unit 2 at an angle $\theta_1$, the light Lo is deflected at an deflection angle $\theta_2$ by stripes having a space-frequency $f_s$. In this case, a relationship between the angles $\theta_1$ and $\theta_2$ is represented by the following equation.

$$\sin \theta_1 + \sin \theta_2 = f_s \lambda \quad (1\text{-}1)$$

($\lambda$ is a wavelength of the incident light Lo)

The space-frequency is in proportion to the voltage V applied to the liquid crystal 11. That is, the following equation stands.

$$f_s = k \, V (k \text{ is a constant}) \quad (1\text{-}2)$$

According to the above equations (1-1) and (1-2), the following equations is obtained.

$$\sin \theta_1 + \sin \theta_2 = k' \, V (k'=k\lambda) \quad (1\text{-}3)$$

In a case where the light is deflected at a constant angular velocity under a condition represented by the following equation:

$$\theta_2 = wt$$

where w is an angular velocity and t is time, the above equation (1-3) may be changed to $$\sin \theta_1 + \sin wt = k' \, V. \quad (1\text{-}4)$$

Thus, the voltage V(t) to be supplied to the deflection unit 2 is represented by the following formula:

$$V(t)=(A+\sin wt)/k' (1\text{-}5)$$

where A is equal to $\sin \theta_1$ (A=$\sin \theta_1$).

That is, if the voltage supplied to the deflection unit 2 is varied in a sinusoidal manner, the light can be deflected at a constant angular velocity.

Figure 8A:
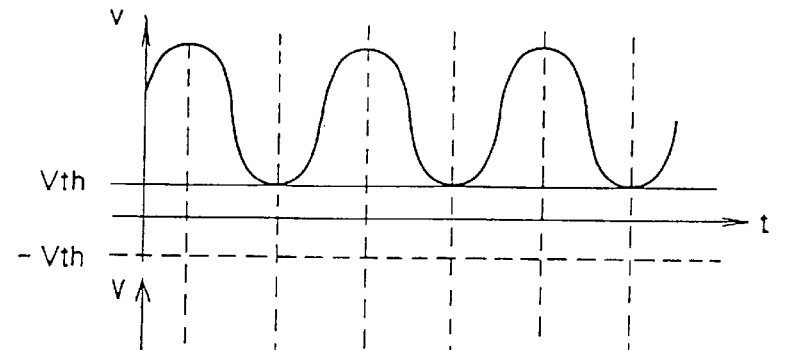
FIGS. 8(A)–8(C) are a waveform diagram illustrating waveforms of driving signals and a deflection pattern in which a focal point moves at a constant angular velocity.
Figure 8B:
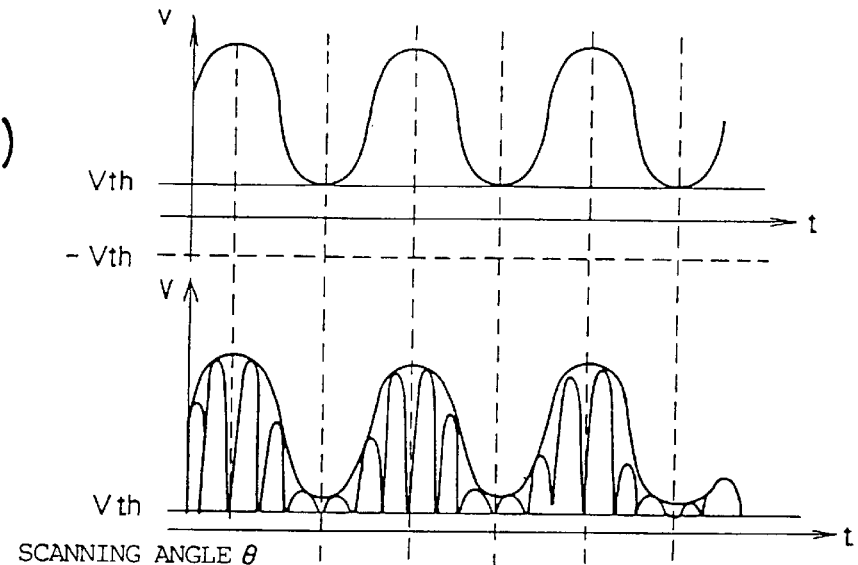
Figure 8C:
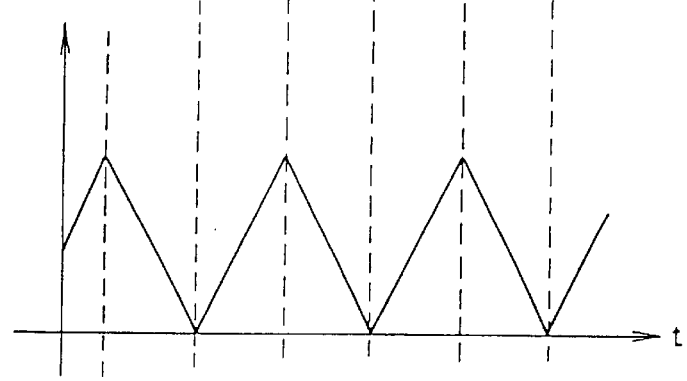

In a case where the light is deflected at a constant angular velocity, the signals supplied to the deflection unit 2 are shown in FIG. 8 (A) and (B). FIG. 8(A) shows a sinusoidal driving signal based on a DC carrier, and FIG. 8(B) shows a sinusoidal driving signal based on an AC carrier. When the sinusoidal driving signal having a wave form shown in FIG. (A) or (B) is supplied to the deflection unit 2, the light incident on the deflection unit 2 is deflected at a constant angular velocity. As a result, the scanning angle $\theta$ of the deflected light is varied in accordance with time t) as shown in FIG. 8(C).

In case where the deflection unit 2 is driven by the sinusoidal driving signal shown in FIG. 8(A), the deflected light can scan in the direction B (corresponding to the direction C) shown in FIG. 6A at the constant angular velocity as shown in FIG. 8(C). In a case where the deflection unit 2 is driven by the sinusoidal driving signal shown in FIG. 8(B), the deflected light can scan in the direction D (corresponding to the direction A) shown in FIG. 6B at the constant angular velocity as shown in FIG. 8(C).

A description will now be given of a case in which light is deflected, at a time t, from a point (0,0) (a pixel) to a point (X(t), Y(t)). In this case, the deflection angle $\theta_2$ is represented by the following equation.

$$\sin \theta_2 = Y(t)/[X(t)^2+Y(t)^2]^{1/2} \quad (2\text{-}1)$$

When the above equation (2-1) is substituted for the equation (1-3), the voltage V(t) (the driving signal) supplied to the deflection unit 3 is represented as follows:

$$V(t)=k'[\sin \theta_1 + Y(t)/[X(t)^2+Y(t)^2]^{1/2}] \quad (2\text{-}2)$$

where k' is equal to $1/k\lambda$ (k'=1/k$\lambda$). Thus, if the driving signal V(t) is supplied to the deflection unit 2, the light is deflected from the pixel (0,0) to the point (X(t), Y(t)).

Further, in FIG. 7, in a case where the deflected light scans a line x=X at a constant velocity u, Y(t) is equal to ut (Y(t)=ut). Thus, in this case, the driving signal V(t) supplied to the deflection unit 2 is represented as follows.

$$V(t)=k'[\sin \theta_1+ut/[X^2+(ut)^2]^{1/2}] \quad (3\text{-}1)$$

The above equation can be transformed to the following equation.

$$V(t)=k'[\sin \theta_1+t/[t^2+(X/u)^2]^{1/2}]$$

Substituting f for $(X/u)^2$, the driving signal V(t) depends on $(t/(t^2+f)^{1/2}$.

FIG. 9 shows a case of a scanning operation at a constant velocity.

Figure 9A:
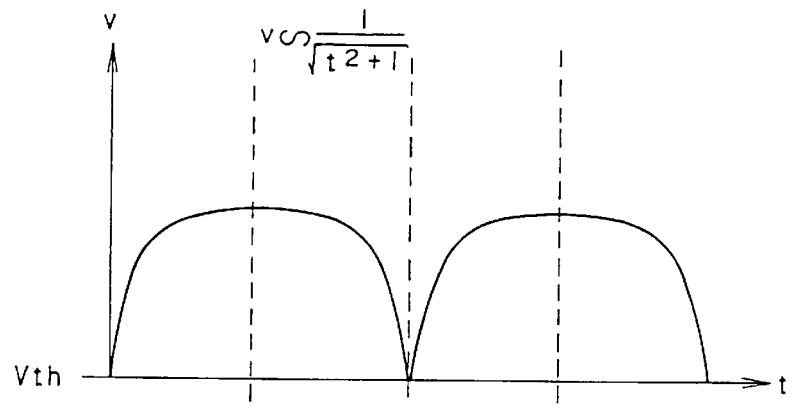
FIG. 9 is a waveform diagram illustrating waveforms of driving signals and a deflection pattern in which the focal point moves at a constant velocity.
Figure 9B:
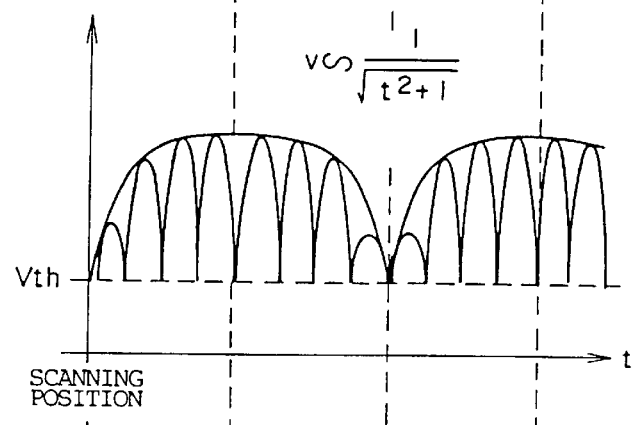
Figure 9C:
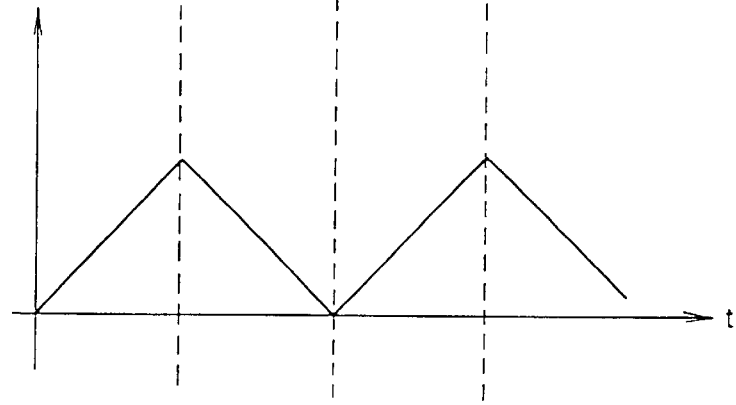
Figure 10A:
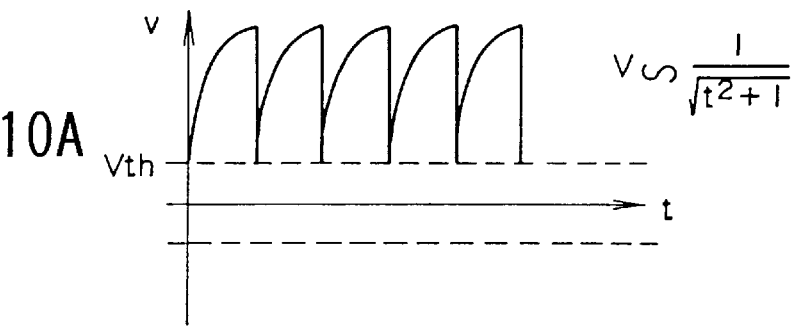
FIGS. 10A, 10B and 10C are waveform diagrams illustrating waveforms of driving signals (voltages) which can be used in a low-frequency driving manner.
Figure 10B:
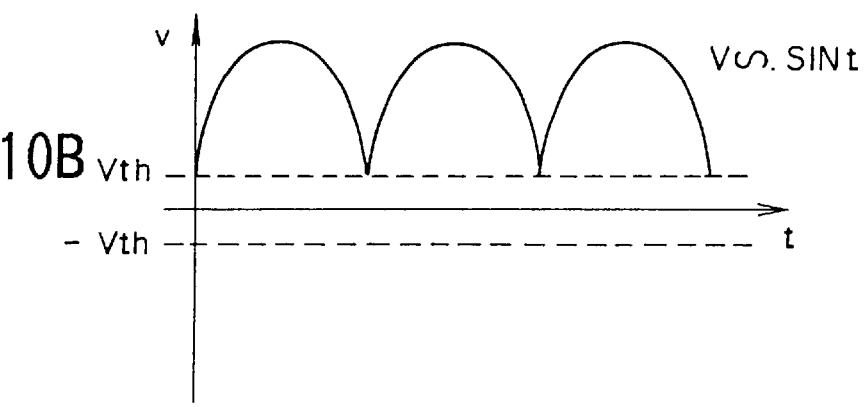
Figure 10C:
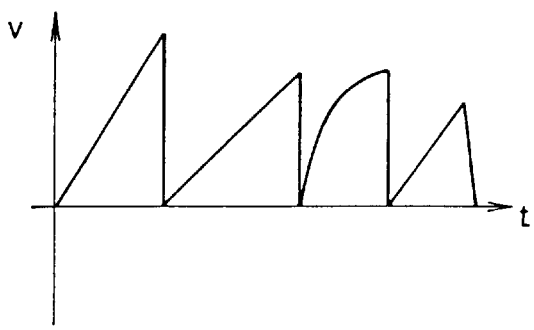
Figure 11A:
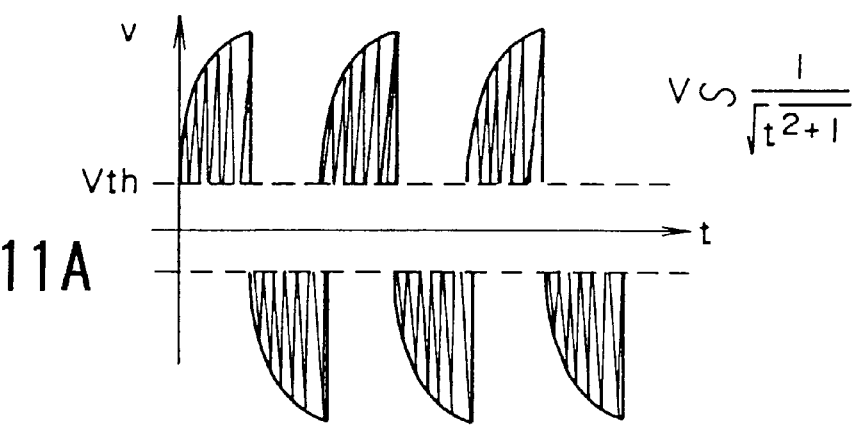
FIGS. 11A, 11B and 11C are waveform diagrams illustrating waveforms of driving signals (voltages) which can be used in a high-frequency driving manner.
Figure 11B:
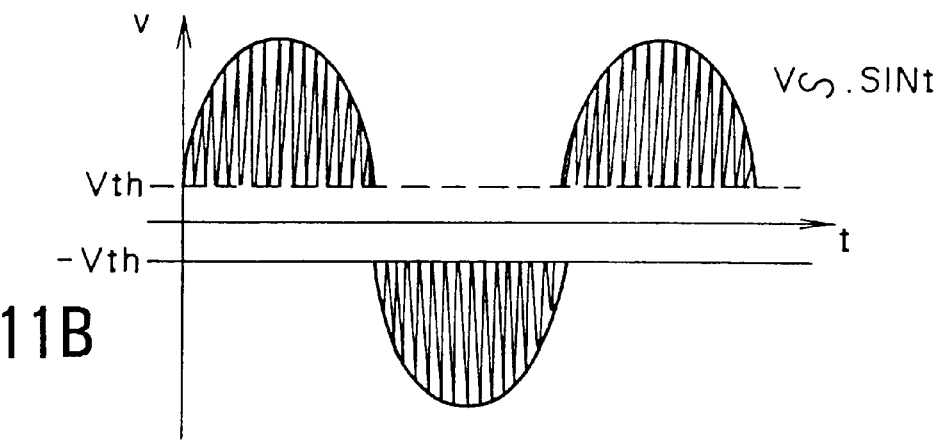
Figure 11C:
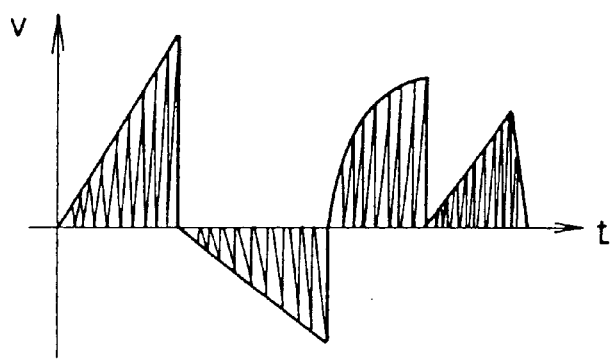

When the deflection unit 2 is driven by a driving signal having a waveform (a low frequency) as shown in FIG. 9(A), the deflected light scans at a constant velocity as shown in FIG. 9(C) in the direction B shown in FIG. 6A. When the deflection unit 2 is driven by a driving signal having a waveform (a high frequency) as shown in FIG. 9(B), the deflected light scans at the constant velocity as shown in FIG. 9(C) in the direction D shown in FIG. 6B.

FIGS. 10A, 10B, 10C, 11A, 11B and 11C show driving signals used for scanning operations at velocities varied at random. The driving signals shown in FIGS. 10A, 10B and 10C have low frequencies (carriers are DC signals), and driving signals shown in FIGS. 11A, 11B and 11C have high frequencies (carriers are AC signals).

In the above embodiment, each of the transparent electrodes 4 and 5 is a single electrode. The initial orientation direction of the liquid crystal 11 is a single direction. Black and white stripes arranged at constant intervals are formed in a whole part of the liquid crystal 11 sandwiched by the transparent electrodes 4 and 5. When the light passes through the liquid crystal 11 in this state, the light is deflected due to diffraction phenomenon. Due to use of the driving signal having a low frequency, the deflection angle of the light in a direction can be varied at a constant velocity, at a constant angular velocity and at a velocity varied at random. In addition, due to use of the driving signal having a high frequency, the deflection angle of the light in a direction perpendicular to the direction of the case of the low frequency can be varied at a constant velocity, at a constant angular velocity and at a velocity at random.

A description will now be given of a first variation of transparent electrodes used in the deflection unit 2.

Figure 12A:
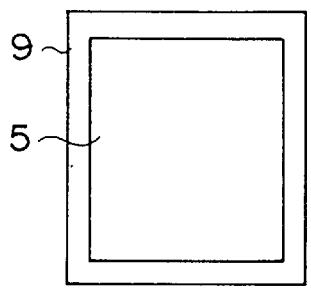
FIGS. 12A and 12B are diagrams illustrating a first variation of the transparent electrodes used in the deflection unit.
Figure 12B:
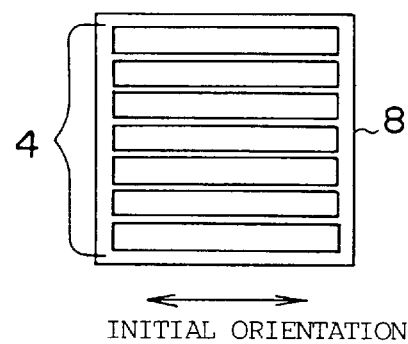

In the first variation, the transparent electrode 4 (one of the two transparent electrodes) is segmented into electrode-segments as shown in FIG. 12B. The electrode-segments are one-dimensionally arranged so as to extend in a direction parallel to the orientation direction of the liquid crystal 11. The transparent electrode 5 (the other of the two transparent electrodes) is a single electrode as shown in FIG. 12A.

Figure 12C:
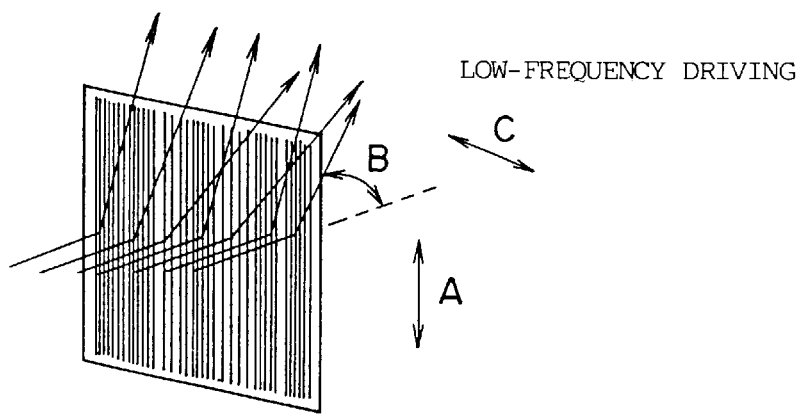
FIG. 12C is a diagram illustrating a state where the deflection unit having the transparent electrodes shown in FIGS. 12A and 12B is driven in the low-frequency driving manner.
Figure 12D:
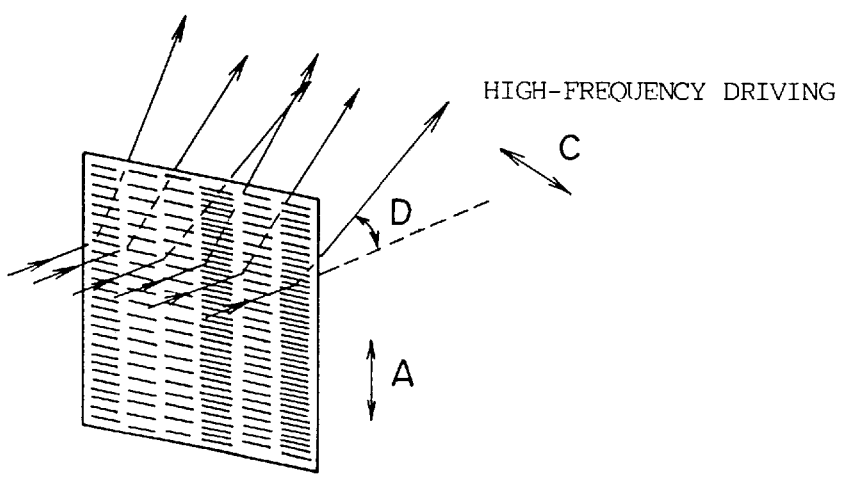
FIG. 12D is a diagram illustrating a state where the deflection unit having the transparent electrodes shown in FIGS. 12A and 12B is driven in the high-frequency driving manner.

When the driving signals having the low frequency (see FIG. 8(A), FIG. 9(A) and FIGS. 10A, 10B and 10C) are supplied to the electrode-segments of the transparent electrode 4 (the DC driving manner) such that the voltage levels of the electrode-segments are different from each other, deflected light beams travel at different deflection angles in the direction B (corresponding to the direction C) as shown in FIG. 12C. When the driving signals having the high frequency (see FIG. 8(B), FIG. 9(B) and FIGS. 11A, 11B and 11C) are supplied to the electrode-segments of the transparent electrode 4 (the AC driving manner) such that the voltage levels of the electrode-segments are different from each other, deflected light beams travel at different deflection angles in the direction D (corresponding to the direction A) as shown in FIG. 12D.

A description will now be given, with reference to FIGS. 13A, 13B, 13C and 13D, of a second variation of the transparent electrodes used in the deflection unit 2.

Figure 13A:
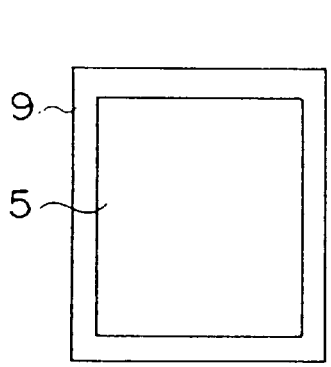
FIGS. 13A and 13B are diagrams illustrating a second variation of the transparent electrodes used in the deflection unit.
Figure 13B:
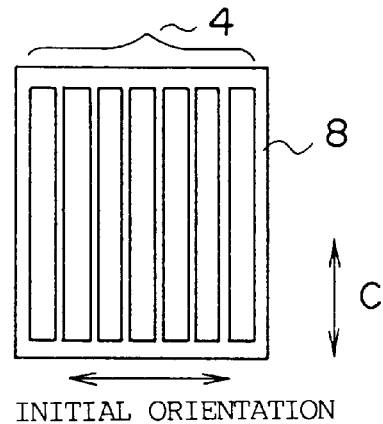

In the second variation, the transparent electrode 4 (one of the two transparent electrodes) is segmented into electrode-segments as shown in FIG. 13B. The electrode-segments are one-dimensionally arranged so as to extend in a direction perpendicular to the orientation direction (the direction A) of the liquid crystal 11. The transparent electrode 5 (the other of the two transparent electrodes) is a single electrode as shown in FIG. 13A.

Figure 13C:
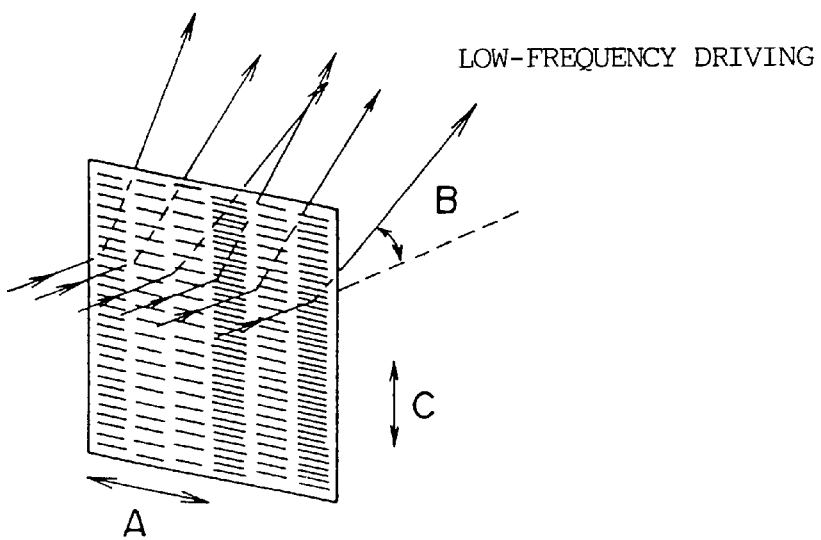
FIG. 13C is a diagram illustrating a state where the deflection unit having the transparent electrodes shown in FIGS. 13A and 13B is driven in the low-frequency driving mode.

When the driving signals having the low frequency (see FIG. 8(A), FIG. 9(A) and FIGS. 10A, 10B and 10C) are supplied to the electrode-segments of the transparent electrode 4, the light incident on the deflection unit 2 can be deflected so that deflected light beams scan in the direction B (corresponding to the direction C) as shown in FIG. 13C.

Figure 13D:
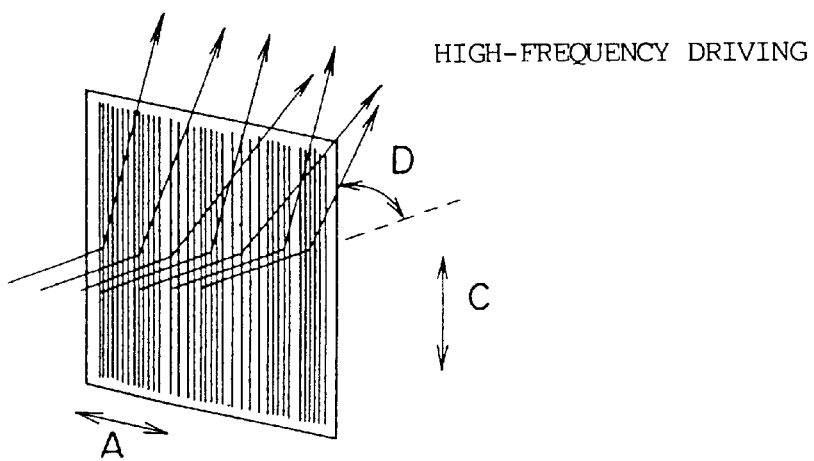
FIG. 13D is a diagram illustrating a state where the deflection unit having the transparent electrodes shown in FIGS. 13A and 13B is driven in the high-frequency driving mode.

When the driving signals having the high frequency (see FIG. 8(B), FIG. 9(B) and FIGS. 11A, 11B and 11C) are supplied to the electrode-segments of the transparent electrode 4, the light incident on the deflection unit 2 can be deflected so that deflected light beams scans in the direction D (corresponding to the direction A) as shown in FIG. 13D.

A description will now be given, with reference to FIGS. 14A, 14B, 14C and 14D, of a third variation of the transparent electrodes of the deflection unit 2.

Figure 14A:
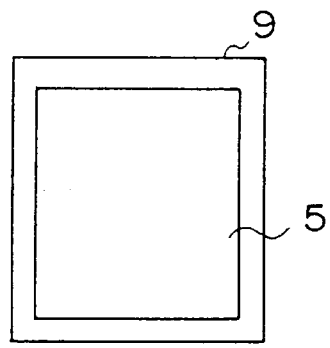
FIGS. 14A and 14B are diagrams illustrating a third variation of the transparent electrodes used in the deflection unit.
Figure 14B:
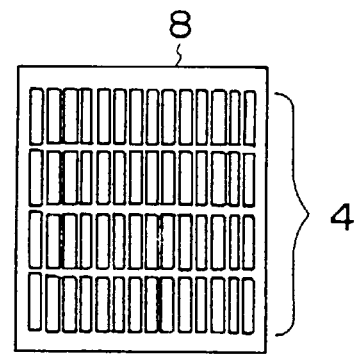

In the third variation, the transparent electrode 4 (one of the two transparent electrodes) is segmented into electrode-segments as shown in FIG. 14B. The electrode-segments are two-dimensionally arranged in the directions A and C which are perpendicular to each other. The transparent electrode 5 (the other of the two transparent electrodes) is a single electrode as shown in FIG. 14A.

Figure 14C:
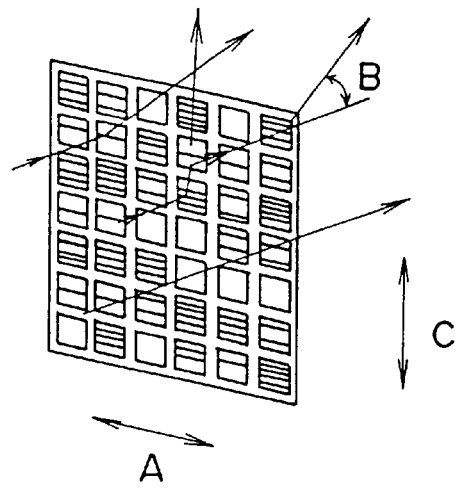
FIG. 14C is a diagram illustrating a state where the deflection unit having the transparent electrodes shown in FIGS. 14A and 14B is driven in the low-frequency driving manner.

The driving signals having the low frequency (see FIG. 8(A), FIG. 9(A) and FIGS. 10A, 10B and 10C) may be applied to the electrode-segments of the transparent electrode 4 (the DC driving manner). In this case, the incident light is deflected by respective parts of the liquid crystal corresponding to the electrode-segments of the transparent electrode 4 and deflected light beams scan in the direction B (corresponding to the direction C) as shown in FIG. 14C.

Figure 14D:
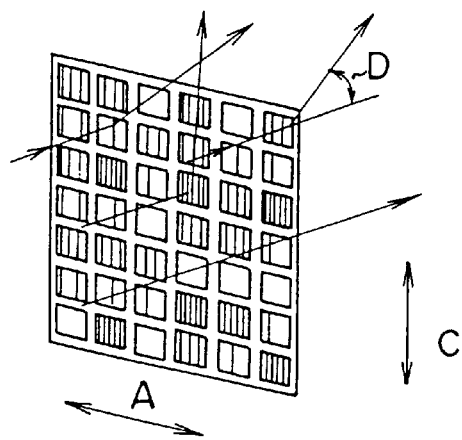
FIG. 14D is a diagram illustrating a state where the deflection unit having the transparent electrodes shown in FIGS. 14A and 14B is driven in the high-frequency driving manner.

The driving signals having the high frequency (see FIG. 8(B), FIG. 9(B) and FIGS. 11A, 11B and 11C) may be applied to the electrode-segments of the transparent electrode 4 (the AC driving manner). In this case, the incident light is deflected by parts of liquid crystal 11 corresponding to the electrode-segments of the transparent electrode 4 and deflected light beams scan in the direction D (corresponding to the direction A) as shown in FIG. 14D.

FIGS. 15A and 15B show a fourth variation of the transparent electrodes. In the fourth variation, both the transparent electrodes 4 and 5 are respectively segmented into electrode-segments as shown in FIGS. 15A and 15B. The electrode-segments are one-dimensionally arranged in a direction parallel to the orientation direction. Due to use of the transparent electrodes 4 and 5 as shown in FIGS. 15A and 15B, the deflection of the light and the scanning of deflected light beams can be performed in the same manner as in the cases shown in FIGS. 14C and 14D.

FIGS. 16A and 16B show a fifth variation of the transparent electrodes. In the fifth variation, the transparent electrode 4 segmented into electrode-segments as shown in FIG. 16B and the transparent electrode 5 segmented into electrode-segments as shown in FIG. 16A are mounted in the deflection unit 2 so that the electrode-segments of the transparent electrode 4 and the electrode-segments of the transparent electrode 5 extend in directions perpendicular to each other. When the deflection unit 2 having the transparent electrodes 4 and 5 as shown in FIGS. 16A and 16B is driven, portions having stripes arranged at different space-frequencies are formed in the liquid crystal 11 as shown in FIGS. 14C and 14D.

According to the above structures of the transparent electrodes 4 and 5, a number of address lines from the electrode-segments of the transparent electrodes is less than a number of address lines from the electrode-segments of the transparent electrodes shown in FIGS. 14A and 14B. Thus, the number of pixels in the deflection unit 2 can be easily increased.

Figure 17A:
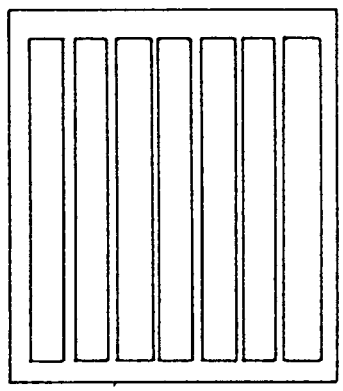
FIGS. 17A and 17B are diagrams illustrating a sixth variation of the transparent electrodes used in the deflection unit.
Figure 17B:
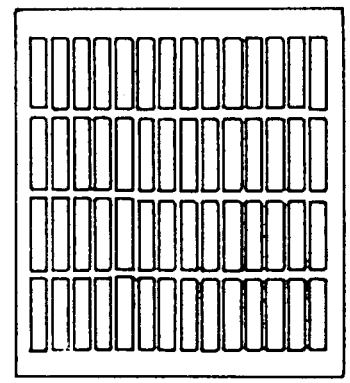

FIGS. 17A and 17B show a sixth variation of the transparent electrodes 4 and 5. The transparent electrode 4 is segmented into electrode-segments which are two-dimensionally arranged as shown in FIG. 17B. The transparent electrode 5 is segmented into electrode-segments which are one-dimensionally arranged as shown in FIG. 17A.

Based on combination of driving signals supplied to the electrode-segments of the transparent electrodes 4 and 5, stripes having different space-frequencies are formed in parts of the liquid crystal corresponding to the respective electrode-segments. Due to use of the transparent electrodes 4 and 5 having the structures shown in FIGS. 17B and 17A, complex deflection control of the light can be performed.

Figure 18A:
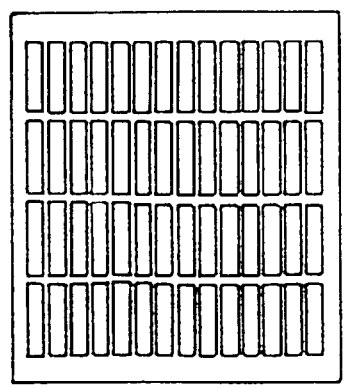
FIGS. 18A and 18B are diagrams illustrating a seventh variation of the transparent electrodes used in the deflection unit.
Figure 18B:
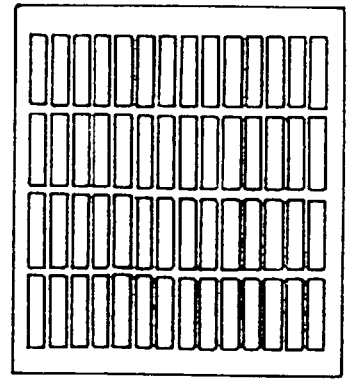

FIGS. 18A and 18B show a seventh variation of the transparent electrodes 4 and 5. Both the transparent electrodes 4 and 5 are segmented into electrode-segments which are two-dimensionally arranged as shown in FIGS. 18B and 18A. Based on combination of driving signals supplied to the electrode-segments of the transparent electrodes 4 and 5, stripes having different space-frequencies are formed in parts of the liquid crystal corresponding to the respective electrode-segments. According to the seventh variation of the transparent electrodes 4 and 5 having structures as shown in FIGS. 18B and 18A, complex deflection control of the light can be performed.

The optical deflection apparatuses having the deflection units provided with the transparent electrodes according to the third variation to the seventh variation can be applied to a two-dimensional optical switch in which optical switches are stacked.

A description will now be given of a second embodiment of the present invention.

The optical deflection apparatus according to the second embodiment of the present invention is shown in FIG. 19. In FIG. 19, those parts which are the same as those shown in FIG. 3 are given the same reference numbers.

The optical deflection apparatus 21 shown in FIG. 19 operates as a cylindrical lens. Referring to FIG. 19, the optical deflection apparatus 21 is formed of the deflection unit 22 and the driving unit 33 in the same manner as in the first embodiment (see FIG. 3). The deflection unit 22 has the glass plate 8 provided with the transparent electrode 23 and the orientation film 25, the glass plate 9 provided with the transparent electrode 23 and the orientation film 26, the spacers 10 and the liquid crystal 11 and is formed in the same manner as in the first embodiment (see FIG. 3). The driving unit 33 supplies driving signals to the transparent electrodes 23 and 24.

Figure 23:
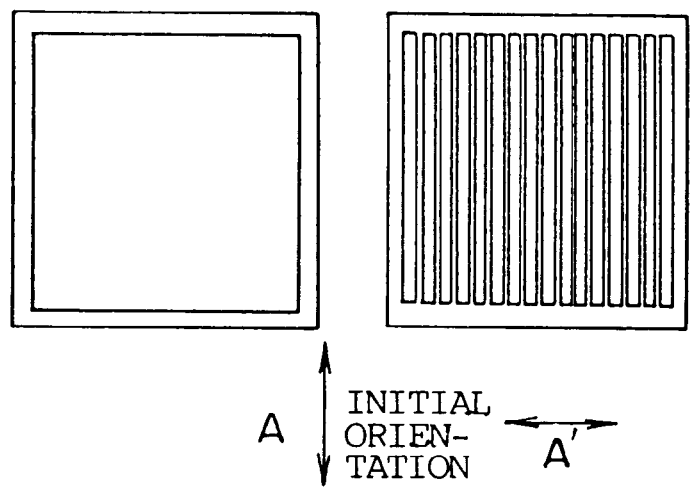
FIG. 23 is a diagram illustrating transparent electrodes used in the deflection unit shown in FIG. 19.

The transparent electrodes are formed as shown in FIG. 23. Referring to FIG. 23, the transparent electrode 23 is segmented into electrode-segments which are one-dimensionally arranged. The electrode-segments extend in a direction parallel to or perpendicular to the orientation direction (A or A'). The transparent electrode 24 is a single electrode.

The deflection unit provided with the transparent electrodes 23 and 24 having the structure as shown in FIG. 23 can be applied to the one-dimensional optical switch.

The driving unit 33 supplies driving signals to the respective electrode-segments of the transparent electrode 23 as follows.

Figure 20:
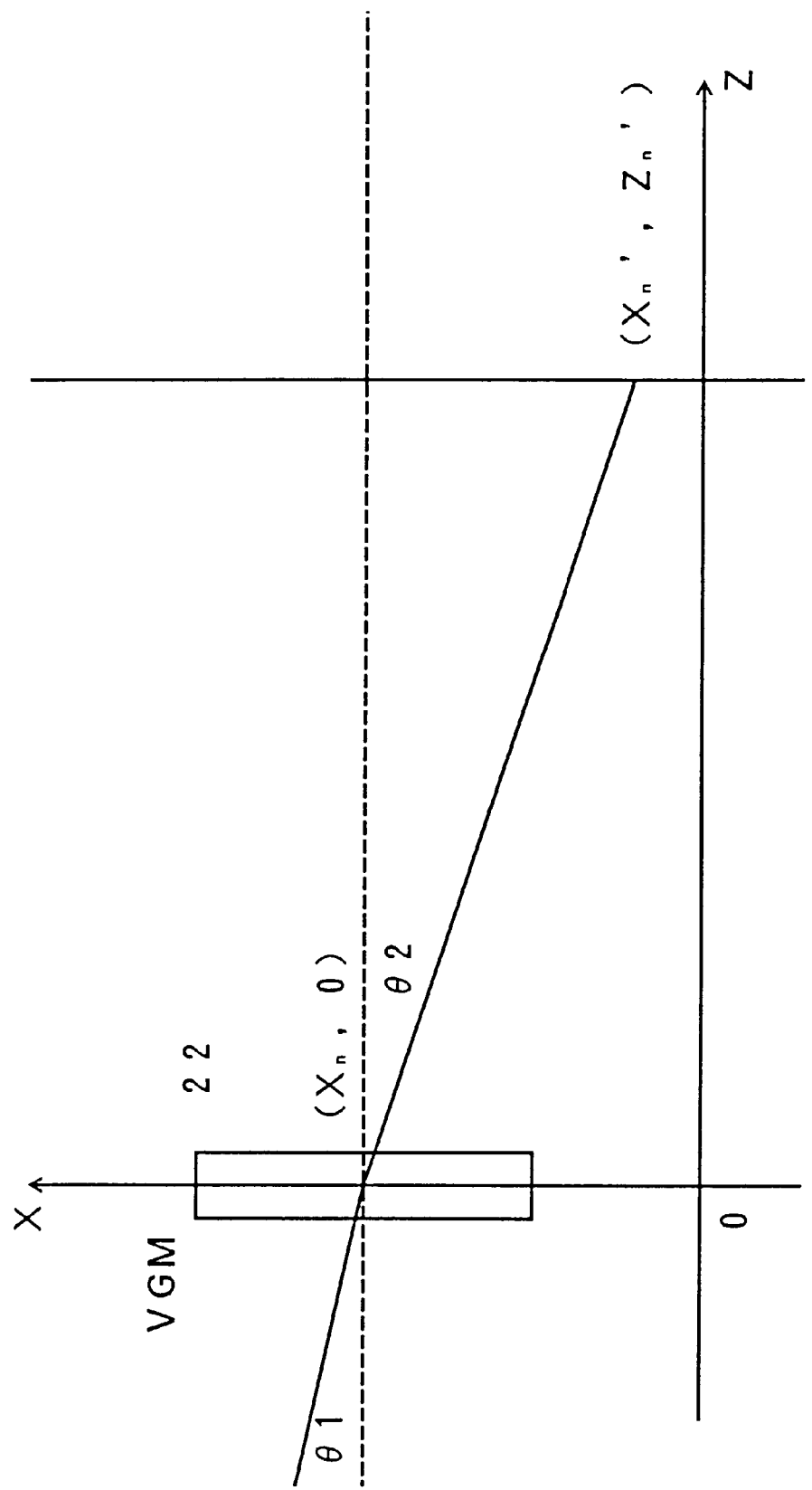
FIG. 20 is a diagram illustrating light deflected by a grating formed in a deflection unit of the optical deflection apparatus shown in FIG. 19.
Figure 21A:
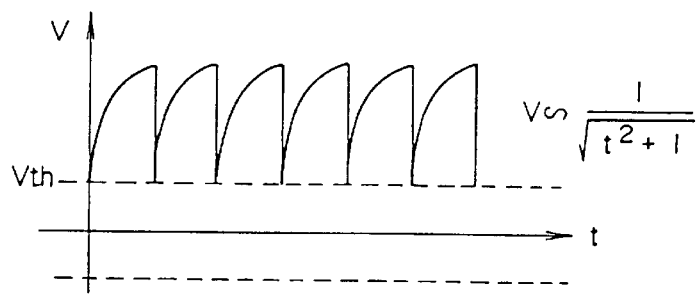
FIGS. 21(A)–21(D) are a waveform diagram illustrating waveforms of driving signals (voltages) used to drive the deflection unit in the low-frequency driving manner.
Figure 21B:
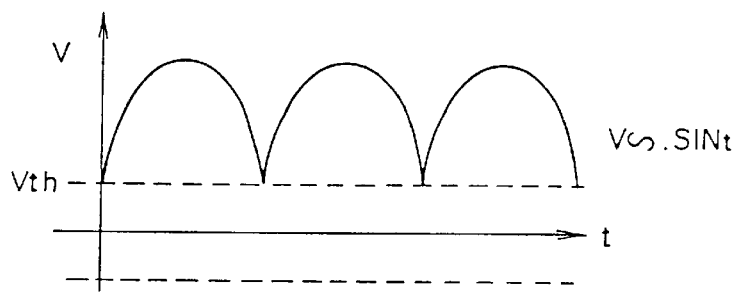
Figure 21C:
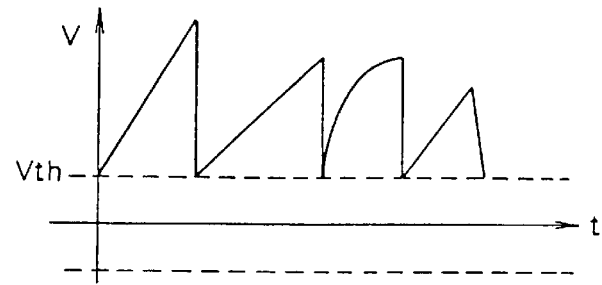
Figure 21D:
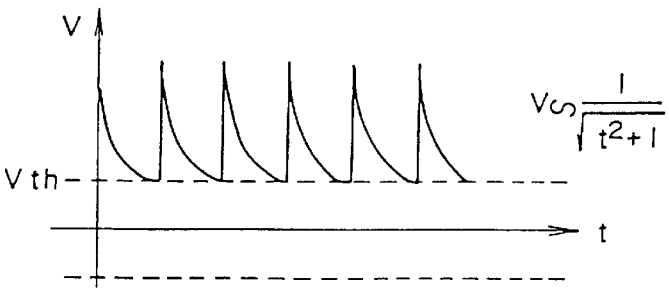
Figure 22A:
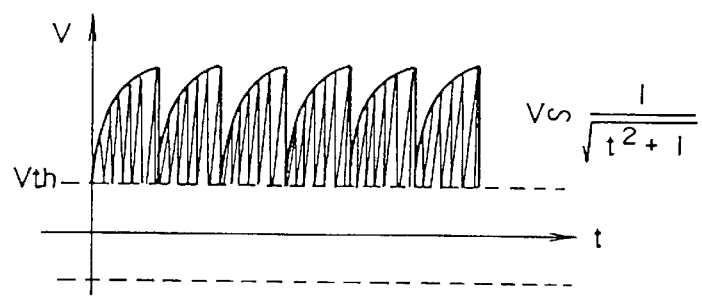
FIGS. 22(A)–22(D) are a waveform diagram illustrating waveforms of driving signals (voltages) used to drive the deflection unit in the high-frequency driving manner.
Figure 22B:
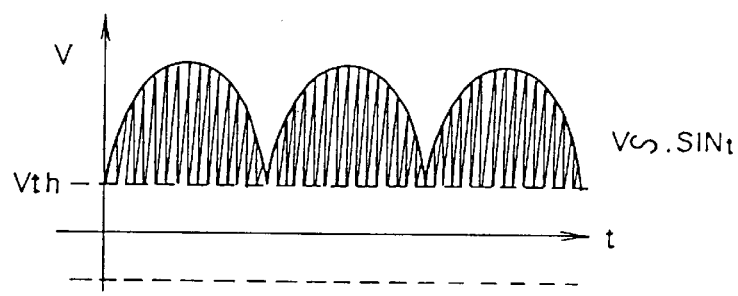
Figure 22C:
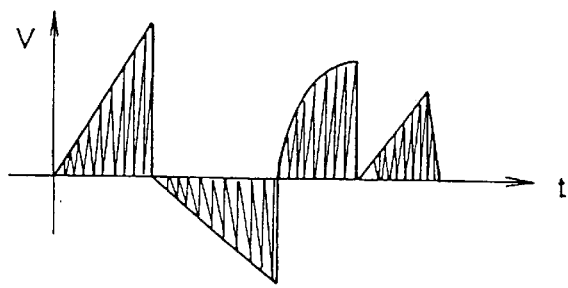
Figure 22D:
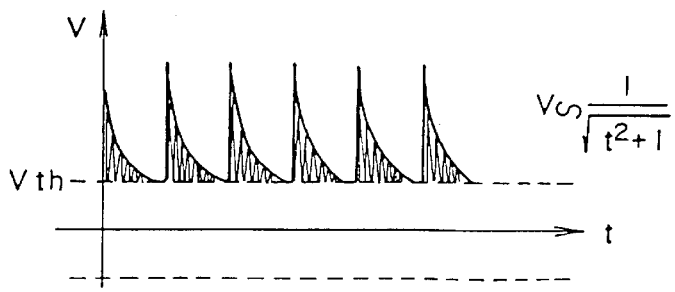

FIG. 20 shows a state in which light is incident on a grating at an angle $\theta_1$, the grating being generated in a part of the liquid crystal 11 corresponding to an n-th segment of the transparent electrode. The relationship between the angle $\theta_1$ of incidence and the deflection angle $\theta_{2n}$ in the n-th grating in which stripes are formed at a space-frequency $f_s$ is represented by the following equation.

$$\sin\theta_1 + \sin\theta_{2n} = f_s \lambda \quad (4\text{-}1)$$

($\lambda$: wavelength)

Since the space-frequency $f_s$ is in proportion to an applied voltage V, the space-frequency $f_s$ can be represented by $$f_s = k\, V \quad (4\text{-}2)$$

where k is a constant. Thus, the above equation (4-1) can be transformed to $$\sin\theta_1 + \sin\theta_{2n} = k'\, v \quad (4\text{-}3)$$

where k' is equal to k$\lambda$ (k'=k$\lambda$).

As shown in FIG. 20, light diffracted by the n-th grating $P_n$ (corresponding to the n-th segment of the transparent electrode) positioned at $(X_n, 0)$ is slit-shaped and focused at a focal point $Q_n$ $(X_n', Z_n')$. In this case, the following equation can be obtained.

$$\sin\theta_{2n} = (X_n, X_n')/[Z_n'^2 + (X_n, X_n')^2]^{1/2} \quad (4\text{-}4)$$

Thus, the voltage V is represented by the following equation:

$$V = k''[\sin\theta_1 + (X_n, X_n')/[Z_n'^2 + (X_n, X_n')^2]^{1/2}] \quad (4\text{-}5)$$

where k" is equal to 1/k' (k"=1/K').

A description will now be given of the following cases where:

1-1) The focal point of the light output from the grating $P_n$ moves at a constant velocity in a direction perpendicular to a direction from the grating toward the focal surface (hereinafter, the direction from the grating toward the focal surface is referred to as a focus direction);

1-2) The focal point of the light output from the grating $P_n$ moves at a constant angular velocity in a direction perpendicular to the focus direction;

1-3) The focal point of the light output from the grating $P_n$ moves at random on in a direction perpendicular to the focus direction;

2-1) The focal point of the light moves at a constant velocity in a direction parallel to the focus direction;

2-2) The focal point of the light moves at random in a direction parallel to the focus direction; and 3-1) The focal point of the light moves at random in points of time and space.

In the case 1-1), the following control signal V is supplied to the n-th grating $P_n$.

As shown in FIG. 20, a coordinate system has a Z axis (direction) corresponding to the direction parallel to the focus direction and an X axis (direction) corresponding to the direction perpendicular to the focus direction. In the case 1-1) where a slit-shaped focus (a focal point) moves at a constant velocity in the X direction, the position $(X_n', Z_n')$ of the focal point can be represented by $$Z_n' = s \text{ (constant) and} \quad (4\text{-}6)$$

$$X_n' = ct. \quad (4\text{-}7)$$

Substituting the above equations (4-6) and (4-7) for the equation (4-5), the control voltage V to be supplied to the n-th grating $P_n$ is obtained as follows.

$$V(X_n,t)=k''[\sin \theta_1+(X_n\cdot ct)/[s^2+(X_n\cdot ct)^2]^{1/2}] \quad (4\text{-}8)$$

In the case 1-2), the following control voltage V is supplied to the n-th grating $P_n$.

In this case, the focal point moves in the direction X perpendicular to the focus direction.

It is assumed that an optical axis passes through an m-th point (having an X-coordinate $X_m$), and the light deflected by stripes formed at this point moves at a constant angular velocity. In this case, the position $(X_n',Z_n7)$ of the focal point can be represented by $$Z_n'=s \text{ (constant)} \quad (4\text{-}9)$$

$$X_n'=s\tan\theta_{2m}=s\tan w_m t. \quad (4\text{-}10)$$

Substituting the above equations (4-9) and (4-10) for the equation (4-5), the control voltage V to be supplied to the n-th grating $P_n$ is obtained as follows.

$$V(X_n,t)=k''\left[\sin\theta_1+(X_n-s\tan w_m t)/[s^2+(X_n-s\tan w_m t)^2]^{1/2}\right] \quad (4\text{-}11)$$

In the case 1-3), the following control voltage V is supplied to the n-th grating $P_n$ When the focal point moves at a random speed in the direction X perpendicular to the focus direction, the position $(X_n',Z_n)$ of the focal point can be represented by $$Z_n'=s \text{ (constant)} \quad (4\text{-}12)$$

$$X_n'=R \text{ (a random value in point of time)}. \quad (4\text{-}13)$$

Substituting the above equations (4-12) and (4-13) of the equation (4-5), the control voltage V to be supplied to the n-th grating $P_n$ is obtained as follows.

$$V(X_n,t)=k''[\sin \theta_1+(X_n-R)/[s^2+(X_n-R)^2]^{1/2}] \quad (4\text{-}14)$$

In the case 2-1), the following control voltage V is supplied to the n-th grating $P_n$.

When the focal point moves at a constant velocity in the direction Z parallel to the focus direction, the position $(X_n',Z_n7)$ of the focal point can be represented by $$Z_n'=et \quad (4\text{-}15)$$

$$X_n'=u \text{ (constant)}. \quad (4\text{-}16)$$

Substituting the above equations (4-15) and (4-16) for the equation (4-5), the control voltage V to be supplied to the n-th grating $P_n$ is obtained as follows.

$$V(X_n,t)=k''[\sin \theta_1+(X_n-u)/[et^2+(X_n-u)^2]^{1/2}] \quad (4\text{-}17)$$

In the case 2-2), the following control voltage V is supplied to the n-th grating $P_n$.

When the focal point moves at random in the direction Z parallel to the focus direction, the position $(X_n',Z_n')$ of the focal position can be represented by $$Z_n'=R \text{ (a random value in point of time)} \quad (4\text{-}18)$$

$$X_n'=v \text{ (constant)}. \quad (4\text{-}19)$$

Substituting the above equations (4-18) and (4-19) for the equation (4-5), the control voltage V to be supplied to the n-th grating $P_n$ is obtained as follows.

$$V(X_n,t)=k''[\sin \theta_1+(X_n-v)/[R^2+(X_n-v)^2]^{1/2}] \quad (4\text{-}20)$$

In the case 3-1), the following control voltage V is supplied to the n-th grating $P_n$ When the focal point moves at random in points of time and space, the position $(X_n',Z_n')$ of the focal point can be represented by $$Z_n'=R_z \text{ (a random value in point of time)} \quad (4\text{-}21)$$

$$X_n'=R_x \text{ (a random value in point of time)}. \quad (4\text{-}22)$$

Substituting the above equations (4-21) and (4-22) for the equation (4-5), the control voltage V to be supplied to the n-th grating $P_n$ is obtained as follows.

$$V(X_n,t)=k''[\sin \theta_1+(X_n-R_x)/[R_z^2+(X_n-R_x)^2]^{1/2}] \quad (4\text{-}23)$$

A cylindrical lens made of glass functions as a convex lens or a concave lens in accordance with surface shapes. In the optical deflection apparatus in which variable stripe patterns are formed, due to changing of a distribution of voltages supplied to the gratings, a convex lens and a concave lens can be formed. As shown in FIG. 20, in a case where a coordinate $Z_n'$ of the focal point is positive, the convex cylindrical lens is formed. On the other hand, in a case where a coordinate $Z_n'$ of the focal point is negative, the concave cylindrical lens can be formed.

Figure 29A:
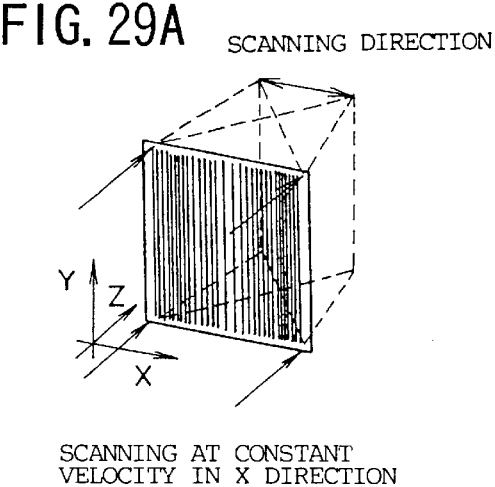
FIGS. 29A, 29B, 29C, 29D, 29E and 29F are diagrams illustrating examples of focus movement in a case where the deflection unit is driven so that a convex cylindrical lens is formed.
Figure 29B:
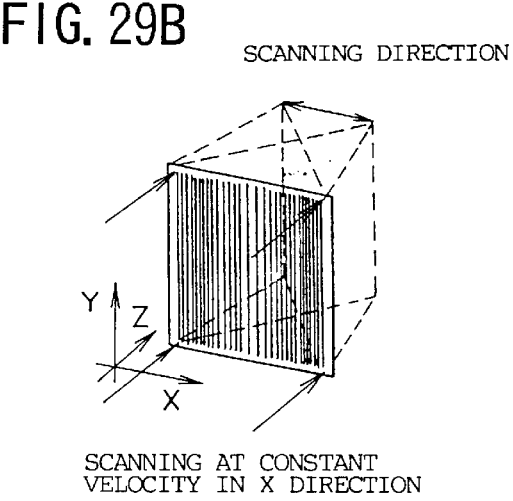
Figure 29C:
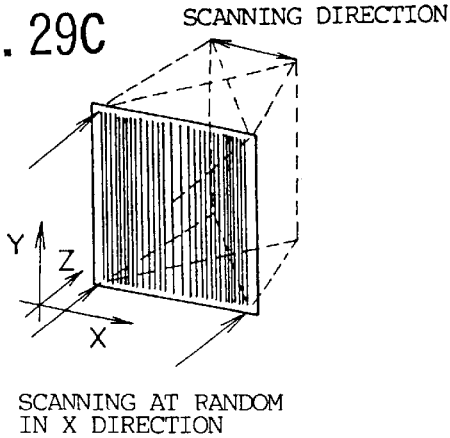

A direction of the initial orientation is parallel to the direction in which the electrode-segments of the transparent electrode are arranged, and the deflection unit is driven in the low-frequency driving manner (at a frequency less than a value within a range of 200 Hz to 300 Hz). The respective electrode-segments are provided with the control voltages V represented by the equation (4-8), (4-11) or (4-14). The control voltage V has one of waveforms as shown in FIG. 21 (A), (B), (C) and (D). As a result, the focal point moves at a constant velocity, at a constant angular velocity or at random in the direction X perpendicular to the focus direction, as shown in FIG. 29A, 29B or 29C.

Figure 29D:
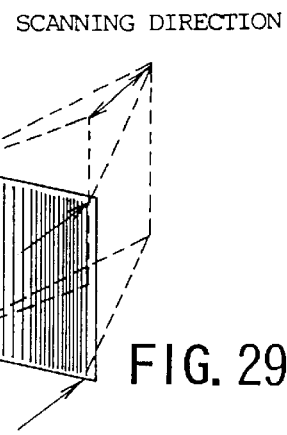
Figure 29E:
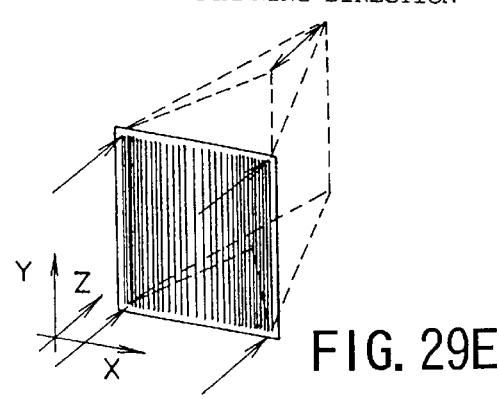

In addition, the control voltages represented by the equation (4-17)or (4-29)may be supplied to the respective electrode-segments. In this case, the focal point moves at a constant velocity or at random in the direction Z parallel to the focus direction, as shown in FIG. 29D or 29E.

Figure 29F:
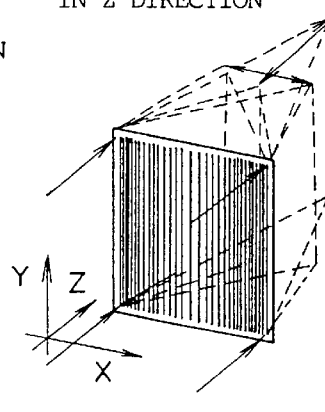

Further, the respective electrode-segments may be provided with the control voltages represented by the equation (4-23). In this case, the focal point moves at random in points of time and space, as shown in FIG. 29F.

The direction of the initial orientation is perpendicular to the direction in which the electrode-segments are arranged, and the deflection unit is driven in the low-frequency manner so that the concave cylindrical lens is formed. The respective electrode-segments may be provided with the control voltages represented by the equation (4-8), (4-11) or (4-14). In this case, the focal point moves at a constant velocity, at a constant angular velocity or at random in the direction X perpendicular to the focus direction, as shown in FIG. 30A, 30B or 30C.

In the case where the deflection unit is driven in the low-frequency driving manner so that the concave cylindrical lens is formed, the control voltages represented by the equation (4-17) or (4-20) may be supplied to the electrode-segments. In this case, the focal point moves at a constant velocity or at random in the direction Z parallel to the focus direction, as shown in FIG. 30D or 30E.

In the case where the optical deflection apparatus is driven in the low-frequency driving manner so that the concave cylindrical lens is formed, the control voltages represented by the equation (4-23) may be supplied to the electrode-segments. In this case, the focal point moves at random in points of time and space, as shown in FIG. 30F.

The direction of the initial orientation is parallel to the direction in which the electrode-segments are arranged, and the deflection unit is driven in the high-frequency driving manner so that the convex cylindrical lens is formed. In this case, when the control voltages represented by equation (4-8), (4-11) or (4-14) are supplied to the electrode-segments, the focal point moves at a constant velocity, a constant angular velocity or at random in the direction X perpendicular to the focus direction, as shown in FIG. 29A, 29B or 29C.

In the case where the deflection unit is driven in the high-frequency driving manner so that the convex cylindrical lens is formed, the control voltages represented by the equation (4-17) or (4-20) may be supplied to the electrode-segments. In this case, the focal point moves at a constant velocity or at random in the direction Z parallel to the focus direction, as shown in FIG. 29D or 29E.

In the case where the deflection unit is driven in the high-frequency driving manner so that the convex cylindrical lens is formed, the control voltages represented by the equation (4-23) may be supplied to the electrode-segments. In this case, the focal point moves at random in points of time and space, as shown in FIG. 29F.

The direction of the initial orientation is parallel to the direction in which the electrode-segments are arranged, and the deflection unit is driven in the high-frequency driving manner (at a high frequency greater than a value within a range of 200 Hz to 300 Hz) so that the concave cylindrical lens is formed. In this case, when the respective electrode-segments are provided with the control voltages represented by the equation (4-8), (4-11) or (4-14), the focal point moves at a constant velocity, a constant angular velocity or at random in the direction X perpendicular to the focus direction, as shown in FIG. 30A, 30B or 30C.

In the case where the deflection unit is driven in the high-frequency driving manner so that the concave cylindrical lens is formed, the control voltages represented by the equation (4-17) or (4-20) may be supplied to the electrode-segments. In this case, the focal point moves at a constant velocity or at random in the direction Z parallel to the focus direction, as shown in FIG. 30D or 30E.

In the case where the deflection unit is driven in the high-frequency driving manner so that the concave cylindrical lens is formed, the control voltages represented by the equation (4-23) may be supplied to the electrode-segments. In this case, the focal point moves at random in points of time and space, as shown in FIG. 30F.

Figure 24:
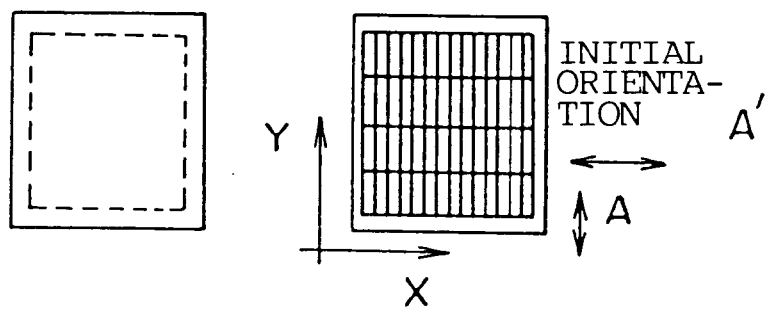
FIG. 24 is a diagram illustrating a first variation of the transparent electrodes used in the deflection unit.

The transparent electrode 23 may be segmented into electrode-segments which are two-dimensionally arranged as shown in FIG. 24. The initial orientation of the liquid crystal 11 has a single direction parallel to a direction indicated by A or A' in FIG. 24. In a case where the deflection unit is driven in the low-frequency driving manner, the initial orientation has a direction parallel to the longitudinal direction A. In a case where the deflection unit is driven in the high-frequency driving manner, the initial orientation has a direction parallel to the lateral direction A'. The same control voltage is applied to electrode-segments arranged in each column out of the two-dimensionally arranged electrode-segments and different control voltages are supplied to electrode-segments in each row, and a line-shaped focus (a focal point) is formed as shown in FIGS. 29A to 29F.

The deflection unit having the transparent electrodes described above is driven in the low-frequency driving manner so that the convex cylindrical lens is formed. The same control voltage is supplied to the electrode-segments arranged in the direction parallel to the initial orientation (the longitudinal direction) and the electrode-segments arranged in the direction perpendicular to the initial orientation (the lateral direction) are provided with the control voltages represented by the equation (4-8), (4-11) or (4-14). In this case, the focal point moves at a constant velocity, a constant angular velocity or at random in the direction X perpendicular to the focus direction, as shown in FIG. 29A, 29B or 29C.

The deflection unit is driven in the low-frequency driving manner so that the convex cylindrical lens is formed. The same control voltage is supplied to the electrode-segments arranged in the direction parallel to the initial orientation and the control voltages represented by the equation (4-17) or (4-20) are supplied to the electrode-segments arranged in the direction perpendicular to the initial orientation. In this case, the focal point moves at a constant velocity or at random in the direction Z parallel to the focus direction, as shown in FIGS. 29D and 29E.

The deflection unit is driven in the low-frequency driving manner so that the convex cylindrical lens is formed. The same control voltage is supplied to the electrode-segments arranged in the direction parallel to the initial orientation (the longitudinal direction) and the electrode-segments arranged in the direction perpendicular to the initial orientation are provided with the control voltages represented by the equation (4-23). In this case, the focal position moves at random in points of time and space, as shown in FIG. 29F.

The deflection unit is driven in the low-frequency driving manner so that the concave cylindrical lens is formed. The same control voltage is supplied to the electrode-segments arranged in the direction parallel to the initial orientation and the electrode-segments arranged in the direction perpendicular to the initial orientation are provided with the control voltages represented by the equation (4-8), (4-11) or (4-14). In this case, the focal position moves at a constant velocity, at a constant angular velocity or at random in the direction Z parallel to the focus direction, as shown in FIG. 30A, 30B or 30C.

The deflection unit is driven in the low-frequency driving manner so that the concave cylindrical lens is formed. The same control voltage is supplied to the electrode-segments arranged in the direction parallel to the initial orientation and the electrode-segments arranged in the direction perpendicular to the initial orientation are provided with the control voltages represented by the equation (4-17) or (4-20). In this case, the focal position moves at a constant velocity or at random in the direction Z parallel to the focus direction, as shown in FIG. 30D or 30E.

The deflection unit is driven in the low-frequency driving manner so that the concave cylindrical lens is formed. The same control voltage is supplied to the electrode-segments arranged in the direction parallel to the initial orientation and the electrode-segments arranged in the direction perpendicular to the initial orientation are provided with the control voltages represented by the equation (4-23). In this case, the focal point moves at random in points of time and space, as shown in FIG. 30F.

The deflection unit is driven in the high-frequency driving manner so that the convex cylindrical lens is formed. The same control voltage is supplied to the electrode-segments arranged in the direction perpendicular to the initial orientation and the control voltages represented by the equation (4-8), (4-11) or (4-14) are supplied to the segment arranged in the direction parallel to the initial orientation. In this case, the focal point moves at a constant velocity, at a constant angular velocity or at random in the direction X perpendicular to the focus direction, as shown in FIG. 29A, 29B or 29C.

The deflection unit is driven in the high-frequency driving manner so that the convex cylindrical lens is formed. The same control voltage is supplied to the electrode-segments arranged in the direction perpendicular to the initial orientation and the control voltages represented by the equation (4-17) or (4-20) are supplied to the electrode-segments arranged in the direction parallel to the initial orientation. In this case, the focal point moves at a constant or at random in the direction Z parallel to the focus direction, as shown in FIG. 29D and 29E.

The deflection unit is driven in the high-frequency driving manner so that the convex cylindrical lens is formed. The same control voltage is supplied to the electrode-segments arranged in the direction perpendicular to the initial orientation and the control voltages represented by the equation (4-23) are supplied to the electrode-segments arranged in the direction parallel to the initial orientation. In this case, the focal point moves at random in points of time and space, a shown in FIG. 29F.

The deflection unit is driven in the high-frequency driving manner so that the concave cylindrical lens is formed. The same control voltage is supplied to the electrode-segments arranged in the direction perpendicular to the initial orientation and the control voltages represented by the equation (4-8), (4-11) or (4-14)are supplied to the electrode-segments arranged in the direction parallel to the initial orientation. In this case, the focal point moves at a constant velocity, at a constant angular velocity or at random in the direction Z parallel to the focus direction, as shown in FIG. 30A, 30B or 30C.

The deflection unit is driven in the high-frequency driving manner so that the concave cylindrical lens is formed. The same control voltage is supplied to the electrode-segments arranged in the direction perpendicular to the initial orientation and the control voltages represented by the equation (4-17) or (4-20) are supplied to the electrode-segments arranged in the direction parallel to the initial orientation. In this case, the focal point moves at a constant velocity or at random in the direction Z parallel to the focus direction, as shown in FIG. 30D or 30E.

The deflection unit is driven in the high-frequency driving manner so that the concave cylindrical lens is formed. The same control voltage is supplied to the electrode-segments arranged in the direction perpendicular to the initial orientation and the control voltages represented by the equation (4-23) are supplied to the electrode-segments arranged in the direction parallel to the initial orientation. In this case, the focal point moves at random in points of time and space, as shown in FIG. 30F.

Figure 25:
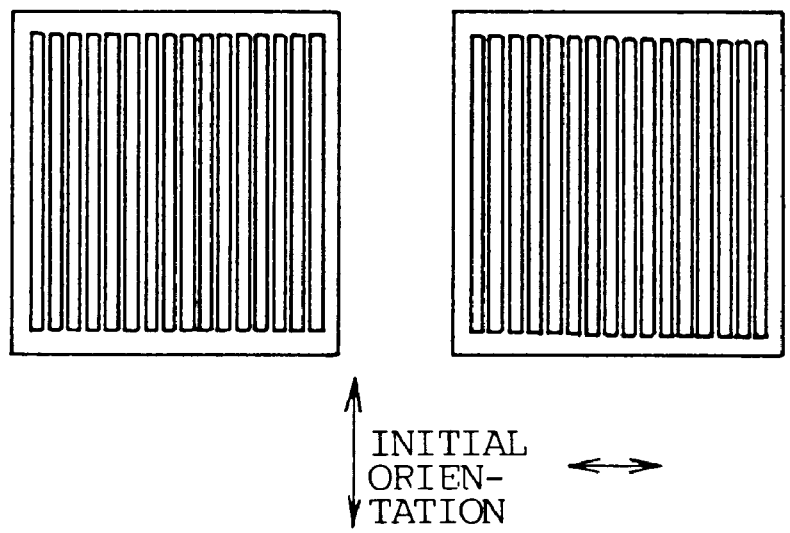
FIG. 25 is a diagram illustrating a second variation of the transparent electrodes used in the deflection unit.

Both the transparent electrodes 23 and 24 may be segmented into electrode-segments which are one-dimensionally arranged as shown in FIG. 25. The transparent electrodes 23 and 24 are mounted in the deflected unit 22 so that the electrode-segments are parallel to each other. The initial orientation of the liquid crystal has a single direction.

The driving signals having a low frequency as shown in FIGS. 8, 9, 10A, 10B and 10C are supplied to the electrode-segments of the transparent electrodes shown in FIG. 25 so that the convex cylindrical lens is formed. In this case, when the driving signals supplied to the electrode-segments of the transparent electrodes satisfy the equation (4-8), (4-11) or (4-14), the focal point moves at a constant velocity, at a constant angular velocity or at random in the direction X perpendicular to the focus direction, as shown in FIG. 29A, 29B or 29C.

In the case the deflection unit having the transparent electrodes as shown in FIG. 25 is driven in the low-frequency driving manner so that the convex cylindrical lens is formed, when the driving voltages represented by the equation (4-17) or (4-29)are supplied to the electrode-segments of the transparent electrodes, the focal point moves at a constant velocity or at random in the direction Z parallel to the focus direction, as shown in FIG. 29D or 29E.

In the case where the deflection unit is driven in the low-frequency driving manner so that the convex cylindrical lens is formed, when the driving voltages represented by the equation (4-23) are supplied to the electrode-segments of the transparent electrodes, the focal point moves at random in points of time and space.

The deflection unit having the transparent electrodes as shown in FIG. 25 may be driven in the low-frequency driving manner so that the concave cylindrical lens is formed. In this case, when the driving voltages represented by the equation (4-8), (4-11) or (4-14) are supplied to the electrode-segments, the focal point moves at a constant velocity, at a constant angular velocity or at random in the direction X perpendicular to the focus direction, as shown in FIG. 30A, 30B or 30C.

In the above case, when the driving voltages represented by the equation (4-17) or (4-20) are supplied to the electrode-segments, the focal point moves at a constant velocity or at random in the direction Z parallel to the focus direction, as shown in FIG. 30D or 30E.

In the above case, when the driving voltages represented by the equation (4-23) are supplied to the segments of the transparent electrodes, the focal point moves at random in points of time and space, as shown in FIG. 30F.

The deflection unit having the transparent electrodes as shown in FIG. 25 may be driven in the high-frequency driving manner so that the convex cylindrical lens is formed. In this case, when the driving voltages represented by the equation (4-8), (4-11) or (4-14)are supplied to the segment of the transparent electrodes, the focal point moves at a constant voltage, at a constant angular voltage or at random in the direction X perpendicular to the focus direction, as shown in FIG. 29A, 29B or 29C.

In the above case, when the driving voltages represented by the equation (4-17) or (4-20) are supplied to the electrode-segments, the focal point moves at a constant velocity or at random in the direction Z parallel to the focus direction, as shown in FIG. 29D or 29E.

In the above case, when the driving voltages represented by the equation (4-23)are supplied to the electrode-segments, the focal point moves at random in points of time and space, as shown in FIG. 29F.

The deflection unit having the initial orientation perpendicular to the direction in which the electrode-segments of the transparent electrodes as shown in FIG. 25 are arranged may be driven in the high-frequency driving manner so that the concave cylindrical lens is formed. In this case, when the driving voltages represented by the equation (4-8), (4-11) or (4-14)are supplied to the electrode-segments, the focal point moves at a constant velocity, at a constant angular velocity or at random in the direction X perpendicular to the focus direction, as shown in FIG. 30A, 30B or 30C.

In the above case, when the driving voltages represented by the equation (4-17) or (4-29) are supplied to the electrode-segments, the focal point moves at a constant velocity or at random in the direction Z parallel to the focus direction, as shown in FIG. 30D or 30E.

In the above case, when the driving voltages represented by the equation (4-23) are supplied to the electrode-segments, the focal point moves at random in points of time and space.

Figure 26:
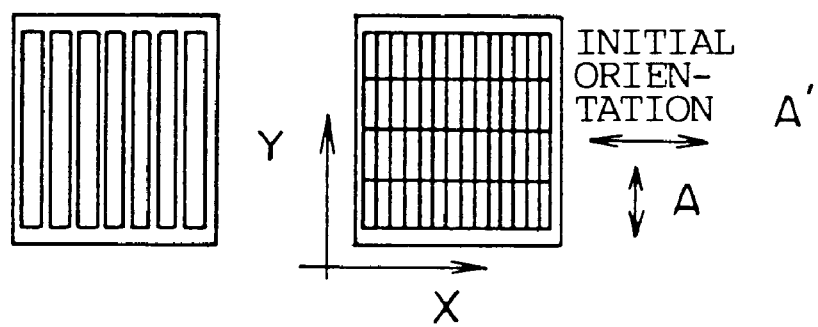
FIG. 26 is a diagram illustrating a third variation of the transparent electrodes used in the deflection unit.

The transparent electrode 23 may be segmented into electrode-segments which are two-dimensionally arranged and the transparent electrode 24 may be segmented into electrode-segments which are one-dimensionally arranged, as shown in FIG. 26. The initial orientation of the liquid crystal has a single direction indicated by A or A' in FIG. 26. In a case where the deflection unit in which the initial orientation of the liquid crystal has a direction A' (a lateral direction) is driven in the low-frequency driving manner, the same driving voltage is supplied to the electrode-segments arranged in a direction parallel a direction in which the electrode-segments of the transparent electrode 24 are one-dimensionally arranged. Hereinafter, the direction in which the electrode-segments are one-dimensionally arranged is referred to a one-dimensional arrangement direction. Further, the electrode-segments arranged in a direction perpendicular to the one-dimensional arrangement direction are provided with driving voltages so that a lens function acts in the direction perpendicular to the one-dimensional arrangement direction. In a case where the deflection unit in which the initial orientation of the liquid crystal has a direction A (a longitudinal direction) is driven in the low-frequency driving manner, the same driving voltage is supplied to the electrode-segments arranged in a direction perpendicular to the one-dimensional arrangement direction. Further, the segments arranged in a direction parallel to the one-dimensional arrangement direction are provided with driving voltages so that a lens function acts in the direction parallel to the one-dimensional arrangement direction.

In addition, in a case where the deflection unit in which the initial orientation of the liquid crystal has the direction A' is driven in the high-frequency driving manner, the same driving voltage is supplied to the electrode-segments arranged in the direction perpendicular to the one-dimensional arrangement direction. Further, the electrode-segments arranged in the direction parallel to the one-dimensional arrangement direction are provided with driving voltages so that a lens function acts in the direction parallel to the one-dimensional arrangement direction. In a case where the deflection unit in which the initial orientation of the liquid crystal has the direction A is driven in the high-frequency driving manner, the same driving voltage is supplied to the electrode-segments arranged in the parallel to the one-dimensional arrangement direction. Further, the electrode-segments arranged in the direction perpendicular to the one-dimensional arrangement direction are provided with driving voltages so that a lens function acts in the direction perpendicular to the one-dimensional arrangement direction.

Figure 31A:
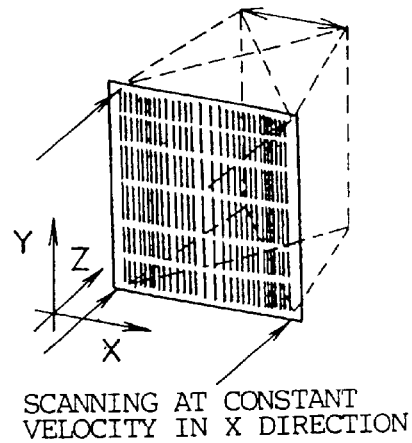
FIGS. 31A, 31B, 31C, 31D, 31E and 31F are diagrams illustrating examples of focus movement in a case where the deflection unit is driven so that the convex cylindrical lens is formed.
Figure 31B:
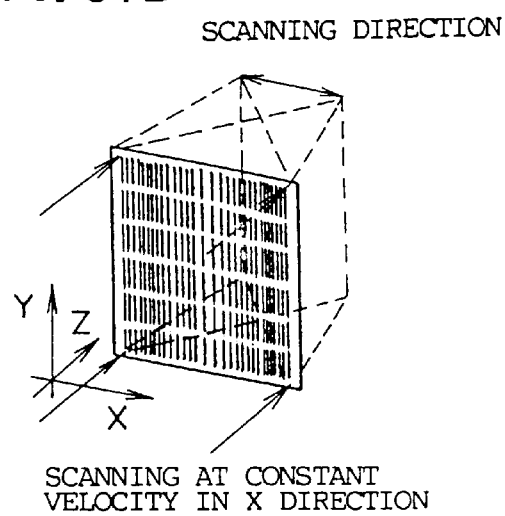
Figure 31C:
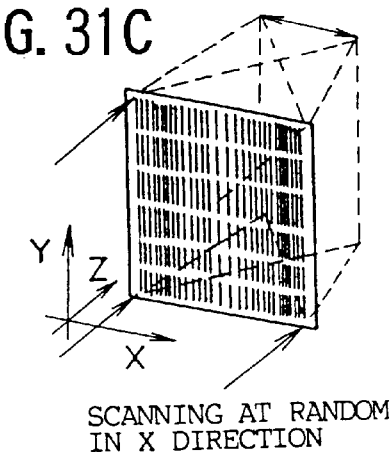

The deflection unit in which the initial orientation of the liquid crystal has the direction A' (the lateral direction) is driven in the low-frequency driving manner so that the convex cylindrical lens is formed. In this case, the same driving voltage is supplied to the electrode-segments arranged in the direction parallel to the direction A' of the initial orientation. Further, driving voltages represented by the equation (4-8), (4-11) or (4-14) are supplied to the segment arranged in the direction perpendicular to the direction A' of the initial orientation. As a result, the focal point moves at a constant velocity, at a constant angular velocity or at random in the direction perpendicular to the focus direction and perpendicular to the one-dimensional arrangement direction, as shown in FIG. 31A, 31B or 31C.

The deflection unit in which the initial orientation of the liquid crystal has the direction A (the longitudinal direction) is driven in the low-frequency driving manner so that the convex cylindrical lens is formed. In this case, the same driving voltage is supplied to the electrode-segments arranged in the direction parallel to the direction A of the initial orientation and driving voltages represented by the equation (4-8), (4-11) or (4-14) are supplied to the electrode-segments arranged in the direction perpendicular to the direction A of the initial orientation. As a result, the focal point moves at a constant velocity, at a constant angular velocity or at random in the direction perpendicular to the focus direction and parallel to the one-dimensional arrangement direction, as shown in FIG. 31A, 31B or 31C.

Figure 31D:
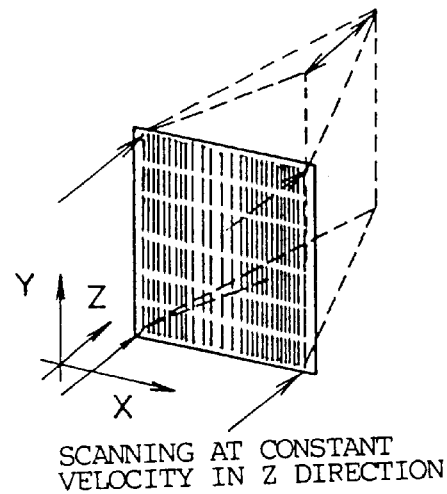
Figure 31E:
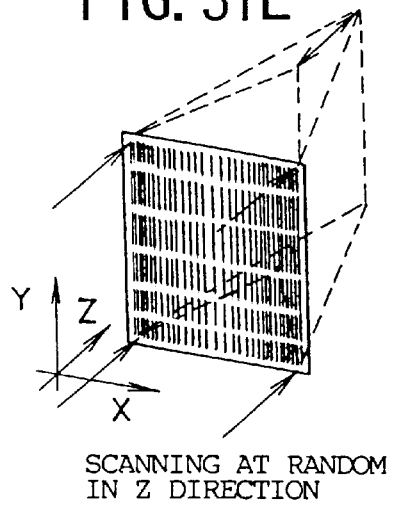

The deflection unit in which the initial orientation of the liquid crystal has the direction A' is driven in the low-frequency driving manner so that the convex cylindrical lens is formed. In this case, the same driving voltage is supplied to the electrode-segments arranged in the direction parallel to the direction A' of the initial orientation and driving voltages represented by the equation (4-17) or (4-20) are supplied to the electrode-segments arranged in the direction perpendicular to the direction A' of the initial orientation. As a result, the focal point moves at a constant velocity or at random in the direction Z parallel to the focus direction, as shown in FIG. 31D or 31E.

The deflection unit in which the initial orientation of the liquid crystal has the direction A is driven in the low-frequency driving mode so that the convex cylindrical lens is formed. In this case, the same driving voltage is supplied to the electrode-segments arranged in the direction parallel to the direction A of the initial orientation and driving voltages represented by the equation (4-17) or (4-20) are supplied to the electrode-segments arranged in the direction perpendicular to the direction A of the initial orientation. As a result, the focal point moves at a constant velocity or at random in the direction Z parallel to the direction toward to the focal surface, as shown in FIG. 31D or 31E.

Figure 31F:
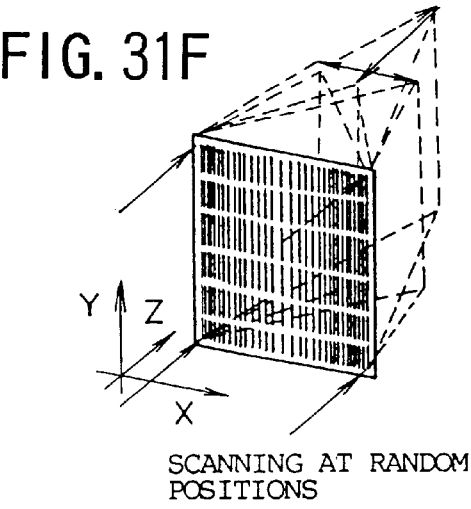

The deflection unit in which the initial orientation of the liquid crystal has the direction A' (the lateral direction) is driven in the low-frequency driving mode so that the convex cylindrical lens is formed. In addition, the deflection unit in which the initial orientation of the liquid crystal has the direction A (the longitudinal direction) is driven in the low-frequency driving manner. In these cases, the same driving voltage is supplied to the electrode-segments arranged in the direction parallel to the directions A' and A of the initial orientation and the driving voltages represented by the equation (4-23) are supplied to the electrode-segments arranged in the direction perpendicular to the directions A' and A of the initial orientation. As a result, the focal point moves at random in points of time and space, as shown in FIG. 31F.

Figure 32A:
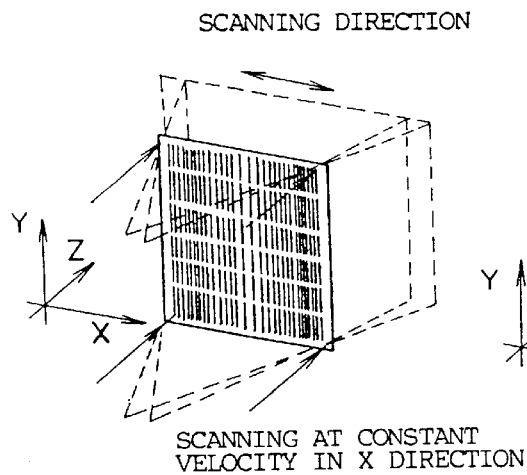
FIGS. 32A, 32B, 32C, 32D, 32E and 32F are diagrams illustrating examples of focus movement in a case where the deflection unit is driven so that the concave cylindrical lens is formed.
Figure 32B:
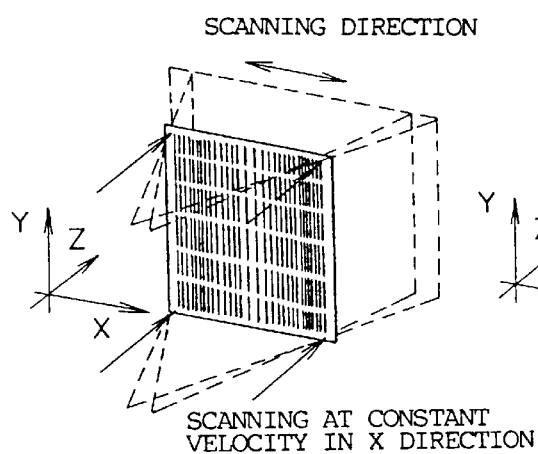
Figure 32C:
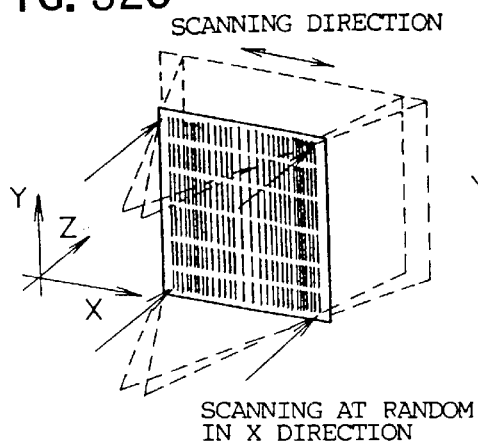

The deflection unit in which the initial orientation of the liquid crystal has the direction A' is driven in the low-frequency driving manner so that the concave cylindrical lens is formed. In this case, the same driving voltage is supplied to the electrode-segments arranged in the direction (the lateral direction) parallel to the direction A' of the initial orientation and the driving voltages represented by the equation (4-8), (4-11) or (4-14) are supplied to the electrode-segments arranged in the direction (the longitudinal direction) perpendicular to the direction A' of the initial orientation. As a result, the focal point moves at a constant velocity, at a constant angular velocity or at random in the direction perpendicular to the focus direction and perpendicular to the one-dimensional arrangement direction (parallel to the direction A' of the initial orientation), as shown in FIG. 32A, 32B or 32C.

The deflection unit in which the initial orientation of the liquid crystal has the direction A is driven in the low-frequency driving manner so that the concave cylindrical lens is formed. In this case, the same driving voltage is supplied to the electrode-segments arranged in the direction (the longitudinal direction) parallel to the direction A of the initial orientation and the driving voltages represented by the equation (4-8), (4-11) or (4-14)are supplied to the electrode-segments arranged in the direction (the lateral direction) perpendicular to the direction A of the initial orientation. As a result, the focal point moves at a constant velocity, at a constant angular velocity or at random in the direction perpendicular to the focus direction and parallel to the one-dimensional direction (perpendicular to the direction A of the initial orientation), as shown in FIG. 32A, 32B or 32C.

Figure 32D:
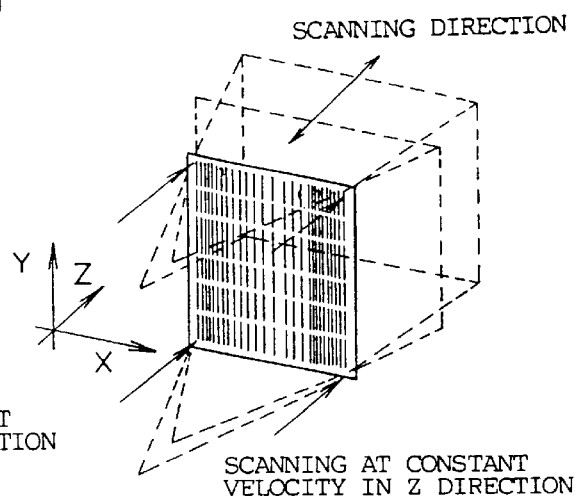
Figure 32E:
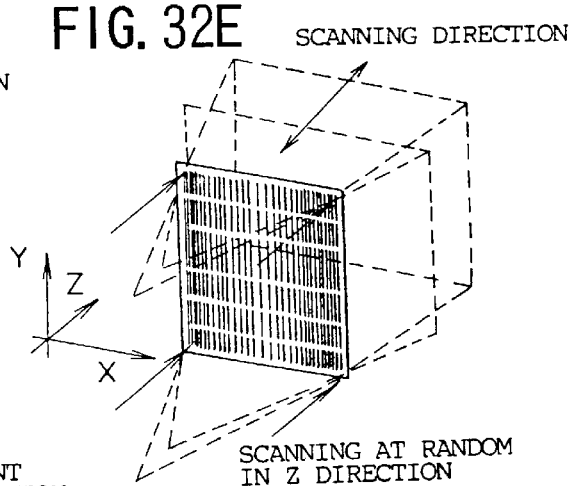

The deflection unit in which the initial orientation of the liquid crystal has the direction A' is driven in the low-frequency driving manner so that the concave cylindrical lens is formed. In this case, the same driving voltage is supplied to the electrode-segments arranged in the direction (the lateral direction) parallel to the direction A' of the initial orientation and the driving voltages represented by the equation (4-17) or (4-20) are supplied to the electrode-segments arranged in the direction (the longitudinal direction) perpendicular to the direction A' of the initial orientation. As a result, the focal point moves at a constant velocity or at random in the direction Z parallel to the focus direction, as shown in FIG. 32D or 32E.

The deflection unit in which the initial orientation of the liquid crystal has the direction A is driven in the low-frequency driving manner so that the concave cylindrical lens is formed. In this case, the same driving voltage is supplied to the electrode-segments arranged in the direction (the longitudinal direction) parallel to the direction A of the initial orientation and the driving voltages represented by the equation (4-17) or (4-20) are supplied to the electrode-segments arranged in the direction (the lateral direction) perpendicular to the direction A of the initial orientation. As a result, the focal point moves at a constant velocity or at random in the direction Z parallel to the focus direction, as shown in FIG. 32D or 32E.

Figure 32F:
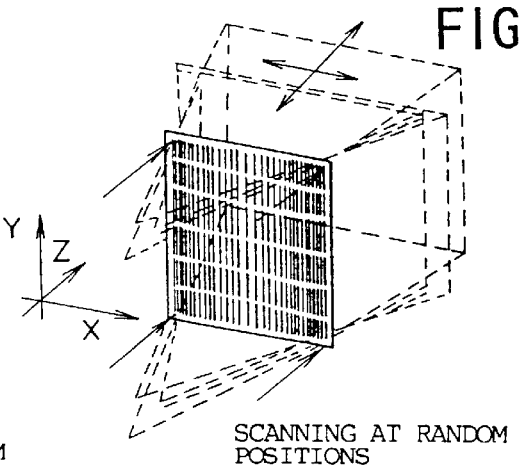

The deflection unit in which the initial orientation of the liquid crystal has the direction A' is driven in the low-frequency driving manner so that the concave cylindrical lens is formed. In addition, the deflection unit in which the initial orientation of the liquid crystal has the direction A is driven in the low-frequency driving manner so that the concave cylindrical lens is formed. In these cases, the same driving voltage is supplied to the electrode-segments arranged in the directions parallel to the directions A' and A of the initial orientation and the driving voltages represented by the equation (4-23)are supplied to the electrode-segments arranged in the directions perpendicular to the directions A' and A of the initial orientation. As a result, the focal point moves at random in points of time and space, as show in FIG. 32F.

The deflection unit in which the initial orientation of the liquid crystal has the direction A' is driven in the high-frequency driving manner so that the convex cylindrical lens is formed. In this case, the same driving voltage is supplied to the electrode-segments arranged in the direction (the longitudinal direction) perpendicular to the direction A' of the initial orientation and the driving voltages represented by the equation (4-8), (4-11) or (4-14) are supplied to the electrode-segments arranged in the direction (the lateral direction) parallel to the direction A' of the initial orientation. As a result, the focal point moves at a constant velocity, at a constant velocity, at a constant angular velocity or at random in the direction perpendicular to the focus direction and parallel to the one-dimensional arrangement direction, as shown in FIG. 31A, 31B or 31C.

The deflection unit in which the initial orientation of the liquid crystal has the direction A is driven in the high-frequency driving manner so that the convex cylindrical lens is formed. In this case, the same driving voltage is supplied to the electrode-segments arranged in the direction (the lateral direction) perpendicular to the direction A of the initial orientation and the driving voltages represented by the equation (4-8), (4-11) or (4-14) are supplied to the electrode-segments arranged in the direction (the longitudinal direction) parallel to the direction A of the initial orientation. As a result, the focal point moves at a constant velocity, a constant angular velocity or at random in the direction perpendicular to the focus direction and perpendicular to the one-dimensional arrangement direction, as shown in FIG. 31A, 31B or 31C.

The deflection unit in which the initial orientation of the liquid crystal has the direction A' is driven in the high-frequency driving manner so that the convex cylindrical lens is formed. In this case, the same driving voltage is supplied to the electrode-segments arranged in the direction (the longitudinal direction) perpendicular to the direction A' of the initial orientation and the driving voltages represented by the equation (4-17) or (4-20)are supplied to the electrode-segments arranged in the direction (the lateral direction) parallel to the direction A' of the initial orientation. As a result, the focal point moves at a constant velocity or at random in the direction Z parallel to the focus direction, as shown in FIG. 31D or 31E.

The deflection unit in which the initial orientation of the liquid crystal has the direction A is driven in the high-frequency driving manner so that the convex cylindrical lens is formed. In this case, the same driving voltage is supplied to the electrode-segments arranged in the direction (the lateral direction) perpendicular to the direction A of the initial orientation and the driving voltages represented by the equation (4-17) or (4-20) are supplied to the electrode-segments arrange in the direction (the longitudinal direction) parallel to the direction A of the initial orientation. As a result, the focal point moves at a constant velocity or at random in the direction Z parallel to the focus direction, as shown in FIG. 31D or 31E.

The deflection unit in which the initial orientation of the liquid crystal has the direction A' is driven in the high-frequency driving manner so that the convex cylindrical lens is formed. In addition, the deflection unit in which the initial orientation of the liquid crystal has the direction A is driven in the high-frequency driving manner so that the convex cylindrical lens is formed. In these cases, the same driving voltages is supplied to the electrode-segments arranged in the directions perpendicular to the directions A' and A of the initial orientation and the driving voltages represented by the equation (4-23) are supplied to the electrode-segments arranged in the directions parallel to the directions A' and A of the initial orientation. As a result, the focal point moves at random in points of time and space, as shown in FIG. 31F.

The deflection unit in which the initial orientation of the liquid crystal has the direction A' is driven in the high-frequency driving manner so that the concave cylindrical lens is formed. In this case, the same driving voltage is supplied to the electrode-segments arranged in the direction (the longitudinal direction) perpendicular to the direction A' of the initial orientation and the driving voltages represented by the equation (4-8), (4-11) or (4-14) are supplied to the electrode-segments arranged in the direction (the lateral direction) parallel to the direction A' of the initial orientation. As a result, the focal point moves at a constant velocity, at a constant angular velocity or at random in the direction perpendicular to the focus direction and parallel to the one-dimensional arrangement direction, as shown in FIG. 32A, 32B or 32C.

The deflection unit in which the initial orientation of the liquid crystal has the direction A is driven in the high-frequency driving manner so that the concave cylindrical lens is formed. In this case, the same driving voltage is supplied to the electrode-segments arranged in the direction (the lateral direction) perpendicular to the direction A of the initial orientation and the driving voltages represented by the equation (4-8), (4-11) or (4-14) are supplied to the electrode-segments arranged in the direction (the longitudinal direction) parallel to the direction A of the initial orientation. As a result, th focal point moves at a constant velocity, at a constant angular velocity or at random in the direction perpendicular to the focus direction and perpendicular to the one-dimensional arrangement direction, as shown in FIG. 32A, 32B or 32C.

The deflection unit in which the initial orientation of the liquid crystal has the direction A' is driven in the high-frequency driving manner so that the concave cylindrical lens is formed. In this case, the same driving voltage is supplied to the electrode-segments arranged in the direction (the longitudinal direction) perpendicular to the direction A' of the initial orientation and the driving voltages represented by the equation (4-17) or (4-20) are supplied to the electrode-segments arranged in the direction (the lateral direction) parallel to the direction A of the initial orientation. As a result, the focal point moves at a constant velocity or at random in the direction parallel to the focus direction, as shown in FIG. 32D or 32E.

The deflection unit in which the initial orientation of the liquid crystal has the direction A is driven in the high-frequency driving manner so that the concave cylindrical lens is formed. In this case, the same driving voltage is supplied to the electrode-segments arranged in the direction (the lateral direction) perpendicular to the direction A of the initial orientation and the driving voltages represented by the equation (4-17) or (4-20) are supplied to the electrode-segments arranged in the direction (the longitudinal direction) parallel to the direction A of the initial orientation. As a result, the focal point moves at a constant velocity or at random in the direction parallel to the focus direction, as shown in FIG. 32D or 32E.

The deflection unit in which the initial orientation of the liquid crystal has the direction A' is driven in the high-frequency driving manner so that the concave cylindrical lens is formed. In addition, the deflection unit in which the initial orientation of the liquid crystal has the direction A is driven in the high-frequency driving manner so that the concave cylindrical lens is formed. In these cases, the same driving voltage is supplied to the electrode-segments in the directions perpendicular to the directions A' and A of the initial orientation and the driving voltages represented by the equation (4-23) are supplied to the electrode-segments in the directions parallel to the directions A' and A of the initial orientation. As a result, the focal point moves at random in points of time and space.

Figure 27:
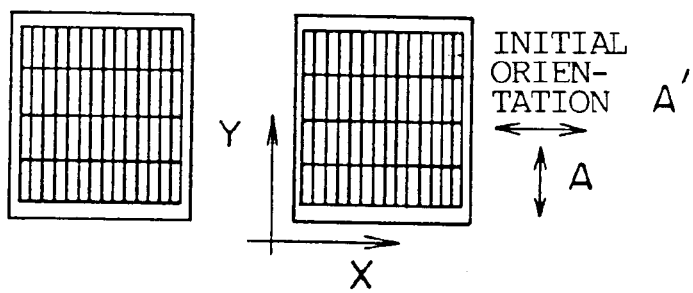
FIG. 27 is a diagram illustrating a fourth variation of the transparent electrodes used in the deflection unit.
Figure 34A:
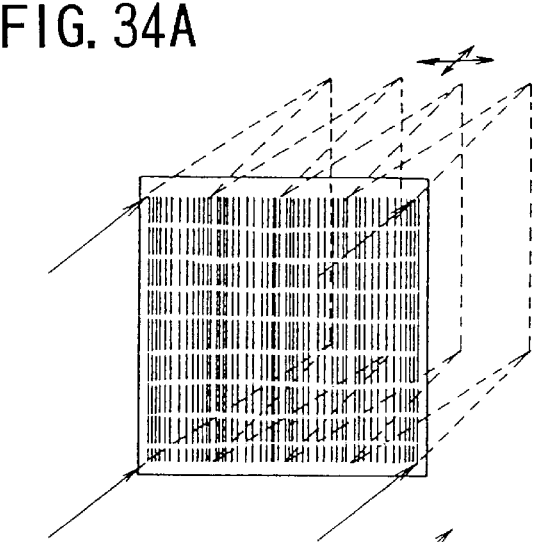
FIGS. 34A, 34B and 34C are diagrams illustrating examples of focus movement in a case where deflection unit is driven so that a convex cylindrical lens array is formed.
Figure 34B:
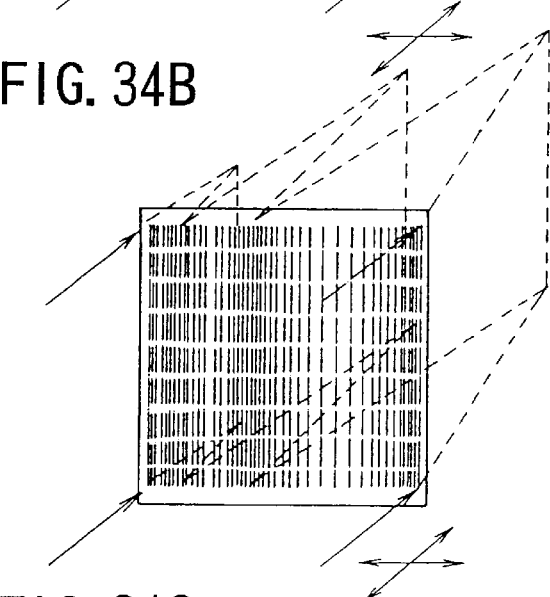
Figure 34C:
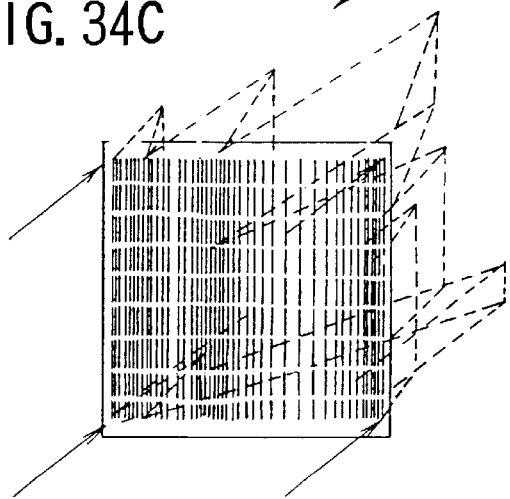

The transparent electrodes 23 and 24 may be formed as shown in FIG. 27. Referring to FIG. 27, both the transparent electrodes 23 and 24 are segmented into electrode-segments which are two-dimensionally arranged. The initial orientation of the liquid crystal has a single direction A (the longitudinal direction) or A' (the lateral direction). In a case where the deflection unit is driven in the low-frequency driving manner, the initial orientation of the liquid crystal has the direction A (the longitudinal direction), and in a case where the deflection unit is driven in the high-frequency driving manner, the initial orientation of the liquid crystal has the direction A' (the lateral direction). The same driving voltage is supplied to the electrode-segments arranged in the longitudinal direction. Driving voltages are supplied to the electrode-segments arranged in the lateral direction so that stripes arranged in the lateral direction are formed in the liquid crystal. As a result, the line-shaped focus (the focal point) is formed as shown in FIGS. 34A to 34C. Due to the variation of the driving voltages supplied to the electrode-segments, the line-shaped focus moves at a constant velocity, at a constant angular velocity or at random in a direction perpendicular to the focus direction, and moves at a constant voltage or at random in a direction parallel to the focus direction.

A description will now be given of concrete driving operations of the deflection unit having the transparent electrodes as shown in FIG. 27.

The deflection unit is driven in the low-frequency driving manner so that the convex cylindrical lens is formed. In this case, the same voltage is supplied to the electrode-segments arranged in the direction (the longitudinal direction) parallel to the direction A of the initial orientation and the driving voltages represented by the equation (4-8), (4-11) or (4-14) are supplied to the electrode-segments in the direction (the lateral direction) perpendicular to the direction A of the initial orientation. As a result, the focal point moves at a constant velocity, at a constant angular velocity or at random in the direction perpendicular to the focus direction and perpendicular to the direction A of the initial orientation.

In the above case, the same voltage is supplied to the electrode-segments arranged in the direction (the longitudinal direction) parallel to the direction A of the initial orientation and the driving voltages represented by the equation (4-17) or (4-20are supplied to the electrode-segments arranged in the direction (the lateral direction) perpendicular to the direction A of the initial orientation. As a result, the focal point moves at a constant velocity or at random in the direction parallel to the focus direction.

In the above case, the same voltage is supplied to the electrode-segments arranged in the direction (the longitudinal direction) parallel to the direction A of the initial orientation and the driving voltages represented by the equation (4-23) is supplied to the electrode-segments arranged in the direction (the lateral direction) perpendicular to the direction A of the initial orientation. As a result, the focal point moves at random in points of time and space.

The deflection unit is driven in the low-frequency driving manner so that the concave cylindrical lens is formed. In this case, the same voltage is supplied to the electrode-segments arranged in the direction (the longitudinal direction) parallel to the direction A of the initial orientation and the driving voltages represented by the equation (4-8), (4-11) or (4-14) are supplied to the electrode-segments arranged in the direction (the lateral direction) perpendicular to the direction A of the initial orientation. As a result, the focal point moves at a constant velocity, at a constant angular velocity or at random in the direction perpendicular to the focus direction and perpendicular to the direction A of the initial orientation.

In the above case, the same voltage is supplied to the electrode-segments arranged in the direction (the longitudinal direction) parallel to the direction A of the initial orientation and the driving voltages represented by the equation (4-17) or (4-20) are supplied to the electrode-segments arranged in the direction (the lateral direction)

perpendicular to the direction A of the initial orientation. As a result, the focal point moves at a constant velocity or at random in the direction parallel to the focus direction.

In the above case, the same voltage is supplied to the electrode-segments arranged in the direction (the longitudinal direction) parallel to the direction A of the initial orientation and the driving voltages represented by the equation (4-23) are supplied to the electrode-segments arranged in the direction (the lateral direction) perpendicular to the direction A of the initial orientation. As a result, the focal point moves at random in points of time and space.

The deflection unit is driven in the high-frequency driving manner so that the convex cylindrical lens is formed. In this case, the same driving voltage is supplied to the electrode-segments arranged in the direction (the longitudinal direction) perpendicular to the direction A' of the initial orientation and the driving voltages represented by the equation (4-8), (4-11) or (4-14) are supplied to the electrode-segments arranged in the direction (the lateral direction) parallel to the direction A' of the initial orientation. As a result, the focal point moves at a constant velocity, at a constant angular velocity or at random in the direction perpendicular to the focus direction and parallel to the direction A' of the initial orientation.

In the above case, the same voltage is supplied to the electrode-segments arranged in the direction (the longitudinal direction) perpendicular to the direction A' of the initial orientation and the driving voltages represented by the equation (4-17) or (4-20) are supplied to the electrode-segments arranged in the direction (the lateral direction) parallel to the direction A' of the initial orientation. As a result, the focal point moves at a constant velocity or at random in the direction parallel to the focus direction.

In the above case, the same voltage is supplied to the electrode-segments arranged in the direction (the longitudinal direction) perpendicular to the direction A' of the initial orientation and the driving voltages represented by the equation (4-23) are supplied to the electrode-segments arranged in the direction (the lateral direction) parallel to the direction A' of the initial orientation. As a result, the focal point moves at random in points of time and space.

The deflection unit is driven in the high-frequency driving mode so that the concave cylindrical lens is formed. In this case, the same driving voltage is supplied to the electrode-segments arranged in the direction (the longitudinal direction) perpendicular to the direction A' of the initial orientation and the driving voltages represented by the equation (4-8), (4-11) or (4-14) are supplied to the electrode-segments arranged in the direction (the lateral direction) parallel to the direction A' of the initial orientation. As a result, the focal point moves at a constant velocity, at a constant angular velocity or at random in the direction perpendicular to the focus direction and the direction A' of the initial orientation.

In the above case, the same driving voltage is supplied to the electrode-segments arranged in the direction (the longitudinal direction) perpendicular to the direction A' of the initial orientation and the driving voltages represented by the equation (4-17) or (4-20) are supplied to the electrode-segments arranged in the direction (the lateral direction) parallel to the direction A' of the initial orientation. As a result, the focal point moves at a constant velocity or at random in the direction parallel to the focus direction.

In the above case, the same driving voltage is supplied to the electrode-segments arranged in the direction (the longitudinal direction) perpendicular to the direction A' of the initial orientation and the driving voltages represented by the equation (4-23) are supplied to the electrode-segments arranged in the direction (the lateral direction) parallel to the initial orientation. As a result, the focal point moves at random in points of time and space.

Figure 28:
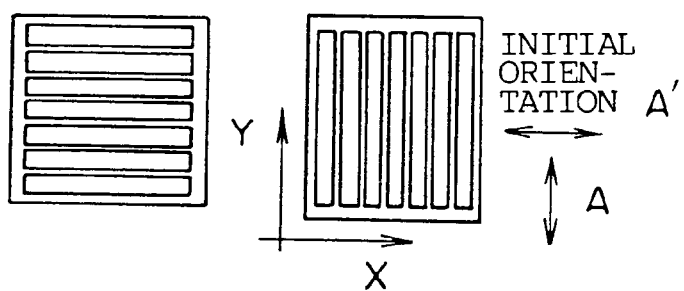
FIG. 28 is a diagram illustrating a fifth variation of the transparent electrodes used in the deflection unit.

The transparent electrodes 23 and 24 may be formed as shown in FIG. 28. Referring to FIG. 28, the transparent electrode 23 is segmented into electrode-segments which are one-dimensionally arranged in the longitudinal direction. The transparent electrode 24 is segmented into electrode-segments which are one-dimensionally arranged in the lateral direction. The transparent electrodes 23 and 24 are mounted in the deflection unit 22 so that a direction in which the electrode-segments of the transparent electrode 23 extend and a direction in which the electrode-segments of the transparent electrode 24 cross each other. The initial orientation of the liquid crystal has a single direction A (the longitudinal direction) or A' (the lateral direction). In a case where the deflection unit is driven in the low-frequency driving mode, the initial orientation of the liquid crystal has the direction A (the longitudinal direction). In a case where the deflection unit is driven in the high-frequency driving mode, the initial orientation of the liquid crystal has the direction A' (the lateral direction). The electric field is generated in each part of the liquid crystal which sandwiched by electrode-segments extending the crossed directions so that stripes are formed in each part of the liquid crystal. The light diffracted by the stripes is focused in the lateral direction so that a line-shaped focus is formed. Due to the variation of the driving voltages applied across the electrode-segments of the transparent electrodes 23 and 24, the line-shaped focus (the focal point) moves at a constant velocity, at a constant angular velocity or at random in the direction perpendicular to the focus direction, and moves at a constant velocity or at random in the direction parallel to the focus direction, as shown in FIGS. 34A, 34B and 34C.

A description will now be given of concrete driving operations of the deflection unit having the transparent electrode as shown in FIG. 28.

The deflection unit is driven in the low-frequency driving manner so that the convex cylindrical lens is formed. In this case, the same driving voltage is supplied to the electrode-segments arranged in the direction (the longitudinal direction) parallel to the direction A of the initial orientation and the driving voltages represented by the equation (4-8), (4-11) or (4-14) are supplied to the electrode-segments arranged in the direction (the lateral direction) perpendicular to the direction A of the initial orientation. As a result, the focal point moves at a constant velocity, at a constant angular velocity or at random in the direction perpendicular to the focus direction and perpendicular to the direction A of the initial orientation.

In the above case, the same driving voltage is supplied to the electrode-segments arranged in the direction (the longitudinal direction) parallel to the direction A of the initial orientation and the driving voltages represented by the equation (4-17) or (4-20) are supplied to the electrode-segments arranged in the direction (the lateral direction) perpendicular to the direction A of the initial orientation. As a result, the focal point moves at a constant velocity or at random in the direction parallel to the focus direction.

In the above case, the same driving voltage is supplied to the electrode-segments arranged in the direction (the longitudinal direction) parallel to the direction A of the initial orientation and the driving voltages represented by the equation (4-23) are supplied to the electronic-segments arranged in the direction (the lateral direction) perpendicular to the direction A of the initial orientation. As a result, the focal point moves at random in points of time and space.

The deflection unit is driven in the low-frequency driving manner so that the concave cylindrical lens is formed. In this case, the same driving voltage is supplied to the electrode-segments arranged in the direction (the longitudinal direction) parallel to the direction A of the initial orientation and the driving voltages represented by the equation (4-8), (4-11) or (4-14) are supplied to the electrode-segments arranged in the direction (the lateral direction) perpendicular to the direction A of the initial orientation. As a result, the focal point moves at a constant velocity, at a constant angular velocity or at random in the direction perpendicular to the focus direction and perpendicular to the direction A of the initial orientation.

In the above case, the same driving voltage is supplied to the electrode-segments arranged in the direction (the longitudinal direction) parallel to the direction A of the initial orientation and the driving voltages represented by the equation (4-17) or (4-20) are supplied to the electrode-segments arranged in the direction (the lateral direction) perpendicular to the direction A of the initial orientation. As a result, the focal point moves at a constant velocity or at random in the direction parallel to the focus direction.

In the above case, the same driving voltage is supplied to the electrode-segments arranged in the direction (the longitudinal direction) parallel to the direction A of the initial orientation and the driving voltages represented by the equation (4-23) are supplied to the electrode-segments arranged in the direction (the lateral direction) perpendicular to the direction A of the initial orientation. As a result, the focal point moves at random in point of time and space.

The deflection unit is driven in the high-frequency driving manner so that the convex cylindrical lens is formed. In this case, the same driving voltage is supplied to the electrode-segments arranged in the direction (the longitudinal direction) perpendicular to the direction A' of the initial orientation and the driving voltages represented by the equation (4-8), (4-11) or (4-14) are supplied to the electrode-segments arranged in the direction (the longitudinal direction) parallel to the direction A' of the initial orientation. As a result, the focal point moves at a constant velocity, at a constant angular velocity or at random in the direction perpendicular to the focus direction and parallel to the direction A' of the initial orientation.

In the above case, the same driving voltage is supplied to the electrode-segments arranged in the direction (the longitudinal direction) perpendicular to the direction A' of the initial orientation and the driving voltages represented by the equation (4-17) or (4-20) are supplied to the electrode-segments arranged in the direction (the lateral direction) parallel to the direction A' of the initial orientation. As a result, the focal point moves at a constant velocity or at random in the direction parallel to the focus direction.

In the above case, the same driving voltage is supplied to the electrode-segments arranged in the direction (the longitudinal direction) perpendicular to the direction A' of the initial orientation and the driving voltages represented by the equation (4-23) are supplied to the electrode-segments arranged in the direction (the lateral direction) parallel to the direction A' of the initial orientation. As a result, the focal point moves at random in points of time and space.

The deflection unit is driven in the high-frequency driving manner so that the concave cylindrical lens is formed. In this case, the same driving voltage is supplied to the electrode-segments arranged in the direction (the longitudinal direction) perpendicular to the direction A' of the initial orientation and the driving voltages represented by the equation (4-8), (4-11) or (4-14) are supplied to the electrode-segments arranged in the direction (the lateral direction) parallel to the direction A' of the initial orientation. As a result, the focal point moves at a constant velocity, at a constant angular velocity or at random in the direction perpendicular to the focus direction and parallel to the direction A' of the initial orientation.

In the above case, the same driving voltage is supplied to the electrode-segments arranged in the direction (the longitudinal direction) perpendicular to the direction A' of the initial orientation and the driving voltages represented by the equation (4-17) or (4-20) are supplied to the electrode-segments arranged in the direction (the lateral direction) parallel to the direction A' of the initial orientation. As a result, the focal point moves at a constant velocity or at random in the direction parallel to the focus direction.

In the above case, the same driving voltage is supplied to the electrode-segments arranged in the direction (the longitudinal direction) perpendicular to the direction A' of the initial orientation and the driving voltages represented by the equation (4-23) are supplied to the electrode-segments arranged in the direction (the lateral direction) parallel to the direction A' of the initial orientation. As a result, the focal point moves at random in point of time and space.

A description will now be given of other examples of the driving operation of the deflection unit by which a cylindrical lens array having a plurality of cylindrical lenses is formed.

In a first example, the deflection unit has the transparent electrode 23 segmented into the electrode-segments which are one-dimensionally arranged and the transparent electrode 23 which is a single electrode, as shown in FIG. 23.

Figure 33A:
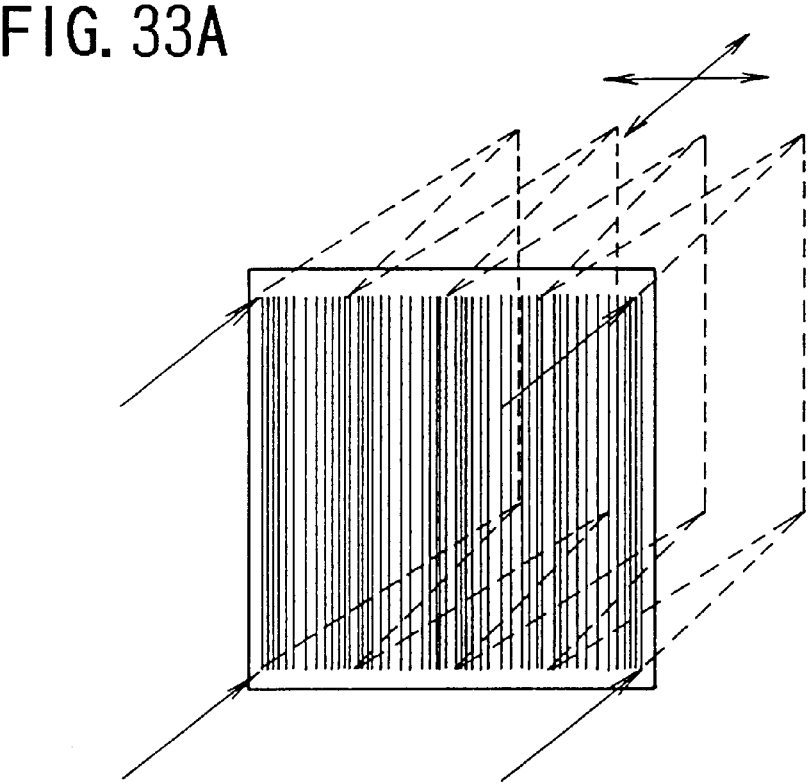
FIGS. 33A and 33B are diagrams illustrating examples of focus movement in a case where deflection unit is driven so that a convex cylindrical lens array is formed.
Figure 33B:
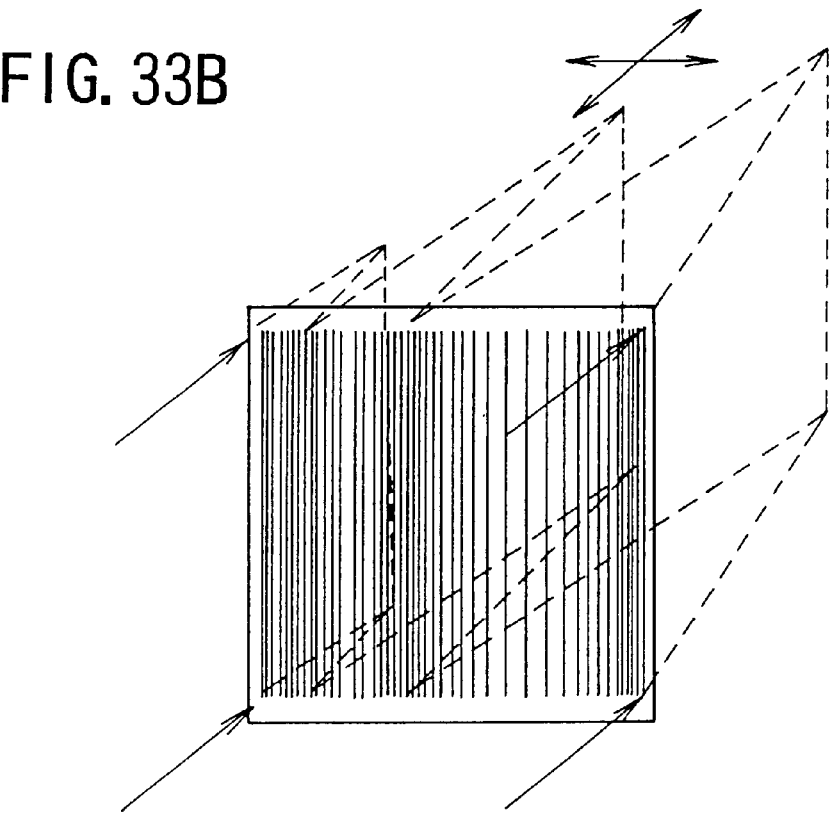

Driving voltages are supplied to the electrode-segments so that the line-shaped focus is formed by each part of liquid crystal corresponding to one or a plurality of electrode-segments adjacent to each other, as shown in FIGS. 33A and 33B. That is, due to this driving operation of the deflection unit, a cylindrical lens array having a plurality of cylindrical lenses one-dimensionally arranged is formed. The driving voltages supplied to the electrode-segments are changed in accordance with time, so that the line-shaped focus can move at a constant velocity, at a constant angular velocity and at random in the direction perpendicular to the focus direction. In addition, the line-shaped focus can move at a constant velocity and at random in the direction parallel to the focus direction.

In a case where the deflection unit is driven in the low-frequency driving manner, the initial orientation of the liquid crystal is parallel to a direction in which the light is deflected. On the other hand, in a case where the deflection unit is driven in the high-frequency driving manner, the initial orientation of the liquid crystal is perpendicular to the direction in which the light is deflected.

In a second example, both the transparent electrodes 23 and 24 are segmented into electrode-segments which are one-dimensionally arranged, as shown in FIG. 28.

Driving voltages may be supplied to the electrode-segments so that the line-shaped focus is formed by each part of the liquid crystal corresponding to one or a plurality of electrode-segments adjacent to each other, as shown in FIGS. 33A and 33B. In this case, a cylindrical lens array having a plurality of cylindrical lenses one-dimensionally arranged is formed.

In addition, driving voltages may be supplied to the electrode-segments so that the line-shaped focus is formed by each part of the liquid crystal corresponding to one or a plurality of adjacent areas where the electrode-segments of the transparent electrodes 23 and 24 overlap each other. In this case, a cylindrical lens array having a plurality of cylindrical lenses two-dimensionally arranged is formed.

The deflection unit having the transparent electrodes 23 and 24 as shown in FIG. 28 can be driven in the low-frequency driving manner and the high-frequency driving manner so that the line-shaped focus moves, in the same manner as in the first example.

In a third example, the deflection unit has the transparent electrode 23 segmented into electrode-segments which are two-dimensionally arranged and the transparent electrode 24 which is a single electrode, as shown in FIG. 24.

Driving voltages may be supplied to the electrode-segments so that the line-shaped focus is formed by each part of the liquid crystal corresponding to one or a plurality of sets of electrode-segments arranged in one direction, as shown in FIGS. 34A and 34B. In this case, a cylindrical lens array having a plurality of cylindrical lenses one-dimensionally arranged is formed.

In addition, driving voltages may be supplied to the electrode-segments so that the line-shape focus is formed by each part of the liquid crystal corresponding to one or a plurality of electrode-segments, as shown in FIG. 34C. In this case, a cylindrical lens array having a plurality of cylindrical lenses two-dimensionally arranged is formed.

The deflection unit having the transparent electrodes 23 and 24 as shown in FIG. 24 can be driven in the low-frequency driving manner and the high-frequency driving manner so that the line-shaped focus moves, in the same manner as in the first example.

In a forth example, the deflection unit has the transparent electrode 23 segmented into electrode-segments which are two-dimensionally arranged and the transparent electrode 24 segmented into electrode-segments which are one-dimensionally arranged, as shown in FIG. 26.

Driving voltages may be supplied to the electrode-segments so that the line-shaped focus is formed by each part of the liquid crystal corresponding to one of a plurality of sets of electrode-segments, of the transparent electrode 23, arranged in a direction parallel to a direction in which the electrode-segments of the transparent electrode 24 extend, as shown in FIGS. 34A and 34B. In this case, a cylindrical lens array having a plurality of cylindrical lenses one-dimensionally arranged is formed.

In addition, driving voltage may be supplied to the electrode-segments so that the line-shaped focus is formed by each part of the liquid crystal corresponding to one or a plurality of areas where the electrode-segments of the transparent electrodes 23 and 24 overlap each other, as shown in FIG. 34C. In this case, a cylindrical lens array having a plurality of cylindrical lenses two-dimensionally arranged is formed.

The deflection unit having the transparent electrodes 23 and 24 can be driven in the low-frequency driving manner and the high-frequency driving manner so that the line-shaped focus moves, in the same manner as in the first case.

In a fifth example, the deflection unit has the transparent electrodes 23 and 24 both of which are two-dimensionally segmented into the electrode-segments as shown in FIG. 27.

Driving voltage can be supplied to the electrode-segments so that the line-shaped focus is formed by each part of the liquid crystal corresponding to one or a plurality of sets of electrode-segments arranged in one direction, as shown in FIGS. 34A and 34B. In this case, a cylindrical lens array having a plurality of cylindrical lenses one-dimensionally arranged is formed.

In addition, driving voltage can be supplied to the electrode-segments so that the line-shaped focus is formed by each part of the liquid crystal corresponding to one or a plurality of areas where the electrode-segments of the transparent electrodes 23 and 24 overlap each other, as shown in FIG. 34C. In this case, a cylindrical lens array having a plurality of cylindrical lenses two-dimensionally arranged is formed.

The deflection unit having the transparent electrodes 23 and 24 as shown in FIG. 27 can be driven in the low-frequency driving manner and the high-frequency driving manner so that the line-shaped focus moves, in the same manner as in the first example.

A description will now be given of a third embodiment of the present invention.

The optical deflection apparatus according to the third embodiment of the present invention is shown in FIG. 35. In FIG. 35, those parts which are the same as those shown in FIG. 3 are given the same reference numbers.

The optical deflection apparatus 51 shown in FIG. 35 has a deflection unit 52 and a driving unit 53. The deflection unit 52 has the glass plates 8 and 9, the spacers 10 and the liquid crystal 11 in the same manner as in the first and second embodiments described above. The glass plate 8 is provided with a transparent electrode 53 covered by an orientation film 55, and the glass plate 9 is provided with a transparent electrode 54 covered by an orientation film 56. The driving unit 53 can drive the deflection unit 52 so that a Fresnel lens is formed.

Figure 37:
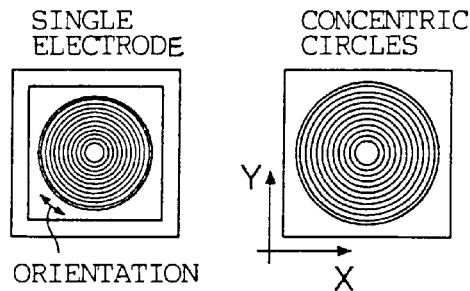
FIG. 37 is a diagram illustrating transparent electrodes used in the deflection unit.

The transparent electrode 53 is segmented into circular electrode-segments which are concentrically arranged, and the transparent electrodes 54 is a single electrode, as shown in FIG. 37. The initial orientation of the liquid crystal 11 has a direction which changes along concentric circles as shown in FIG. 37. The deflection unit can be driven in the low-frequency driving manner and the high-frequency driving manner. The initial orientation of the liquid crystal in a case of the low-frequency driving manner differs from that in a case of the high-frequency driving manner.

Figure 36:
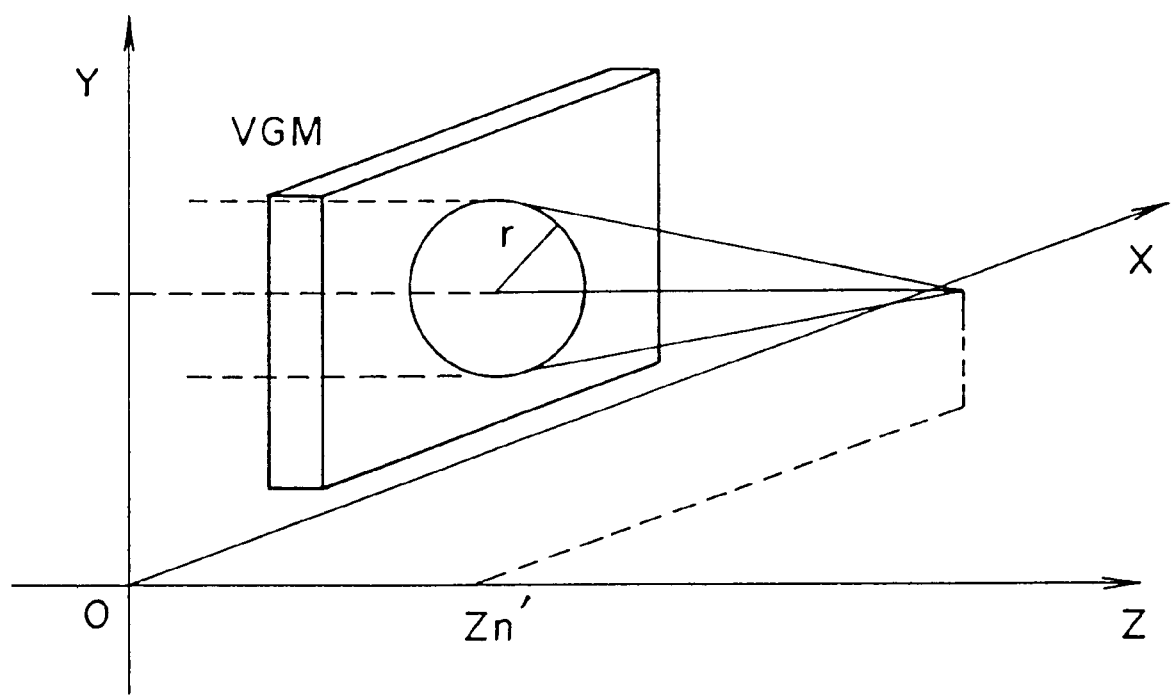
FIG. 36 is a diagram illustrating light deflected by a grating formed in a deflection unit of the deflection apparatus shown in FIG. 35.

A description will now be given, with reference to FIG. 36, of the driving operation of the deflection unit having the structure described above.

Driving voltages are supplied to the circular electrode-segments so that gratings are concentrically formed in the liquid crystal 11. Light is perpendicularly incident on the gratings.

In a case where the n-th grating formed in a portion of the liquid crystal 11 between the transparent electrode 54 and the n-th circular electrode-segment of the transparent electrode 53 has stripes having a space-frequency $f_s$, the deflection angle $\theta_{2n}$ is represented by the following equation.

$$\sin \theta_{2n} = f_s \lambda (\lambda: \text{wavelength}) \quad (5\text{-}1)$$

The space-frequency of the stripes is in proportion to the driving voltage supplied to the n-th circular electrode-segments, as indicated in FIG. 5. Thus, the space-frequency $f_s$ can be represented by $$f_s = k \, V \quad (5\text{-}2)$$

where V is the driving voltage and k is a constant. Thus, the following equation is obtained.

$$\sin \theta_{2n} = k' \, V (k' = k\lambda) \quad (5\text{-}3)$$

In a case where the light diffracted by the n-th grating $P_n(X_n, Y_n, 0)$ is focused on a focal point $Q_n(X_0', Y_0', Z_n')$, the deflection angle $\theta_{2n}$ can be represented by the following equation.

$$\sin\theta_{2n} = \qquad (5\text{-}4)$$
$$[(X_n - X_0')^2 + (Y_n + Y_0')]^{1/2} \div [Z_n'^2 + (X_n - X_0')^2 + (Y_n + Y_0')^2]^{1/2}$$

Since the following equation:

$$(X_n - X_0')^2 + (Y_n + Y_0')^2 = r_n^2 \qquad (5\text{-}5)$$

holds, the driving voltage V is presented by $$V = k'' \, r_n / (Z_n'^2 + r_n^2)^{1/2} \qquad (5\text{-}6)$$

where k" is equal to 1/k' (k"=1/k').

A description will now be given of the following cases where:

1-1) The focal point of the light emitted from the n-th grating $P_n$ moves at a constant velocity in a direction (the Z-axis) parallel to the focus direction; and 1-2) The focal point of the light output from the n-th grating $P_n$ moves at random in a direction (the Z-axis) parallel to the focus direction.

In the case 1-1) where the focal point moves at constant velocity on the optical axis extending in the Z-axis direction, a position $(Z_n')$ of the focal point can be represented by $$Z_n' = ct. \qquad (5\text{-}7)$$

Substituting the equation (5-7) for the above equation (5-6), the driving voltage V(rn,t) to be supplied to the n-th circular electrode-segment can be represented by the following equation.

$$V(r_n, t) = k'' \, r_n / (c t^2 + r_n^2)^{1/2} \qquad (5\text{-}8)$$

In the case 1-2) where the focal point moves at random on the optical axis, a position $(Z_n')$ of the focal point can be represented by $$Z_n' = R_z \text{ (a random value in point of time)}. \qquad (5\text{-}9)$$

Substituting the equation (5-9) for the above equation (5-6), the driving voltage V(rn,t) to be supplied to the n-th circular electrode-segment can be represented by the following equation.

$$V(r_n, t) = k'' \, r_n / (R_z^2 + r_n^2)^{1/2} \qquad (5\text{-}10)$$

A Fresnel lens made of glass functions as a convex lens or a concave lens in accordance with surface shapes. In the optical deflection apparatus in which variable stripe patterns are formed, due to changing of a distribution of voltages supplied to the gratings, a convex lens and a concave lens can be formed. As shown in FIG. 34, in a case where a coordinate $Z_n'$ of the focal point is positive, the convex Fresnel lens is formed. On the other hand, in a case where a coordinate $Z_n'$ of the focal point is negative, the concave Fresnel lens is formed.

The deflection unit is driven in the low-frequency driving manner so that the convex Fresnel lens is formed. In this case, when the driving voltages represented by the equation (5-8) or (5-10) are supplied to the circular electrode-segments, the focal point moves at a constant velocity or at random in the direction parallel to the focus direction, as shown in FIG. 51A or 51B.

The deflection unit is driven in the low-frequency driving manner so that the concave Fresnel lens is formed. In this case, when the driving voltages represented by the equation (5-8) or (5-10) are supplied to the circular electrode-segments, the focal point moves at a constant velocity or at random in the direction parallel to the focus direction, as shown in FIG. 51C or 51D. To form the concave Fresnel lens having the focal length of a minus value, positions $Z_n'$ of focal point for the respective gratings must have minus values (in the cases shown in FIGS. 51C and 51D).

Figure 38:
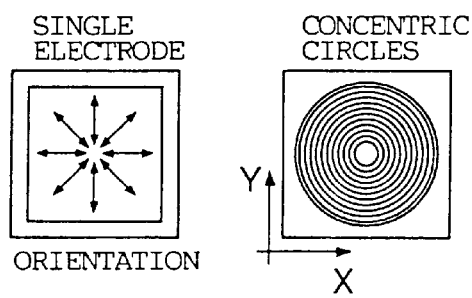
FIG. 38 is a diagram illustrating a first variation of the transparent electrodes used in the deflection unit.

The deflection unit having the transparent electrode 53 segmented into circular electrode-segments which are concentrically arranged and the transparent electrode 54 which is a single electrode, as shown in FIG. 38, may be driven in the high-frequency driving manner. The initial orientation of the liquid crystal has directions perpendicular to concentric circles, that is, radial directions of the concentric circles, as shown in FIG. 38.

Figure 51A:
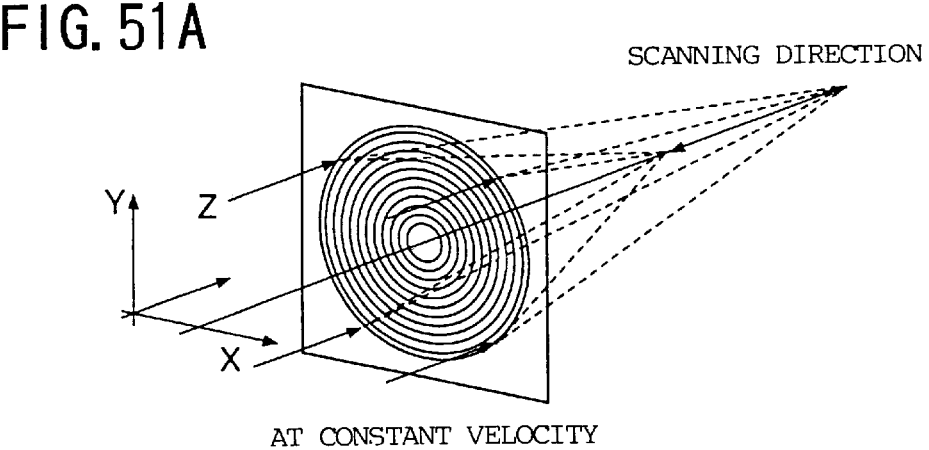
FIGS. 51A and 51B are diagrams illustrating examples of focus movement in a case where the deflection unit is driven so that the convex Fresnel lens is formed.
Figure 51B:
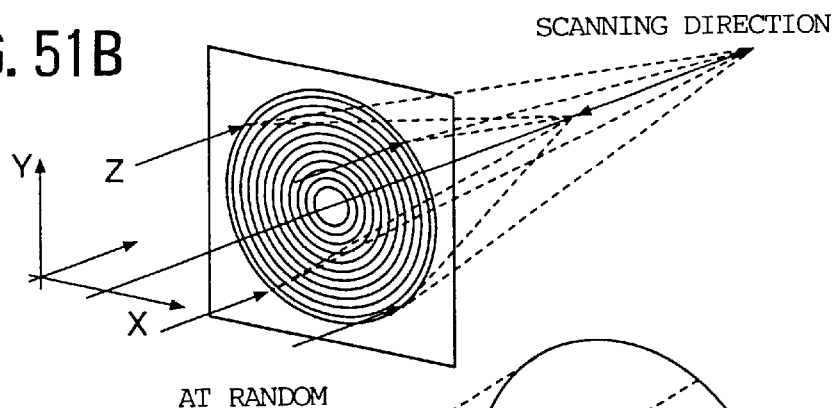
Figure 51C:
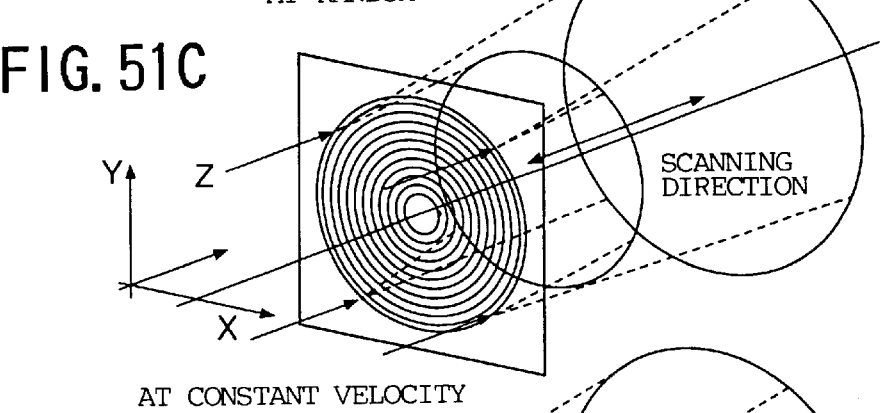
FIGS. 51C and 51D are diagrams illustrating examples of focus movement in a case where the deflection unit is driven so that the concave Fresnel lens is formed.
Figure 51D:
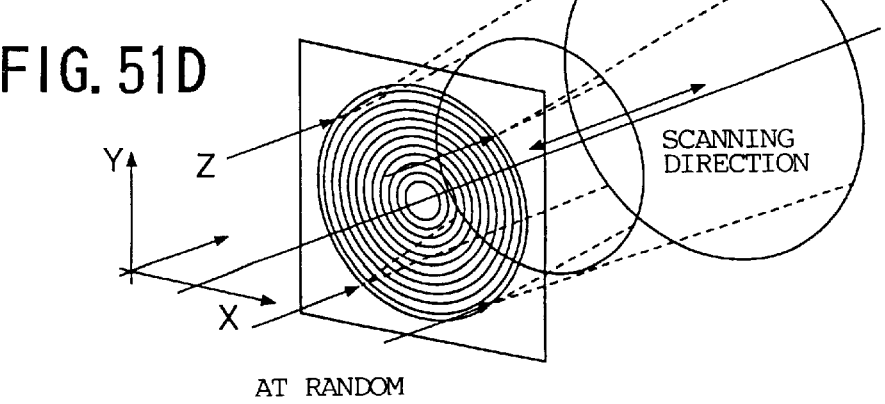

In a case where the deflection unit is driven so that the convex Fresnel lens is formed and in a case where the deflection unit is driven so that the concave Fresnel lens is formed, when the driving voltages represented by the equation (5-8) or (5-10) are supplied to the circular electrode-segments, the focal point moves in the direction parallel to the focus direction, as shown in FIG. 51A or 51B and in FIG. 51C or 51D.

Figure 39:
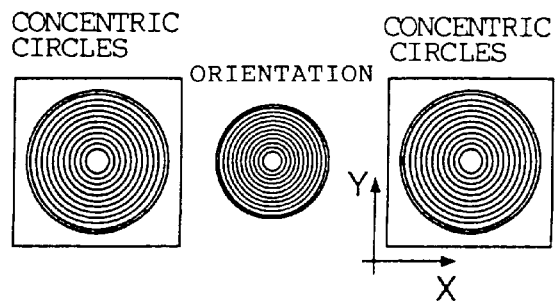
FIG. 39 is a diagram illustrating a second variation of the transparent electrodes used in the deflection unit.

The transparent electrodes 53 and 54 may be formed as shown in FIG. 39. Referring to FIG. 39, both the transparent electrodes 53 and 54 are segmented into circular electrode-segments which are concentrically arranged. The initial orientation of the liquid crystal has a directions which changes along concentric circles as shown in FIG. 39.

The deflection unit having the transparent electrodes 53 and 54 as shown in FIG. 39 can be driven in the low-frequency driving manner so that the convex Fresnel lens is formed and so that the concave Fresnel lens is formed. In the case where the convex Fresnel lens is formed and in the case where the concave Fresnel lens is formed, when the driving voltages represented by the equation (5-8) or (5-10) are supplied to the circular electrode-segments, the focal point moves in the direction parallel to the focus direction, as shown in FIG. 51A or 51B and in FIG. 51C or 51D.

Figure 40:
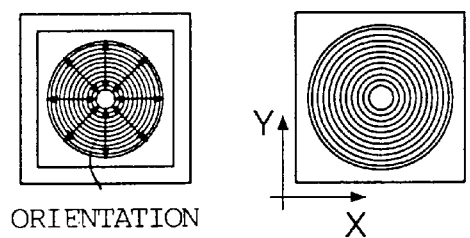
FIG. 40 is a diagram illustrating a third variation of the transparent electrodes used in the deflection unit.

The deflection unit having the transparent electrodes 53 and 54 as shown in FIG. 40 can be driven in the high-frequency driving manner so that the convex Fresnel lens is formed and so that the concave Fresnel lens is formed. Referring to FIG. 40, the transparent electrodes 53 and 54 are segmented into circular electrode-segments which are concentrically arranged, and the initial orientation of the liquid crystal has directions perpendicular to concentric circles, that is, radial directions of the concentric circles.

In the case where the convex Fresnel lens is formed and in the case where the concave Fresnel lens is formed, when the driving operations using the driving voltages (5-8) or (5-10) is performed in the same manner as in the cases of the deflection unit having the transparent electrodes show in FIG. 39, the focal point moves at a constant velocity or at random in the direction parallel to the focus direction, as shown in FIG. 51A or 51B and FIG. 51C or 51D.

Figure 41:
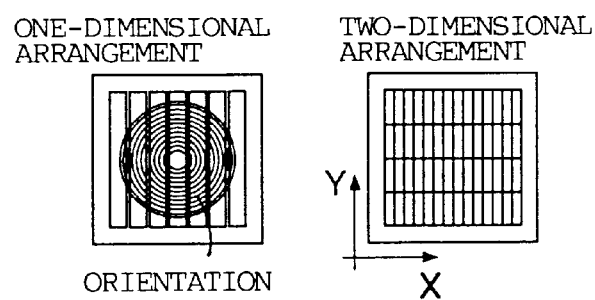
FIG. 41 is a diagram illustrating a fourth variation of the transparent electrodes used in the deflection unit.

The transparent electrodes 53 and 54 may be formed as shown in FIG. 41. Referring to FIG. 41, the transparent electrode 53 is segmented into electrode-segments which are one-dimensionally arranged. The transparent electrode 54 is segmented into electrode-segments which are two-dimensionally arranged. The initial orientation has a direction which changes along the concentric circles.

The deflection unit having the transparent electrodes 53 and 54 as shown in FIG. 41 can be driven in the low-frequency driving manner so that the convex Fresnel lens is formed and so that the concave Fresnel lens is formed. In these cases, when the deflection unit is driven such that the driving voltage represented by the equation (5-8) or (5-10) is supplied to electrode-segments positioned on a circle having a radius rn from the optical axis, the focal point moves at a constant velocity or at random in the direction parallel to the focus direction, as shown in FIG. 51A or 51B and FIG. 51C or 51D.

Figure 42:
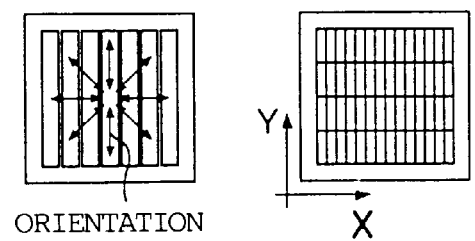
FIG. 42 is a diagram illustrating a fifth variation of the transparent electrodes used in the deflection unit.

The deflection unit having the transparent electrodes 53 and 54 as shown in FIG. 42 can be driven so that the convex Fresnel lens is formed and so that the concave Fresnel lens is formed. Referring to FIG. 42, the transparent electrode 53 is segmented into electrode-segments which are one-dimensionally arranged, the transparent electrode 54 is segmented into electrode-segments which are two-dimensionally arranged, and the initial orientation of the liquid crystal has directions perpendicular to concentric circles, that is, the radial directions of the concentric circles, as shown in FIG. 42.

In the case where the convex Fresnel lens is formed and in the case where the concave Fresnel lens is formed, when the driving operations using the driving voltages (5-8) or (5-10) is performed in the same manner as in the cases of the deflection unit having the transparent electrodes show in FIG. 41, the focal point moves at a constant velocity or at random in the direction parallel to the focus direction, as shown in FIG. 51A or 51B and FIG. 51C or 51D.

Figure 43:
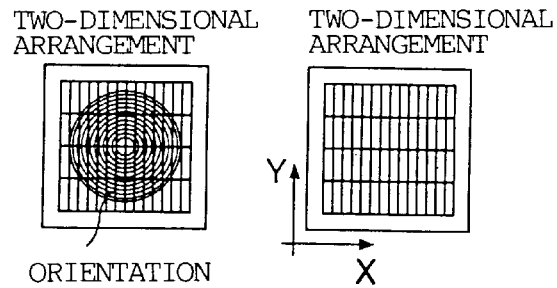
FIG. 43 is a diagram illustrating a sixth variation of the transparent electrodes used in the deflection unit.

The transparent electrodes 53 and 54 may be formed as shown in FIG. 43. Referring to FIG. 43, the transparent electrodes 53 and 54 are segmented into electrode-segments which are two-dimensionally arranged. The initial orientation of the liquid crystal has a direction which changes along concentric circles as shown in FIG. 43.

The deflection unit having the transparent electrodes 53 and 54 as shown in FIG. 43 can be driven in the low-frequency driving manner so that the convex Fresnel lens is formed and so that the concave Fresnel lens is formed. In these cases, when the deflection unit is driven such that the driving voltage represented by the equation (5-8) or (5-10) is supplied to electrode-segments positioned on a circle having a radius rn from the optical axis, the focal point moves at a constant velocity or at random in the direction parallel to the focus direction, as shown in FIG. 51A or 51B and FIG. 51C or 51D.

Figure 44:
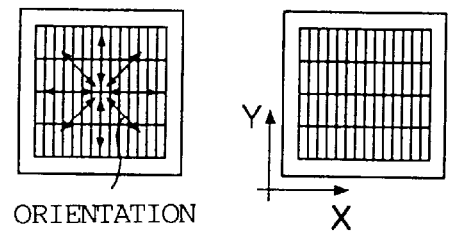
FIG. 44 is a diagram illustrating a seventh variation of the transparent electrodes used in the deflection unit.

The deflection unit having the transparent electrodes 53 and 54 as shown in FIG. 44 can be driven in the high-frequency driving manner so that the convex Fresnel lens is formed and so that the concave Fresnel lens is formed. Referring to FIG. 44, both the transparent electrodes 53 and 54 are segmented into electrode-segments which are two-dimensionally arranged, and the initial orientation of the liquid crystal has directions perpendicular to concentric circles, that is, radial directions of the concentric circles.

In the case where the convex Fresnel lens is formed and in the case where the concave Fresnel lens is formed, when the driving operations using the driving voltages (5-8) or (5-10) is performed in the same manner as in the cases of the deflection unit having the transparent electrodes show in FIG. 43, the focal point moves at a constant velocity or at random in the direction parallel to the focus direction, as shown in FIG. 51A or 51B and FIG. 51C or 51D.

Figure 45:
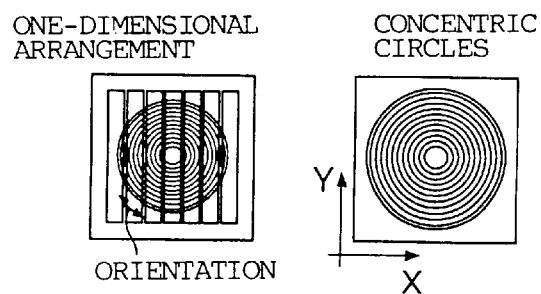
FIG. 45 is a diagram illustrating a eighth variation of the transparent electrodes used in the deflection unit.

The transparent electrodes 53 and 54 may be formed as shown in FIG. 45. Referring to FIG. 45, the transparent electrode 53 is segmented into circular electrode-segments which are concentrically arranged. The transparent electrode 54 is segmented into electrode-segments which are one-dimensionally arranged. The initial orientation of the liquid crystal has a direction which changes along concentric circles as shown in FIG. 45.

The deflection unit having the transparent electrodes 53 and 54 as shown in FIG. 45 can be driven in the low-frequency driving manner so that the convex Fresnel lens is formed and so that the concave Fresnel lens is formed. In these cases, when the driving voltages represented by the equation (5-8) and (5-10) are supplied to the circular electrode-segments, the focal point moves at a constant velocity or at random in the direction parallel to the focus direction, as shown in FIG. 51A or 51B and FIG. 51C or 51D.

Figure 46:
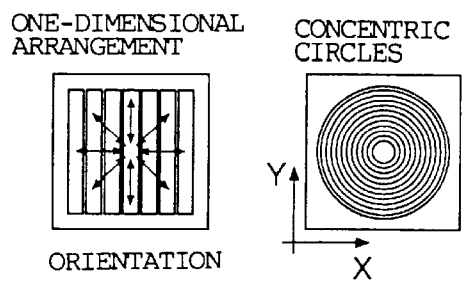
FIG. 46 is a diagram illustrating a ninth variation of the transparent electrodes used in the deflection unit.

The deflection unit having the transparent electrodes 53 and 54 as shown in FIG. 46 can be driven in the high-frequency driving manner so that the convex Fresnel lens is formed and so that the concave Fresnel lens is formed. Referring to FIG. 46, the transparent electrode 53 is segmented into circular electrode-segments which are concentrically arranged, the transparent electrode 54 is segmented into electrode-segments which are one-dimensionally arranged, and the initial orientation of the liquid crystal has directions perpendicular to concentric circles, that is, radial directions of the concentric circles.

In the case where the convex Fresnel lens is formed and in the case where the concave Fresnel lens is formed, when the driving operations using the driving voltages (5-8) or (5-10) is performed in the same manner as in the cases of the deflection unit having the transparent electrodes show in FIG. 45, the focal point moves at a constant velocity or at random in the direction parallel to the focus direction, as shown in FIG. 51A or 51B and FIG. 51C or 51D.

Figure 47:
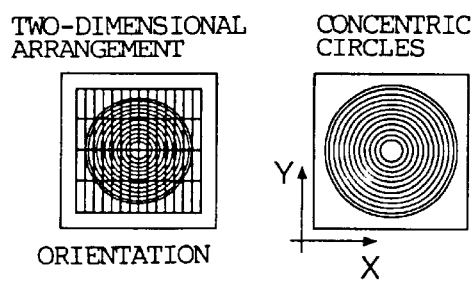
FIG. 47 is a diagram illustrating a tenth variation of the transparent electrodes used in the deflection unit.

The transparent electrodes 53 and 54 may be formed as shown in FIG. 47. Referring to FIG. 45, the transparent electrode 53 is segmented into circular electrode-segments which are concentrically arranged. The transparent electrode 54 is segmented into electrode-segments which are two-dimensionally arranged. The initial orientation of the liquid crystal has a direction which changes along concentric circles as shown in FIG. 47.

The deflection unit having the transparent electrodes 53 and 54 as shown in FIG. 47 can be driven in the low-frequency driving manner so that the convex Fresnel lens is formed and so that the concave Fresnel lens is formed. In these cases, when the driving voltages represented by the equation (5-8) and (5-10) are supplied to the circular electrode-segments, the focal point moves at a constant velocity or at random in the direction parallel to the focus direction, as shown in FIG. 51A or 51B and FIG. 51C or 51D.

Figure 48:
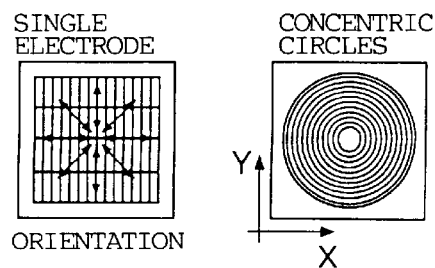
FIG. 48 is a diagram illustrating a eleventh variation of the transparent electrodes used in the deflection unit.

The deflection unit having the transparent electrodes 53 and 54 as shown in FIG. 48 can be driven in the high-frequency driving manner so that the convex Fresnel lens is formed and so that the concave Fresnel lens is formed. Referring to FIG. 48, the transparent electrode 53 is segmented into circular electrode-segments which are concentrically arranged, the transparent electrode 54 is segmented into electrode-segments which are two-dimensionally arranged, and the initial orientation of the liquid crystal has directions perpendicular to concentric circles, that is, radial directions of the concentric circles.

In the case where the convex Fresnel lens is formed and in the case where the concave Fresnel lens is formed, when the driving operations using the driving voltages (5-8) or (5-10) is performed in the same manner as in the cases of the deflection unit having the transparent electrodes show in FIG. 47, the focal point moves at a constant velocity or at random in the direction parallel to the focus direction, as shown in FIG. 51A or 51B and FIG. 51C or 51D.

Figure 49:
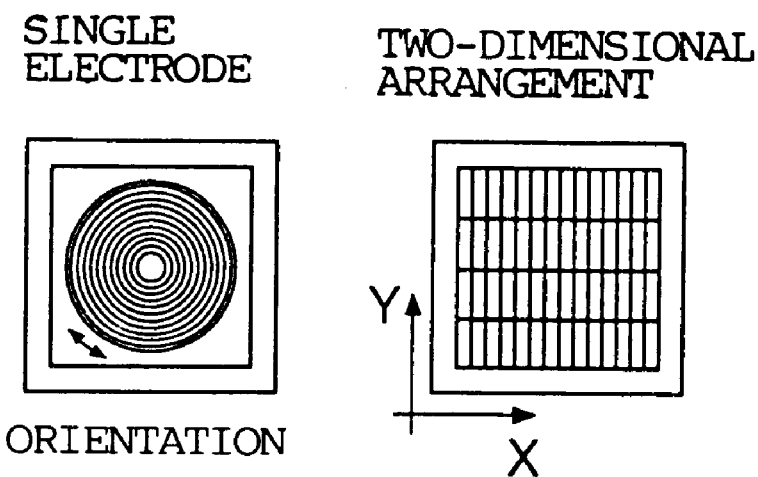
FIG. 49 is a diagram illustrating a twelfth variation of the transparent electrodes used in the deflection unit.

The transparent electrodes 53 and 54 may be formed as shown in FIG. 49. Referring to FIG. 49, the transparent electrode 53 is segmented into electrode-segments which are two-dimensionally arranged. The transparent electrode 54 is a single electrode. The initial orientation of the liquid crystal has a direction which changes along concentric circles as shown in FIG. 49.

The deflection unit having the transparent electrodes 53 and 54 as shown in FIG. 49 can be driven in the low-frequency driving manner so that the convex Fresnel lens is formed and so that the concave Fresnel lens is formed. In these cases, when the deflection unit is driven such that the driving voltage represented by the equation (5-8) and (5-10) are supplied to circular electrode-segments on a circle having a radius rn from the optical axis, the focal point moves at a constant velocity or at random in the direction parallel to the focus direction, as shown in FIG. 51A or 51B and FIG. 51C or 51D.

Figure 50:
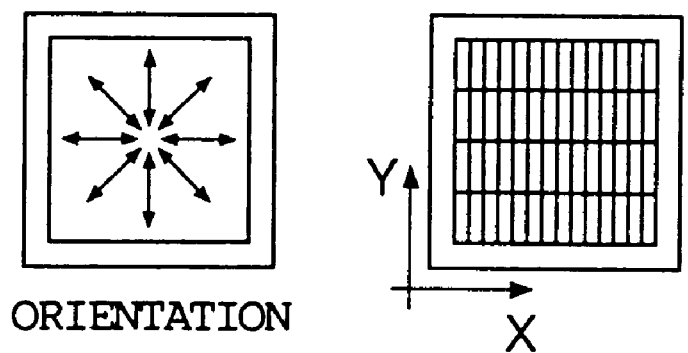
FIG. 50 is a diagram illustrating a thirteenth variation of the transparent electrodes used in the deflection unit.

The deflection unit having the transparent electrodes 53 and 54 as shown in FIG. 50 can be driven in the high-frequency driving manner so that the convex Fresnel lens is formed and so that the concave Fresnel lens is formed. Referring to FIG. 50, the transparent electrode 53 is segmented into electrode-segments which are two-dimensionally arranged, the transparent electrode 54 is a single electrode, and the initial orientation of the liquid crystal has directions perpendicular to concentric circles, that is, radial directions of the concentric circles.

In the case where the convex Fresnel lens is formed and in the case where the concave Fresnel lens is formed, when the driving operations using the driving voltages (5-8) or (5-10) is performed in the same manner as in the cases of the deflection unit having the transparent electrodes show in FIG. 49, the focal point moves at a constant velocity or at random in the direction parallel to the focus direction, as shown in FIG. 51A or 51B and FIG. 51C or 51D.

The present invention is not limited to the aforementioned embodiments, and variations and modifications may be made without departing from the scope of the claimed invention.

What is claimed is:

1. An optical deflection apparatus comprising:

a pair of transparent electrodes;

a liquid crystal layer, put between said transparent electrodes, in which stripes are formed at intervals based on a waveform of a driving signal supplied to said pair of transparent electrodes, the stripes functioning as a grating by which incident light is deflected in a deflecting direction; and driving means for supplying to said pair of transparent electrodes the driving signal having a waveform by which the deflecting direction changes with time, wherein said driving means includes signal generating means for generating a first signal having a low frequency less than a predetermined frequency and a second signal having a high frequency greater than the predetermined frequency; and control means for controlling said signal generating means so that said signal generating means outputs selectively the first signal or the second signal as the driving signal.

2. The optical deflection apparatus as recited in claim 1, wherein the driving signal supplied from said driving means to said pair of transparent electrodes has a waveform by which the deflecting direction changes at a constant velocity.

3. The optical deflection apparatus as recited in claim 1, wherein the driving signal supplied from said driving means to said pair of transparent electrodes has a waveform by which the deflecting direction changes at a constant angular velocity.

4. The optical deflection apparatus as claimed in claim 3, wherein the waveform of the driving signal depends on (sin wt) where t is time and w is an angular velocity.

5. The optical deflection apparatus as recited in claim 1, wherein the driving signal supplied from said driving means to said pair of transparent electrodes has a waveform by which the deflecting direction changes at random.

6. The optical deflection apparatus as recited in claim 1, wherein the waveform of the driving signal depends on (sin Θ) where Θ is a deflection angle.

7. An optical deflection apparatus, comprising:

a pair of transparent electrodes;

a liquid crystal layer, put between said transparent electrodes, in which stripes are formed at intervals based on a waveform of a driving signal supplied to said pair of transparent electrodes, the stripes functioning as a grating by which incident light is deflected in a deflecting direction; and driving means for supplying to said pair of transparent electrodes the driving signal having a waveform by which the deflecting direction changes with time, wherein the driving signal supplied from said driving means to said pair of transparent electrodes has a waveform by which the deflecting direction changes at a constant velocity, and wherein the waveform of the driving signal depends on the following formula:

$$t/(t^2+f)^{1/2}$$

where t is time and f is a constant based on a velocity at which a deflecting angle changes.

8. An optical deflection apparatus comprising:

a pair of transparent electrodes, at least one of said transparent electrodes being segmented into electrode-segments;

a liquid crystal layer, put between said transparent electrodes, in which stripes are formed at intervals based on waveforms of driving voltages supplied to said pair of transparent electrodes, the stripes functioning as gratings by which incident light is deflected in deflecting directions;

orientation setting means for setting an initial orientation of said liquid crystal layer; and driving means for supplying the driving voltages to the electrode-segments of said pair of transparent electrodes so that deflected light is focused, wherein the driving voltages supplied to the electrode-segments are controlled individually.

9. The optical deflection apparatus as claimed in claim 8, wherein said orientation setting means sets the initial orientation having a single direction.

10. The optical deflection apparatus as claimed in claim 9, wherein said driving means supplies the driving voltages to the electrode-segments so that electrode-segments included in each of rectangular areas arranged in parallel to each other are provided with the same voltage.

11. The optical deflection apparatus as claimed in claim 10, wherein voltages supplied to the electrode-segments included in different rectangular areas differ from each other so that line-shaped focus of the deflected light is formed.

12. The optical deflection apparatus as claimed in claim 11, wherein a voltage supplied to electrode-segments included in an n-th rectangular area depends on the following formula:

$$(X_n-R)/[S^2+(X_n-R)^2]^{1/2}$$

where $X_n$ is a position of the n-th rectangular area, S is a focal length and R is a position of the focus in an X direction.

13. The optical deflection apparatus as claimed in claim 11, wherein a voltage supplied to electrode-segments included in an n-th rectangular area depends on the following formula:

$$(X_n-V)/[R^2+(X_n-V)^2]^{1/2}$$

where $X_n$ is a position of the n-th rectangular area, V is a potion of the focus in a direction in which the light is incident and R is a position of the focus in an X direction.

14. The optical deflection apparatus as claimed in claim 11, the voltages supplied to the electrode-segments are varied with time so that the line-shaped focus moves.

15. The optical deflection apparatus as claimed in claim 14, wherein the voltages are varied so that the line-shaped focus moves in a direction perpendicular to a direction in which the light is incident on said liquid crystal layer.

16. The optical deflection apparatus as claimed in claim 15, wherein the voltages are varied so that the line-shaped focus moves at a constant velocity.

17. The optical deflection apparatus as claimed in claim 16, wherein the voltage supplied to electrode-segments included in an n-th rectangular area depend on the following formula:

$$(X_n-ct)/[S^2+(X_n-ct)^2]^{1/2}$$

where $X_n$ is a position of the n-th rectangular area, S is a focal length and c is a velocity.

18. The optical deflection apparatus as claimed in claim 11, wherein the voltages supplied to the electrode-segments are varied so that the line-shaped focus moves at a constant angular velocity.

19. The optical deflection apparatus as claimed in claim 18, wherein the voltage supplied to electrode-segments included in an n-th rectangular area depends on the following formula:

$$(X_n-s\ \tan wmt)/[S^2+(X_n-s\ \tan wmt)^2]^{1/2}$$

where $X_n$ is a position of the n-th rectangular area, S is a focal length, wm is an angular velocity and t is time.

20. The optical deflection apparatus as claimed in claim 11, wherein the voltages supplied to the electrode-segments are varied so that the line-shaped focus moves in a direction parallel to a direction in which the light is incident on the liquid crystal layer.

21. The optical deflection apparatus as claimed in claim 20, wherein the voltage supplied to electrode-segments included in an n-th rectangular area depends on the following formula:

$$(X_n-u)/[(et)^2+(X_n-u)^2]^{1/2}$$

where $X_n$ is a position of the n-th rectangular area, u is a focal length, e is a velocity at which the focus moves and t is time.

22. The optical deflection apparatus as claimed in claim 8, wherein said orientation setting means sets the initial orientation having a direction which changes along concentrically arranged circles.

23. The optical deflection apparatus as claimed in claim 22, wherein said driving means supplies the driving voltages to the electrode-segments so that electrode-segments included in each of circular areas concentrically arranged are provided with the same voltage.

24. The optical deflection apparatus as claimed in claim 23, wherein voltages supplied to the electrode-segments included in different circular areas differs from each other so that a focal point of the deflected light is formed.

25. The optical deflection apparatus as claimed in claim 24, wherein the voltage supplied to electrode-segments included in an n-th circular area depends on the following formula:

$$r_n/(R^2+r_n^2)^{1/2}$$

where $r_n$ is a radius of the n-th circular area and R is a focal length.

26. The optical deflection apparatus as claimed in claim 24, wherein the voltages supplied to the electrode-segments are varied with time so that the focal point moves.

27. The optical deflection apparatus as claimed in claim 26, wherein the voltage supplied to the electrode-segments are varied with time so that the focal point moves in a direction parallel to a direction in which the light is incident on the liquid crystal.

28. The optical deflection apparatus as claimed in claim 27, wherein the voltage supplied to electrode-segments included in an n-th circular area depends on the following formula:

$$r_n/(ct^2+r_n^2)^{1/2}$$

where $r_n$ is a radius of the n-th circular area and c is a velocity.

29. An optical deflection apparatus comprising:

a pair of transparent electrodes, at least one of said transparent electrodes being segmented into electrode-segments;

a liquid crystal layer, put between said transparent electrodes, in which stripes are formed at intervals based on a waveform of a driving signal supplied to said pair of transparent electrodes, the stripes functioning as a grating by which incident light is deflected in a deflecting direction; and driving means for supplying to said pair of transparent electrodes the driving signal having a waveform by which the deflecting direction changes with time, wherein said the driving signal supplied form said driving means to said pair of transparent electrodes has a waveform by which the deflecting directions changes periodically with respect to times, wherein the driving signal includes driving voltages supplied to the electrode-segments which are controlled individually.

30. An optical deflection apparatus comprising:

a pair of transparent electrodes;

a liquid crystal layer, put between said transparent electrodes, in which stripes are formed at intervals based on a waveform of a driving signal supplied to said pair of transparent electrodes, the stripes functioning as a grating by which incident light is deflected in a deflecting direction; and driving means for supplying to said pair of transparent electrodes the driving signal having a waveform by which the deflecting direction changes with time, wherein said pair of transparent electrodes include elongated transparent electrode segments which are positioned in parallels, wherein the driving signal includes driving voltages supplied to the electrode-segments which are controlled individually.

31. An optical deflection apparatus comprising:

a pair of transparent electrodes;

a liquid crystal layer, put between said transparent electrodes, in which stripes are formed at intervals based on a waveform of a driving signal supplied to said pair of transparent electrodes, the stripes functioning as a grating by which incident light is deflected in a deflecting direction; and driving means for supplying to said pair of transparent electrodes the driving signal having a waveform by which the deflecting direction changes with times, wherein said pair of transparent electrodes include transparent electrode segments positioned in a grid type pattern, and wherein the driving signal includes driving voltages supplied to the electrode-segments which are controlled individually.

32. An optical deflection apparatus comprising:

a pair of transparent electrodes;

a liquid crystal layer, put between said transparent electrodes, in which stripes are formed at intervals based on a waveform of a driving signal supplied to said pair of transparent electrodes, the stripes functioning as a grating by which incident light is deflected in a deflecting direction; and driving means for supplying to said pair of transparent electrodes the driving signal having a waveform by which the deflecting direction changes with time, wherein said pair of transparent electrodes include disk-shaped transparent electrode segments which are positioned concentrically, and wherein the driving signal includes driving voltages supplied to the electrode-segments which are controlled individually.

* * * * *